United States Patent
Ryan et al.

(10) Patent No.: US 11,195,637 B2
(45) Date of Patent: *Dec. 7, 2021

(54) ELASTOMER COMPOSITES WITH HIGH DIELECTRIC CONSTANT

(71) Applicant: Eaton Intelligent Power Limited, Dublin (IE)

(72) Inventors: David Eric Ryan, Waukesha, WI (US); Evangelos Manias, State College, PA (US); Bo Li, State College, PA (US)

(73) Assignee: Eaton Intelligent Power Limited, Dublin (IE)

( * ) Notice: Subject to any disclaimer, the term of this patent is extended or adjusted under 35 U.S.C. 154(b) by 319 days.

This patent is subject to a terminal disclaimer.

(21) Appl. No.: 16/594,898

(22) Filed: Oct. 7, 2019

(65) Prior Publication Data

US 2020/0035376 A1     Jan. 30, 2020

Related U.S. Application Data

(63) Continuation of application No. 15/497,027, filed on Apr. 25, 2017, now Pat. No. 10,438,717.

(Continued)

(51) Int. Cl.
*H01B 3/28* (2006.01)
*C08K 3/34* (2006.01)
(Continued)

(52) U.S. Cl.
CPC ............... *H01B 3/28* (2013.01); *C08K 3/04* (2013.01); *C08K 3/346* (2013.01); *C08L 23/16* (2013.01);
(Continued)

(58) Field of Classification Search
CPC . C08K 3/346; C08K 3/04; H01B 3/00; H01B 3/28; H01B 3/12
See application file for complete search history.

(56) References Cited

U.S. PATENT DOCUMENTS

| 4,470,898 A | 9/1984 | Penneck et al. |
| 4,602,052 A | 7/1986 | Weber et al. |

(Continued)

FOREIGN PATENT DOCUMENTS

| CN | 1056741 | 12/1991 |
| CN | 103214707 | 7/2013 |

(Continued)

OTHER PUBLICATIONS

Akrochem (use of special carbon blacks in gain unique properties and processing. Fillers/Extenders, 2004, 10 pages).

(Continued)

*Primary Examiner* — Brieann R Johnston
(74) *Attorney, Agent, or Firm* — King & Spalding LLP

(57) ABSTRACT

Elastomer compositions with high dielectric constants are disclosed. Embodiments of the disclosure include a high dielectric constant (high-K) elastomeric composition comprising an elastomer, carbon black (CB), and organoclay (OC). The composition is not dependent on any raw material with inherent high-k or any metal oxide type material that changes conductivity with applied voltages. The composition instead uses distributed electric fields and polarizability with carbon black and organoclays. This allows for a high-k material through polarizability with limited large-scale electron sharing.

20 Claims, 48 Drawing Sheets

Related U.S. Application Data

(60) Provisional application No. 62/327,027, filed on Apr. 25, 2016.

(51) Int. Cl.

| | | |
|---|---|---|
| *C08K 3/04* | (2006.01) | |
| *C08L 23/16* | (2006.01) | |
| *H01B 3/00* | (2006.01) | |
| *H01B 3/12* | (2006.01) | |
| *C08K 3/36* | (2006.01) | |
| *C08K 3/22* | (2006.01) | |

(52) U.S. Cl.
CPC ............... *H01B 3/004* (2013.01); *H01B 3/12* (2013.01); *C08K 3/22* (2013.01); *C08K 3/36* (2013.01); *C08K 2201/001* (2013.01); *C08K 2201/011* (2013.01); *C08K 2201/016* (2013.01)

(56) References Cited

U.S. PATENT DOCUMENTS

| | | | |
|---|---|---|---|
| 6,002,196 | A | 12/1999 | Sumita et al. |
| 7,923,500 | B2 | 4/2011 | Siegel et al. |
| 9,909,001 | B2 | 3/2018 | Kurimoto et al. |
| 2002/0031626 | A1 | 3/2002 | Ohira et al. |
| 2011/0140052 | A1 | 6/2011 | Somasiri et al. |
| 2015/0380125 | A1* | 12/2015 | Shimomai ............. C08L 101/00 428/339 |
| 2017/0178816 | A1 | 6/2017 | Shiraki et al. |

FOREIGN PATENT DOCUMENTS

| | | |
|---|---|---|
| GB | 1470502 | 4/1977 |
| GB | 1470503 | 4/1977 |
| GB | 1470504 | 4/1977 |
| JP | 11153168 A | 6/1999 |
| JP | 11228762 A | 8/1999 |
| JP | 2006290939 | 10/2006 |
| WO | 1991018045 | 11/1991 |
| WO | 2005036563 | 4/2005 |
| WO | 2014105979 | 7/2014 |

OTHER PUBLICATIONS

Biesterfeld (Performance Rubber & Additives Portfolio, Jul. 2015, 8 pages, particularly Spheron 6000A on p. 7).
Modern Dispersions (Thermoplastics Compounding: Fundamentals of Carbon Black, 2017, 3 pages, particularly DBP Crushed DBP on p. 3).
Machine translated English language equivalent of JP 11153168 (1999, 2 pages).
Machine translated English language equivalent of JP 11-228762 (1999, 4 pages).
CAPlus abstract of JP 11-228762 (AN 1999: 531161, Aug. 1999, 2 pages).
Tokai Carbon (SEAST. Tokai Carbon. 2018, 7 pages).
The PCT Search Report and Written Opinion From Corresponding PCT Application No. PCT/US2017/029458, dated Aug. 17, 2017, 8 pages.

* cited by examiner

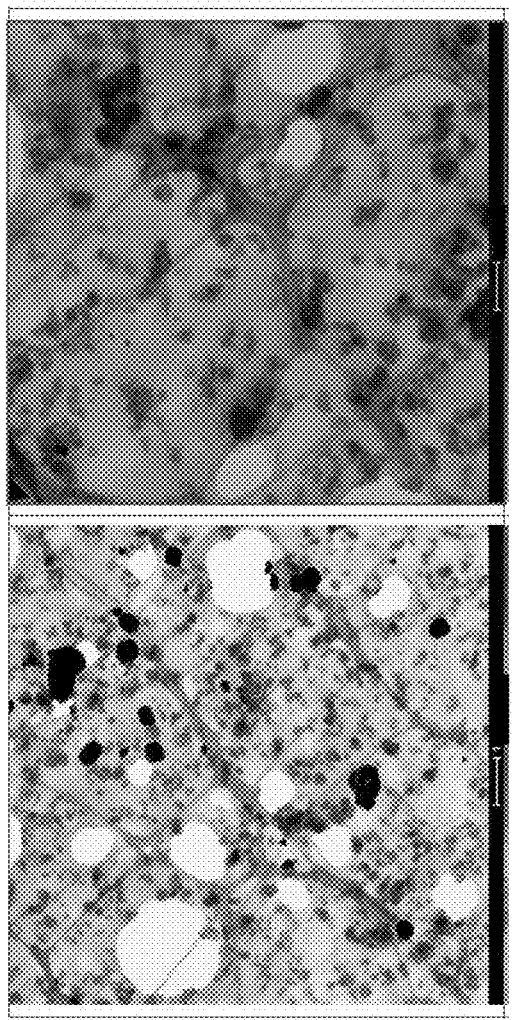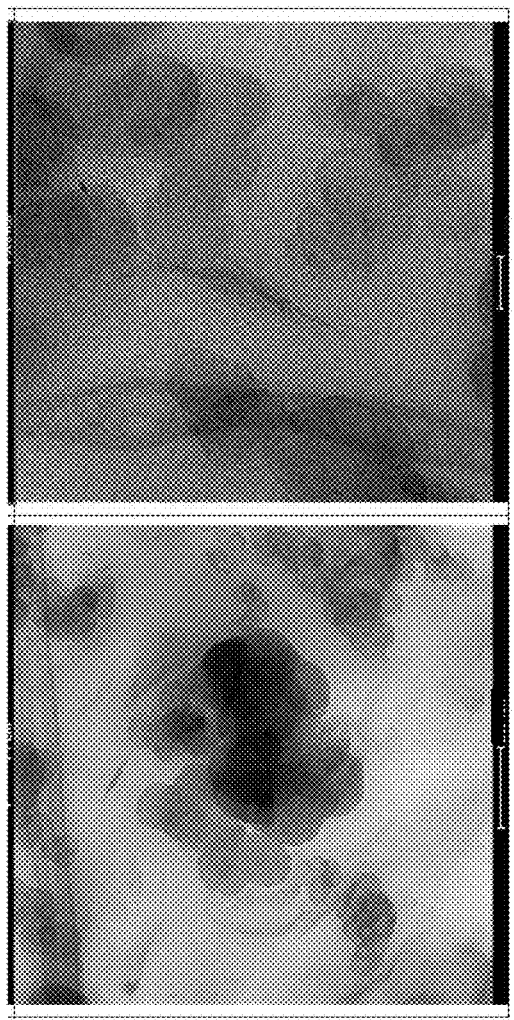
Fig. 22a  Fig. 22b  Fig. 22c  Fig. 22d

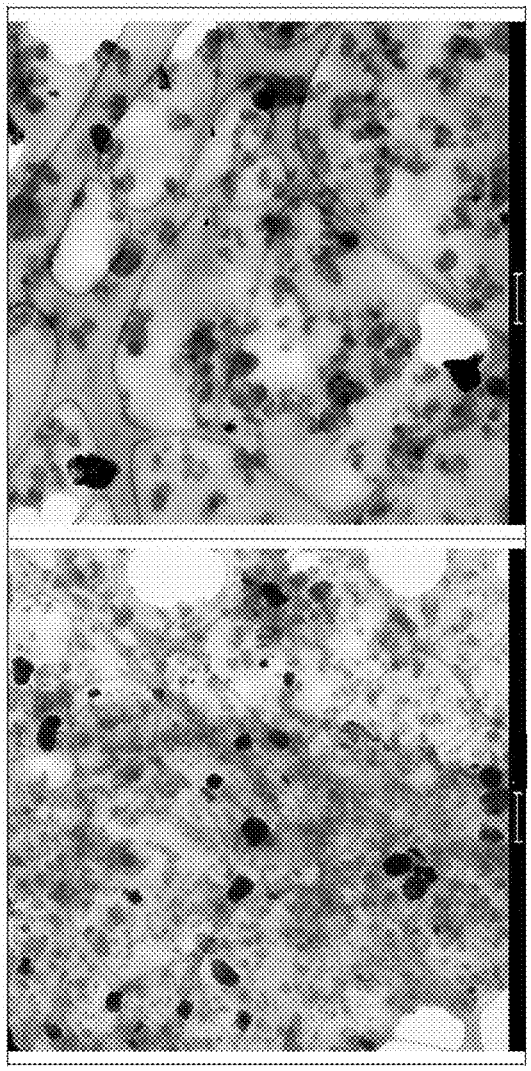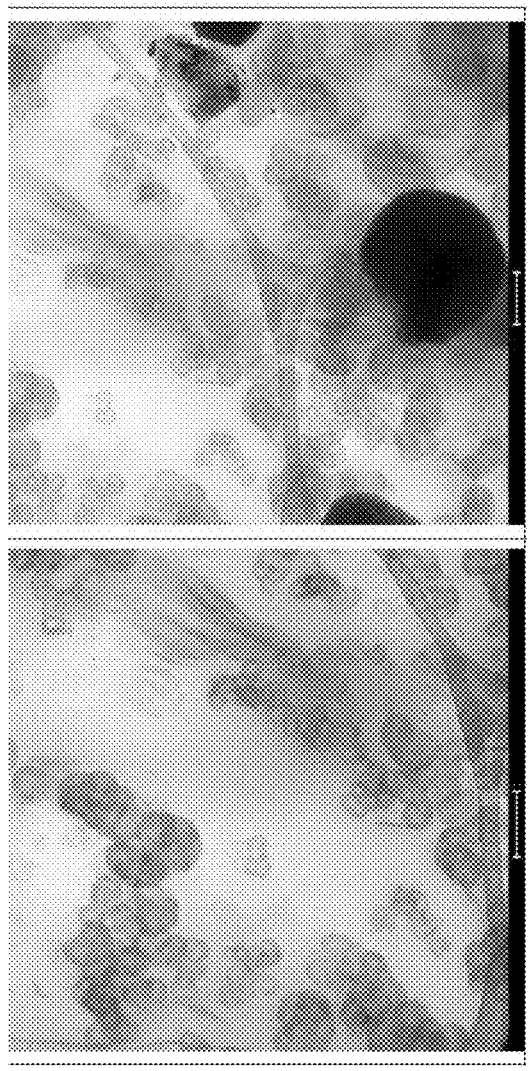
Fig. 22e   Fig. 22f   Fig. 22g   Fig. 22h

ELASTOMER COMPOSITES WITH HIGH DIELECTRIC CONSTANT

CROSS REFERENCE TO RELATED APPLICATIONS

This application is a continuation application of and claims priority to U.S. patent application Ser. No. 15/497,027, titled "Elastomer Composites With High Dielectric Constant" and filed on Apr. 25, 2017, which application claims the benefit of U.S. Provisional Patent Application Ser. No. 62/327,027, titled "Elastomer Composites with High Dielectric Constant" and filed on Apr. 25, 2016. The entire contents of the foregoing applications are hereby incorporated herein by reference.

TECHNICAL FIELD

The present disclosure relates generally to elastomer composites with high dielectric constants. In embodiments, the composite is an elastomeric composition comprising elastomer, carbon black, and organoclays, as well as relevant additives (plasticizers, crosslinking agents, etc) and, optionally, one or more ceramic fillers.

BACKGROUND

Elastomer polymers or their composites are widely used in medium voltage (1 kV to 38 kV) to high voltage (38 kV to 200 kV) cable splice and termination applications, where a combination of both decent insulating/dielectric properties and elastomer-type mechanical performance are required. However, the intrinsic low permittivity of rubber greatly impedes its ability in internal electrical-stress grading. One solution is to introduce high-k inorganic particles into polymer matrices to improve the polymer permittivity.

Many theoretical approaches are developed to predict the permittivity of composites. For instance, one of the most well-known equations, Lichtenecker's logarithmic mixing rule, is based on the assumption that every capacitive component is randomly dispersed in composites, obeying a statistical distribution of in-parallel connections and in-series connections. Based on a mean field theory, Maxwell-Wagner equation and Bruggeman model are derived, with the former one being only valid for the infinite dilution of dispersed phases (0-3 composites) and the latter one being effective to predict the effective dielectric constant of composites at a high filler concentration (0-0 composites). All these theories have successfully predicted a limited improvement in the dielectric constant at a small inorganic loading (fundamentally, the improvement comes from the intensified electric field in the polymer phase, with little contributed by the inorganic phase); however, as a guide for selecting the type and the concentration of ceramic fillers, the theories fall short of expectations.

One of the issues underlying the inaccurate estimate for the dielectric constant of composites is that they do not account for the effects of the interface between fillers and polymers, especially when filler size shrinks from micrometer to nanometer scale. Qualitatively, a multi-layered core model is proposed to describe the influence of interfaces on the physical and electrical properties of composites. Namely, the multicore structure of an interface consists of a bonded layer, a bound layer and a loose layer; additionally, an electric double layer overlaps the above three layers. The dielectric properties of polymer composites can be significantly altered when interfacial effects begin to dominate. The complex nature and the enriched structures of interfaces also complicate the quantitative prediction for the composite permittivity.

Beyond the permittivity/dielectric-constant, a high breakdown strength and a low loss are additional prerequisites of the dielectrics operating under high electrical stress. Namely, for insulation materials, high permittivity allows for better stress relief, because the accumulated electrical stress can cause local discharge or flashover, leading to the system failure. Ceramics usually possess a large dielectric constant and good thermal stability, but suffer from low breakdown strength, poor flexibility and challenging processing conditions. Polymers, on the other hand, offer a high electric breakdown field, but their applicability is largely impeded by their intrinsic low permittivities ($\varepsilon'<10$). In addition, polymers possess many manufacturing advantages, including easy processing and large-scale fabrication with reduced cost, and they are also light and can exhibit good mechanical properties. Consequently, polymer based dielectric materials with a high dielectric constant and a low loss are very attractive in the insulation area and also for other capacitive applications.

From the composite point of view, traditional approaches to increase the dielectric constant of polymers are to introduce either high-permittivity ceramic fillers or conductive fillers. In the first approach, the magnitude of the improvement is very limited (around several times) at a reasonable filler loading, as can be predicted by the logarithmic mixing rule. Fundamentally, the great mismatch of the dielectric constant between fillers and polymers distorts and intensifies the internal electric field in the polymer matrix. As a result, the increase in the effective permittivity of these composites comes from the polymer polarization at an enhanced electric field, with very little from the ceramic phase. Highly inhomogeneous fields also reduce the effective breakdown strength of the composites. At high filler loadings, which are required to afford considerable enhancement in the permittivity, composites lose the desired mechanical properties and integrity.

In contrast to the first approach, the dielectric constant of the composites filled with conductive fillers could dramatically increase at a small filler concentration in the vicinity of, but below, the percolation threshold. Simply stated, conductive-particle/polymer composites exhibit an insulator-metal transition near the percolation threshold, which is characterized by an abrupt change in the conductivity and divergence in the permittivity above percolation, whereas they remain insulator below percolation. Structurally, the substantial increase in the dielectric constant arises from numerous microcapacitors (neighboring conductive particles separated by a thin dielectric layer in between). The large capacitance contributed by each of these microcapacitors is related with a significant increase in the local electric field when the conductive particles are close to each other near the percolation threshold. For instance, a dielectric constant of 400 with a weak frequency and temperature dependence was reported for Ni-PVDF composite when the Ni concentration approaches the percolation threshold. The two primary problems with the conductor-insulator composites are high dielectric losses and narrow processing window. Namely, (a) near the percolation threshold, there develop high internal electric field which result in increased motion of any available charge carriers, that is, a high dielectric loss. (b) the insulator-to-conductor changes are very abrupt, with steep slopes and abrupt transitions, within a narrow concentration range around the percolation transition, thus, precise control of the filler concentration and dispersion are required everywhere across the system for stable performance, a requirement which can be rather difficult especially in scaled-up manufacturing. Several strategies have thus been proposed to suppress the dielectric loss by avoiding the direct contact between conductive fillers. For example, an epoxy composite filled with the self-passivated aluminum particles enclosed by insulting $Al_2O_3$ layers could exhibit a high dielectric constant up to 100 and loss tangent as low as 0.02. In another study, silver nanoparticles were coated with thin organic shells, and these core-shell nanoparticles were used for the preparation of polymer composites that showed high permittivity of 400~500 with low loss tangent less than 0.05.

Theoretically, since the permittivity (effective dielectric constant) is proportional to the cumulative dipole moment (the number of opposite charges times their displacement), the shape, size and spatial arrangement of fillers are expected to have a significant impact on the dielectric properties. Towards this end, much research relied on the varying the geometric features of individual fillers, such as 1D carbon nanotubes or 2D graphite platelets, but less effort was focused on the design of the composite structure to capitalize on well-defined filler clusters; that is, design of preferential filler distribution, filler/filler preferential location in multifiller composites, controlled-size clustering of a filler within domains separated by a second filler or matrix, etc.

SUMMARY

A general embodiment of the disclosure is non-conducting high dielectric constant polymer composition comprising a polymer, an organic insulative filler, and conductive particle material, and wherein particles of the organic insulative filler are larger than the particles within the conductive particle material. In embodiments, the organic insulative filler has a platy shape and/or is an organoclay and/or a nanofiller. The conductive particle material can be carbon black, carbon nanotubes, clusters of carbon particles, graphite, insulating particles having conductive coatings, a metal, a metal alloy, or combinations thereof. In some embodiments, the organic insulative filler is a high aspect ratio dielectric filler. In embodiments, the organic insulative filler and conductive particle material form a structured composite in which the organic insulative filler separates particles of the conductive particle material. The dielectric constants of the individual components of the polymer composition, except for the conductive particle material, can have a dielectric constant of less than 6000. In some embodiments, the polymer is an elastomer. In specific embodiments, the polymer comprises 30-55% by weight of the polymer composition. In some embodiments, the conductive particle material comprises 5-40% by weight of the polymer composition. In some embodiments, the organic insulative filler comprises 1-7% by weight of the composition. The organic insulative filler can be an organoclay, such as an ammonia treated montmorillonite. In some embodiments, the conductive particle material has particle size range from 10-900 nanometers. The polymer composition can further comprise an inorganic filler, such as (Nb,In,)TiO2, rutile-TiO2, SiO2, ZnO, tin oxide, lead oxide, iron oxide, and calcium oxide. In embodiments the inorganic filler comprises 10-25% by weight of the composition. In specific embodiments, the dielectric constant of the elastomeric composition is 5-1000.

Another general embodiment of the disclosure is an electrical stress grading apparatus comprising a non-conducting high dielectric constant polymer composition comprising a polymer, an organoclay, and a conductive particle material, wherein the organoclay and conductive particle material form a structured composite in which the organoclay separates particles of the conductive particle material such that the composition is non-conducting. In some embodiments, the dielectric constant of the apparatus is 5-50. The conductive particle material can be carbon black, carbon nanotubes, clusters of carbon particles, graphite, insulating particles having conductive coatings, a metal, a metal alloy, or combinations thereof. In embodiments, the organoclay and conductive particle material form a structured composite in which the organoclay separates particles of the conductive particle material. The dielectric constants of the individual components of the polymer composition, except for the conductive particle material, can have a dielectric constant of less than 6000. In some embodiments, the polymer is an elastomer. In specific embodiments, the polymer comprises 30-55% by weight of the polymer composition. In some embodiments, the conductive particle material comprises 5-40% by weight of the polymer composition. In some embodiments, the organoclay comprises 1-7% by weight of the composition. The organoclay can be an ammonia treated montmorillonite. In some embodiments, the conductive particle material has particle size range from 10-900 nanometers. The electrical stress grading apparatus can further comprise an inorganic filler, such as (Nb,In,)TiO2, rutile-TiO2, SiO2, ZnO, tin oxide, lead oxide, iron oxide, and calcium oxide. In embodiments the inorganic filler comprises 10-25% by weight of the composition.

Another general embodiment of the disclosure is a method of making an electrical stress grading apparatus comprising providing a monomer, conductive particle material, an organoclay, a plasticizer, a curative, and an inorganic filler; mixing the monomer, the conductive particle material, the organoclay, the plasticizer, the curative, and the inorganic filler together under shear stress to form a polymer composition; and drying the polymer composition. The conductive particle material can be carbon black, carbon nanotubes, clusters of carbon particles, graphite, insulating particles having conductive coatings, a metal, a metal alloy, or combinations thereof. The dielectric constants of the individual components of the polymer composition, except for the conductive particle material, can have a dielectric constant of less than 6000. In some embodiments, polymerizing the monomer results in an elastomer. In specific embodiments, the polymer comprises 30-55% by weight of the polymer composition. In some embodiments, the conductive particle material comprises 5-40% by weight of the polymer composition. In some embodiments, the organoclay comprises 1-7% by weight of the composition. The organoclay can be an ammonia treated montmorillonite. In some embodiments, the conductive particle material has particle size range from 10-900 nanometers. The method can further comprise providing an inorganic filler, such as (Nb,In,)TiO2, rutile-TiO2, SiO2, ZnO, tin oxide, lead oxide, iron oxide, and calcium oxide. In embodiments the inorganic filler comprises 10-25% by weight of the composition. In specific embodiments, the dielectric constant of the elastomeric composition is 5-1000.

These and other aspects, objects, features, and embodiments will be apparent from the following description and the appended claims.

BRIEF DESCRIPTION OF THE DRAWINGS

The drawings illustrate only example embodiments of methods, systems, and data for different elastomeric compositions and should not to be considered limiting of its scope, as different compositions may admit to other equally effective embodiments.

FIGS. 22a-h are transmission electron microsopy of rubber, carbon black and organoclay at different magnifications. The scales are as follows: FIGS. 22a and 22e: 1 micrometer, FIGS. 22b and 22f: 500 nanometers, FIGS. 22c, 22g and 22h: 200 nanometers, FIG. 22d: 50 nanometers.

DETAILED DESCRIPTION OF EXAMPLE EMBODIMENTS

Figure 1A:
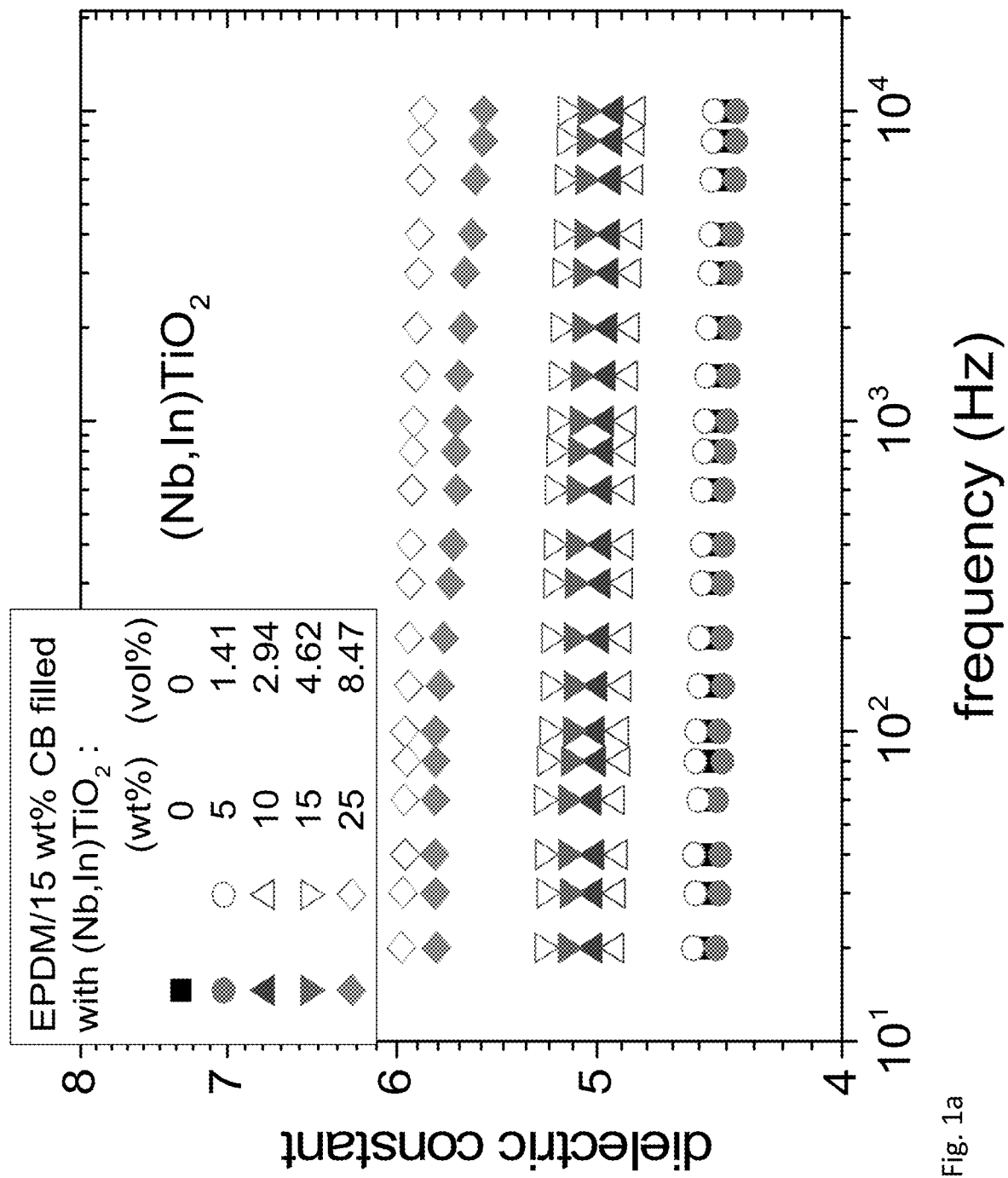
FIGS. 1a-j are the dielectric spectra of EPDM composites filled with different types of fillers measured at room temperature (FIG. 1a,c,e,g,i); where fitting based on the logarithmic mixing rule is performed on the experimental data of the composites (excluding the data of the matrix with 0% fillers) (FIG. 1 b, d, f, h, j).
Figure 1B:
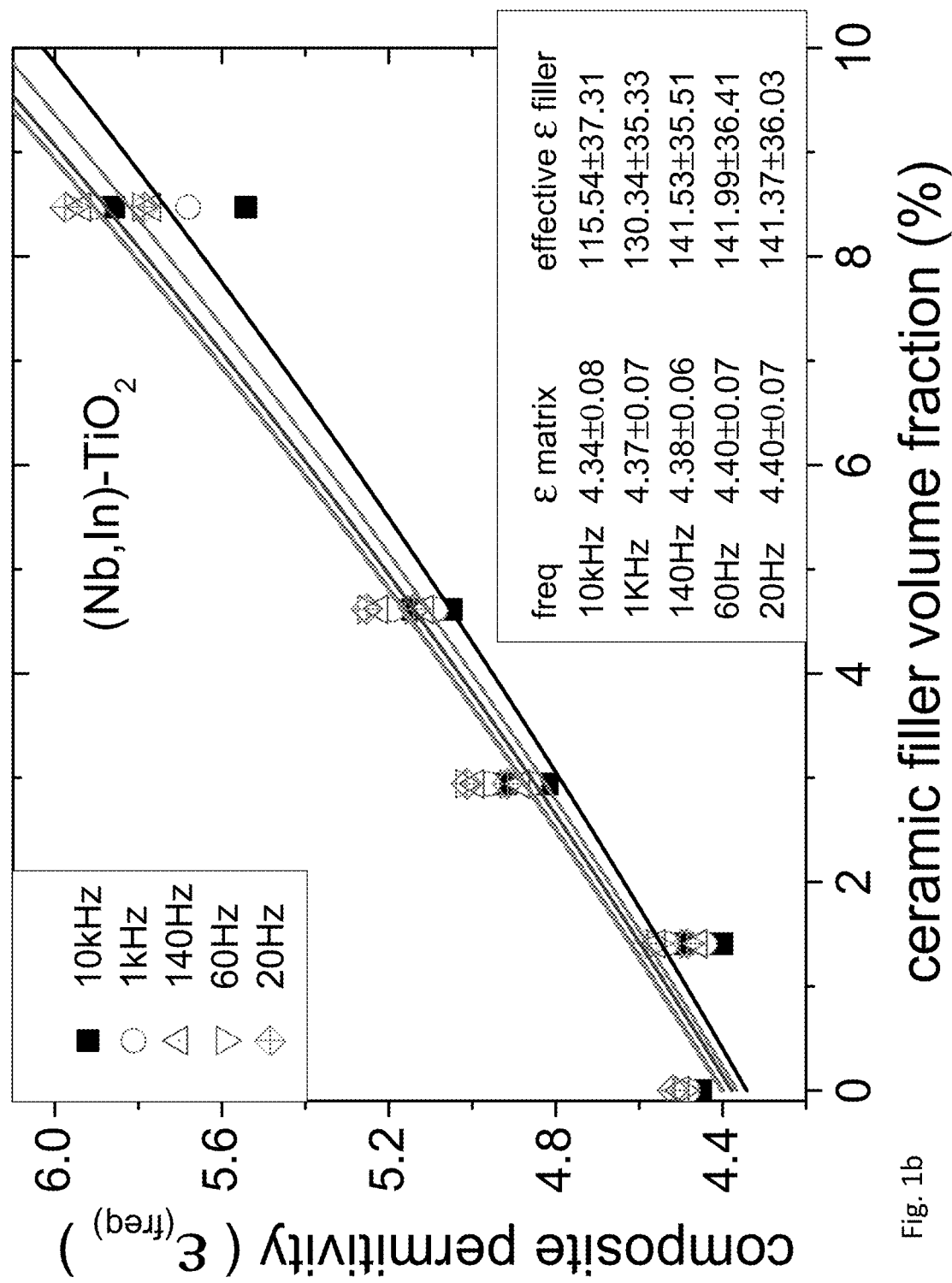
Figure 1C:
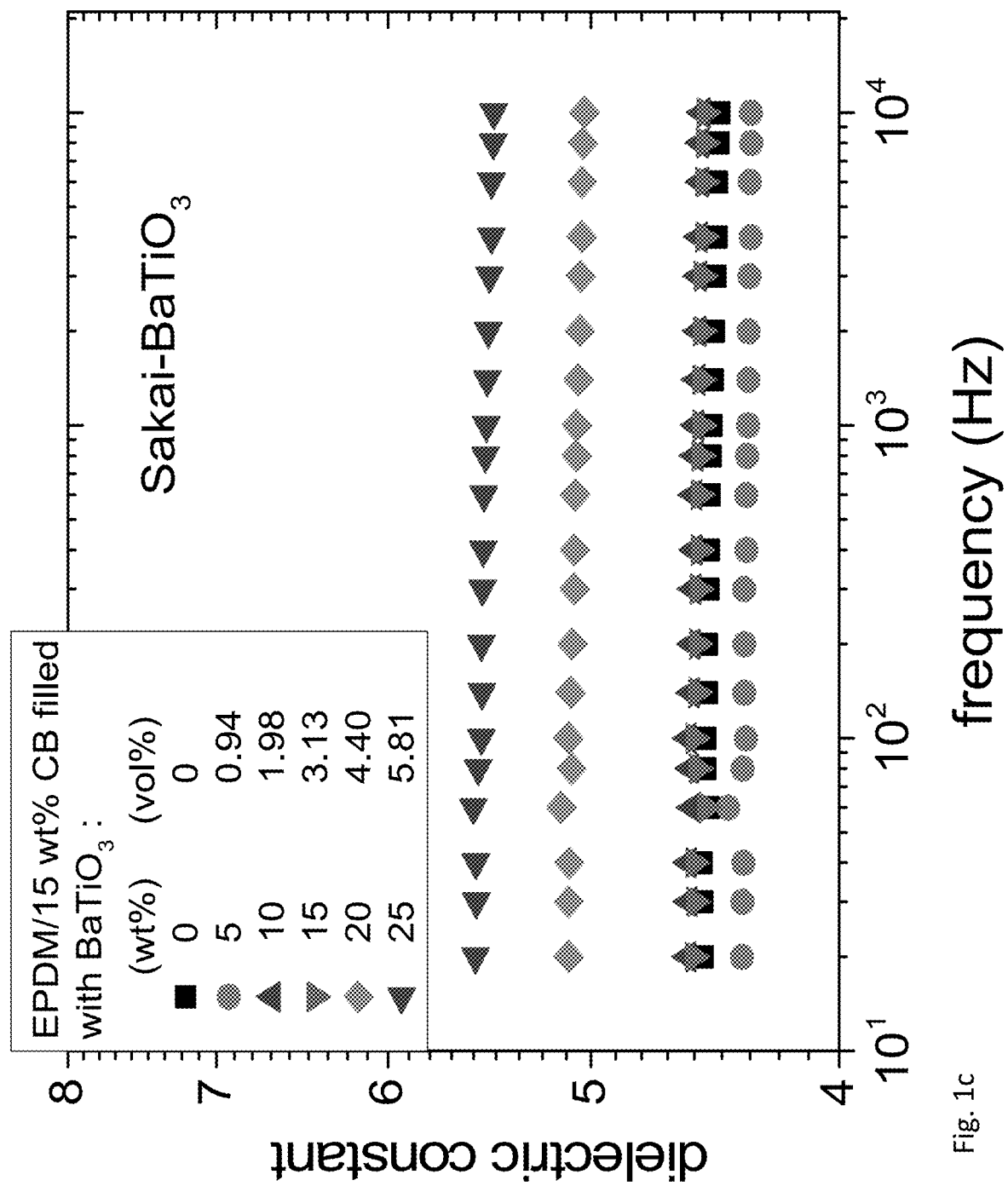
Figure 1D:
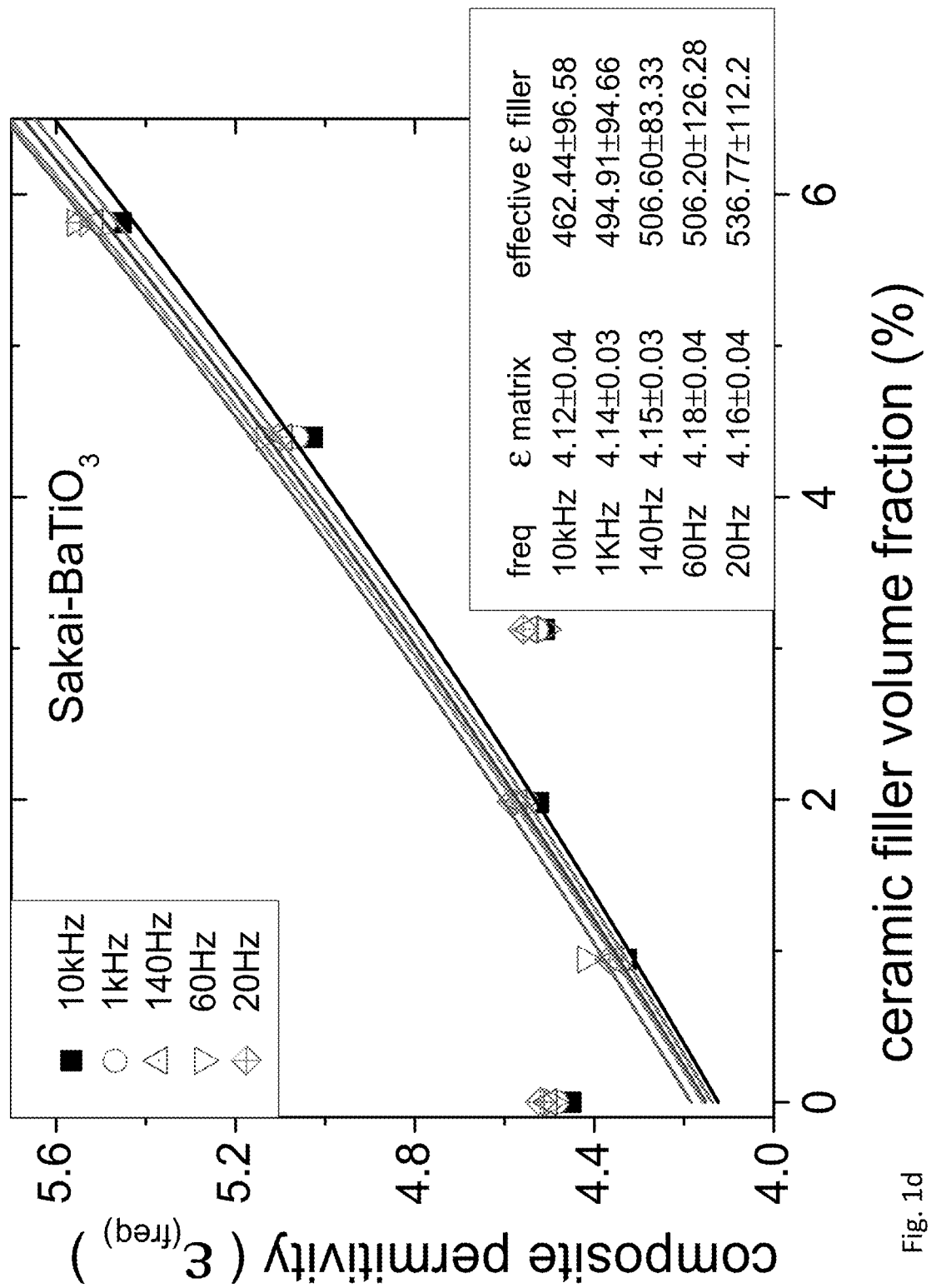
Figure 1E:
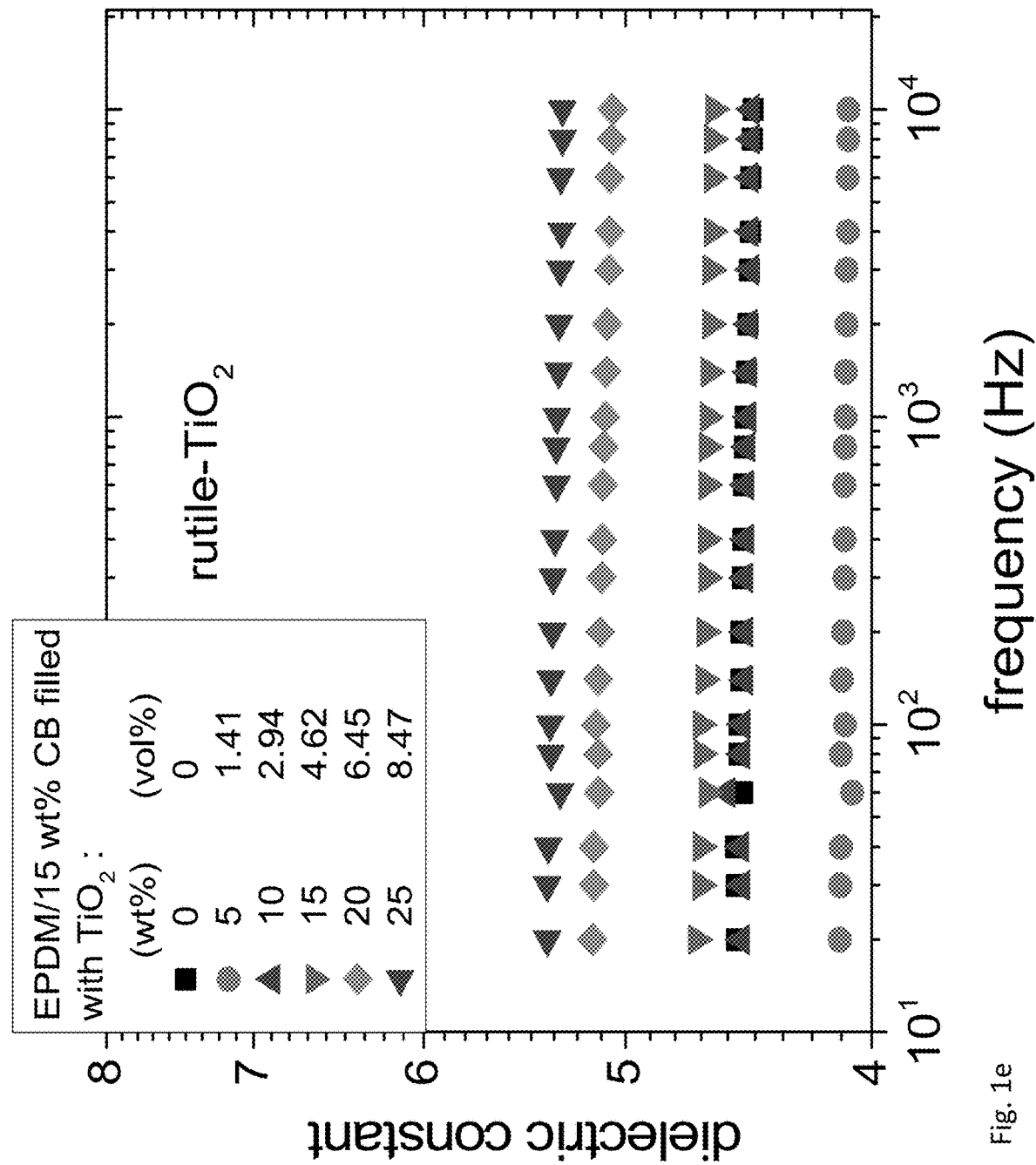
Figure 1F:
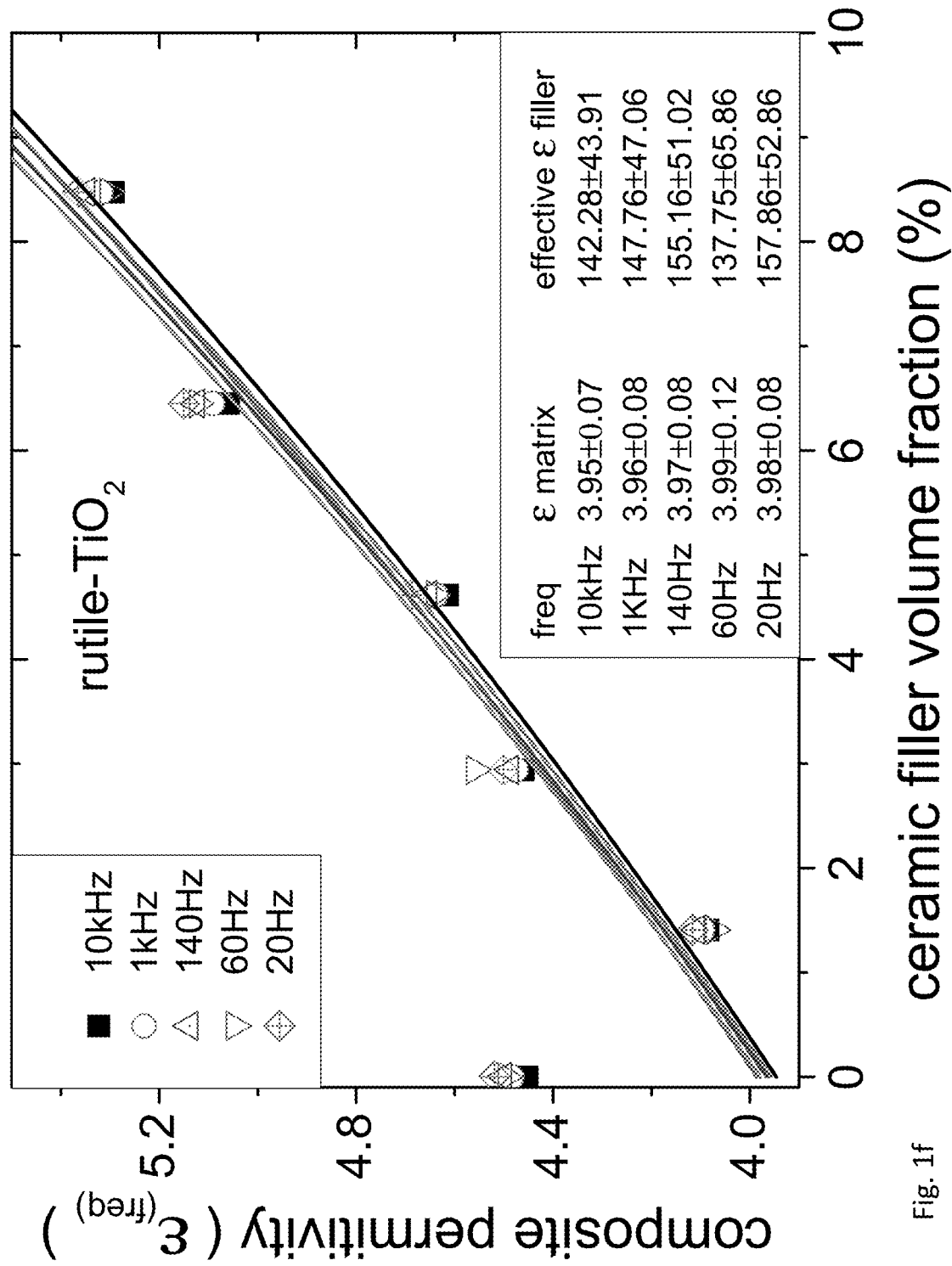
Figure 1G:
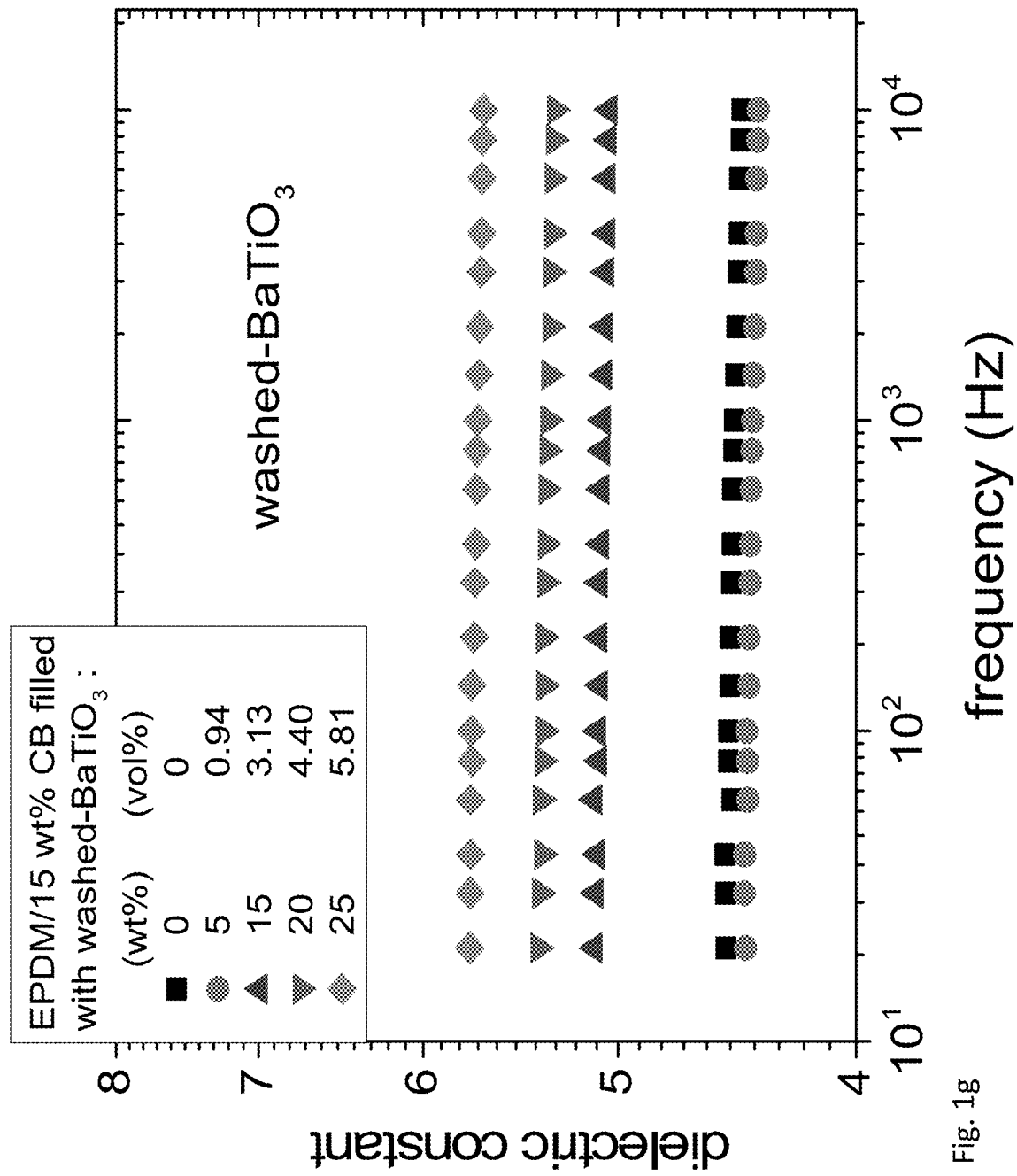
Figure 1H:
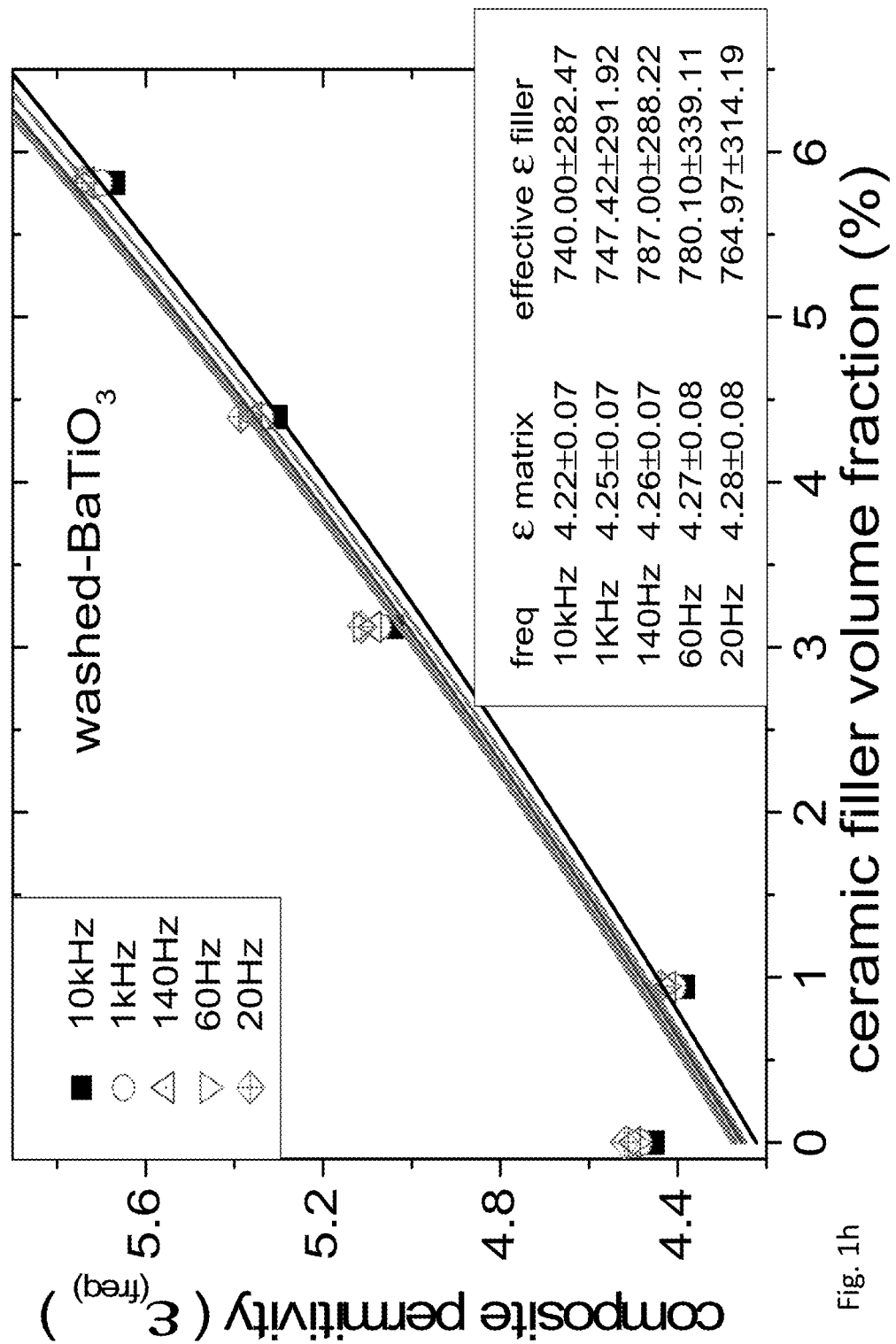

Embodiments of the disclosure focus on how "structuring" polymer-matrix composites can affect the dielectric properties of these composite materials. Structuring is defined as the extra filler distribution or extra composite morphology manipulation, beyond the thermodynamically-dictated filler dispersion. Specifically, polymer-matrix composites with two or more fillers were designed and manufactured, and structuring was realized by control of: high-aspect ratio dielectric nanofillers with preferential association with polarizable, dielectric or conductive, microfillers; dielectric nanofiller/conducting nanofiller preferential association; and sequestration of nanofillers in one phase of an multi-phase polymer blend. Both thermoplastic olefin and elastomeric olefin matrices were studied, and in all cases presented here, highly-enhanced materials properties were designed to originate from the structuring of the composites; that is, composite structuring (controlled filler/filler associations and filler dispersion) is designed to improve the composite properties far beyond what is achievable through the random dispersion of the same fillers in the same matrix. In embodiments, the origins of this behavior were traced to filler-cluster mechanisms, and/or synergies between fillers, or filler-cluster effects on the matrix response, specific to each system/structure/property. Given that the volume of current understanding of these new materials relies almost exclusively on the dispersion and specific relative placement of fillers within a matrix as the route to improve composite performance (achieved primarily through self-assembly after adjusting filler loading and interfacial parameters), the new knowledge disclosed here on how the composite structuring can yield performance enhancements, extra improvements, or even new properties, opens new directions in the design of, and bears high promise for progress in, these and similar (nano)composite materials, including multi-filler polymer composite and polymer hybrid systems.

The present disclosure also relates to the effect of filler permittivity and interface on the dielectric constant of a polymer composite. In some embodiments, the polymer composite is an elastomer. In embodiments, ethylene propylene diene monomer rubber (EPDM) is chosen as the polymer matrix. It has many applications in outdoor insulation because of its excellent resistance to (ozone, oxidants and severe weather conditions), chemical and heat resistance, mechanical and dielectric qualities. A variety of particulates with different chemical compositions and largely-varied dielectric constants (from 4 to 60000) were used as fillers in the following examples.

Embodiments of the disclosure include a high dielectric constant (high-K) polymer composite composition comprising a polymer, carbon black (CB), one or more inorganic fillers, and organoclay (OC), plus additives (plasticizer, crosslinking and processing agents). The disclosed composition is referred to herein as a "CB/OC polymer" when related to an elastomer composition specifically. Any of the polymer composition disclosed generically herein may be elastomeric. In embodiments of the disclosure, the formulation is not dependent on any raw material with inherent high-k or any metal oxide varistor type material that changes conductivity with applied voltages. Embodiments of the disclosure instead use distributed electric-fields and polarizability with barrier material. This allows for a high-k material through polarizability with limited large-scale electron sharing. Embodiments of the composition work with either zinc oxide filler with dielectric constant of ~10 or barium titanate filler with a dielectric constant ~6200, for example. Other embodiments include silica, titanium oxide, or modified barium titanates.

Existing high-k material uses ceramics or various inorganic fillers with high dielectric constants, in some cases a high dielectric constant polymer, such as epichlorohydrin, to increase the dielectric constant. The loading of fillers needed to create high dielectric constant material drastically changes the physical properties of the matrix material. Very high loading of ceramic powders in a polymer matrix reduce the flexibility of the polymer and can lead to cracking. One embodiment of the compositions, apparatus and method disclosed is able to create very high dielectric constant material with very little impact on the physical properties of the polymer matrix.

Current high-k materials also depend on relatively expensive and dense (BaTiO3, TiO2, ZnO, etc.) fillers that increase the density and limit the ability of materials to be elastic. The CB/OC polymer is capable of creating material with a dielectric constant ranging over four orders of magnitude while the tan δ (dielectric loss) varies by less than an order of magnitude. In carbon black only systems, the dielectric loss increases linearly with black filler above the percolation limit of the carbon black. The disclosed composition uncouples the dielectric constant from the dielectric loss. In some embodiments, the composition does not comprise any halogen material.

An embodiment of the disclosure is a polymer composition, such as an elastomer, comprising carbon black and organically modified clay (organoclay) to create a high dielectric strength material which may be used with or without additional fillers. This embodiment may also be used with a lower content of dielectric filler. The organoclay is a mica-type layered aluminosilicate clay (such as montmorillonite, kaolinite, hectorite, bentonite, or vermiculite, or synthetic equivalents) modified with an organic molecule (coupling agent/surface treatments, such as ammonium surfactants, or silanes). The carbon black and organoclay work together to locally increase the carbon black concentration around the organoclay fillers, so as to allow for sharing of the electron cloud creating a polarized phase within the bulk of the material, while at the same time prevent electron transport across the whole structure (that is, prevent dc conductivity). In some embodiments, the loading of the clay is kept small to maintain the bulk material properties. In some embodiments, the material creates micro-capacitors in the material that combine to influence the permittivity. The increase in permittivity is due to the combined influence of the micro-capacitors and not due to the inherent permittivity of the individual components.

In embodiments of the disclosure, the dielectric constant of the CB/OC elastomer is influenced by the clustering and morphology of the carbon black and the surface chemistry of the carbon black. The influence of the organoclay is dependent on surface texture, particle size and surface modification chemistry. In embodiments of the disclosure, the organoclay is an organically modified bentonite or montmorilonite clay. In embodiments of the disclosure, the relatively small changes in the levels of the carbon black and organoclay indicate that the physical properties will vary slightly, and can be tailored with standard compounding materials. In embodiments of the disclosure, the CB/OC elastomer does not require any special chemicals or extra processing of raw material or mixture techniques to produce. In embodiments, the CB/OC elastomer has a high permittivity created by interaction between materials and not through the inherent permittivity of each material. In embodiments of the disclosure, the dielectric constant can be adjusted through relatively small changes in materials so overall physical properties of the elastomer are minimized. Embodiments of the disclosure are able to substantially uncouple the dielectric constant and the tan-delta. In embodiments of the disclosure, the permittivity of the CB/OC elastomer has a substantially linear response to temperature. In embodiments of the disclosure, the permittivity can be easily adjusted with small changes to composite formulations, such as filler and additive loadings. In embodiments of the disclosure, the CB/OC elastomer is not conductive.

An embodiment of the CB/OC polymer of the disclosure comprises a polymer, an insulative filler, and a conductive particle. In embodiments of the disclosure, the insulative filler has a platy shape. In embodiments of the disclosure the insulative filler is an organoclay or a nanofiller. In embodiments of the disclosure the conductive particle is carbon black, carbon nanotubes, clusters of carbon particles, graphite, insulating particles having conductive coatings, a metal, a metal alloy, or combinations thereof. In some embodiments, the insulative material is a high aspect ratio dielectric filler. In embodiments, the insulative filler and conductive particles form a structure in which the insulative filler separates the conductive filler particles. The CB/OC polymer can additionally comprise one or more of an inorganic filler, a plasticizer, modifiers for environmental protection (thermal, uv, etc.), viscosity modifiers, physical property modifiers, special purposes chemicals (color, flame retardant, etc.) and other processing additives dependent on polymer. In embodiments of the disclosure, the polymer, such as an elastomer, comprises 20-80%, 30-55%, or 35-50% by weight of the CB/OC polymer. In embodiments of the disclosure, the organoclay comprises 0.2-15%, 0.5-10%, 1-7%, 3-8%, or 3-6% by weight of the CB/OC elastomer. In embodiments of the disclosure, the carbon black comprises 5-40%, 20-35%, 16-31%, 25-29%, 5-10%, 10-20%, 20-30%, 30-35%, 5-15%, or 16-25% by weight of the CB/OC polymer. In embodiments of the disclosure, the ratios of carbon black to organoclay range from 40:1 to 1:2. In embodiments of the disclosure, the CB/OC polymer has a dielectric constant of between 5-1000, 7-50, or 10-30. As used herein, high-k refers to a dielectric constant of greater than 5. In embodiments of the disclosure, the CB/OC elastomer has tan delta less than 10%, 7%, 5%, 3%, or 2% at 60 Hz. In embodiments of the disclosure, the CB and the organoclay form structured composites within the CB/OC polymer. In some embodiments, the dielectric constants of the individual components of the polymer except for carbon black have a dielectric constant of less than 10,000, less than 8,000, less than 6,000, less than 4,000, less than 2,000, less than 1,000, less than 500, less than 250, less than 200, less than 150, less than 100.

The CB/OC polymer may be a single type of polymer, or a mixture of different polymers. The polymer may be thermoset, thermoplastic, elastomeric, or a two phase material. The polymer may be a thermoplastic polymer, for example polyethylene or polypropylene. The polymer may also be adhesives, for example ethylene-vinyl-acetate. The polymer may be a thermosetting material, for example epoxy resins.

The CB/OC polymer may be an elastomer or a two phase material such as a thermoplastic elastomer. The elastomer can be synthetic and natural. For example, the elastomer may be an ethylene propylene diene monomer (EPDM) polymerized rubber, silicone, EVA, nitrile rubber, EP rubber (general), SBR, NBR, HNBR, or Butyl CPE, for example. For polymerization, one or more curatives is added to the monomer. Curatives used can be conventional curatives or organic peroxides, specifically, dicumyl peroxide (di-CUP), for example.

In embodiments of the disclosure the insulative filler is an organoclay, such as a montmorillonite organoclay treated with quaternary ammonium. In specific embodiments the montmorillonite is I44P, Cloisite 15A, Cloisite 20A, or other organically modified montmorillonite (MMT) or synthetic equivalents (such as fluorohectorite and fluoromicas). The ammonium used to treat clay may be a Dimethyl-ditallow-ammonium or similar size surfactant exchanged at "exchange capacity", for example, dimethyl-dioctadecylammonium, dimethyl-dihexadecyl-ammonium, dimethylhexadecyl-octadecyl-ammonium, etc. at about 35-45 wt. % of organic in the OC, for this CEC). In embodiments, the dimension of single particle organoclays is 1 nm in thickness and 200 nm-2000 nm in lateral dimensions, that can be individually dispersed or agglomerated. In one embodiment the organoclay agglomerates as specified as 70% through 400 mesh.

The conductive material can be carbon black, such as an ultra-clean carbon black, for example, the carbon black has a low level of grit and impurities. In some embodiments, the carbon black is furnace grade. In specific embodiments, the carbon black is cabot Spheron™ 6000, Conductex™, or a mixture thereof. In embodiments of the disclosure, the carbon black is N400-N800 on the grade scale of carbon black.

The composition can cinclude an inorganic filler and the inorganic filler can be any inorganic material, for example a ceramic or a metal oxide. The inorganic filler is usually cheaper than the polymer material used. In embodiments of the disclosure, the inorganic filler is one or more of a ceramic and a metal oxide. The inorganic filler may be paraelectric or ferroelectric. For example the inorganic filler could be one or more of BaTiO3, (Nb,In)TiO$_2$, rutile-TiO$_2$, or SiO2. In embodiments, the metal oxide is one or more of ZiO, tin oxide, lead oxide, iron oxide, and calcium oxide. In embodiments of the disclosure, if added, the inorganic filler comprises 5-40%, 10-25%, or 13-20% by weight of the CB/OC polymer. In embodiments of the disclosure, the ceramic is micron sized. In some embodiments metal oxides are added not as filler or to adjust the dielectric constant but to change the color of the polymer material. For example titanium oxide can be added to result in a white colored material.

In embodiments of the disclosure, the CB/OC elastomer is made from monomers, a curative, a plasticizer, carbon black, an organoclay, and a curing agent. The CB/OC elastomer may be made by a currently know method, by mixing all of the individual material together. For example, all of the individual components can be added to an internal mixer machine and then molded in a desired shape. The material composite material may be prepared sing an two roll mill or in the case of liquid polymers, by any suitable mixing method based on the type of polymer and expected viscosity of the mixed solution. An embodiment of the disclosure is a method of making an electrical stress grading device comprising mixing together a monomer, carbon black, and an organoclay.

Embodiments of the disclosure include electrical stress grading apparatus made from a CB/OC polymer, which comprises a polymer such as an elastomer, carbon black, and an organoclay, as described above. The electrical stress grading apparatus can be formed as a tube or a termination, such as a cold shrink termination.

Embodiments of the disclosure is a high dielectric constant polymer composition where the dielectric properties are controlled by the structure of the material rather than the intrinsic dielectric constant of the ingredients. In some instances, the increase in dielectric constant is controlled by polarizability and in specific embodiments, it is controlled by polarizability with limited electron sharing. The increase in dielectric constant can also be created through the use of distributed electric fields. In specific embodiments, the increase in dielectric constant is created through the use of distributed electric fields and polarizability with or without limited electron sharing. As described above, the polymer may be thermoplastic, thermoset or elastomer. In some embodiments, the dielectric constant can be varied by 4 orders of magnitude and dielectric loss only varies by one order of magnitude.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

Example 1

Low Carbon Black (CB) and Varied Type/Varied Loading Inorganic Fillers

Materials and sample preparation: Dicumilperoxide (DCP) and Paraffin oil (Saybolt viscosity at 100° F. is 345~355 second) were used as received. Carbon black (Spheron 6000) and Ethylene propylene diene monomer (EPDM, Vistalon 5420) were used.

Sakai-BaTiO3 (Sakai BT-04) is a commercial filler with 400 nm nominal particle size and claimed-permittivity of 3060. Washed-$BaTiO_3$ was prepared based on the Sakai-$BaTiO_3$: the as-received Sakai-$BaTiO_3$ powders were blended with distilled water; the solution were stirred overnight allowing for the ionization and then dried in an oven at 80° C.; the dried solids were grinded to powders. Ferro-$BaTiO_3$ (ZL9000, Ferro Electronic Materials) is another commercial barium titanate with a higher permittivity value of 9000 and particle size of 0.6~1.7 micron ($D_{10}$=0.6 μm, $D_{50}$=1.1 μm, $D_{90}$=1.7 μm). The as-received Ferro-$BaTiO_3$ particulates were sieved (200 mesh) before use, to screen coarse agglomerates (>200 mesh, labeled as Ferro-$BaTiO_3$-large) and fine agglomerates (<200 mesh, labeled as Ferro-$BaTiO_3$-small).

Rutile-$TiO_2$ (Alfa Aesar 43047, 99.5% minimum purity) is a 1~2 micron sized commercial filler with permittivity around 260. (Nb+In) co-doped rutile was synthesized by: mixing the as-mentioned rutile-$TiO_2$, $In_2O_3$ (Alfa Aesar 12544, 99.99% purity) and $Nb_2O_5$ (Alfa Aesar 11366) with 23:1:1 weight ratio; heating the as-mixed powders at 1350° C. for 4 hour, then natural-cooling; grinding the fired pellet into powders. By introducing both donor ($Nb^{5+}$ ion) and acceptor ($In^{3+}$) heteroatomic substitutions into rutile-$TiO_2$, the synthesized $(Nb,In)TiO_2$ exhibited a dielectric constant of 60000 at 100 Hz (room temperature). This value is in agreement with the literature report.

Composites were prepared by mixing EPDM, inorganic fillers, and CB particles, along with plasticizer (paraffin oil) and peroxide curing agent (DCP), all in one shot, inside a lab-scale twin-head kneader. All materials were dried [2 h minimum to 12h maximum (typically overnight) at 80° C. under low vacuum] prior to compounding. The twin-head kneader was operated at 160° C. for 5 min at low shear rates, rpm<100; the mixed composites were then hot-pressed at 170° C. for 5 minutes (without prior roll milling) to make cross-linked plate-specimens. The composite formulation regions are summarized in Table 1.

TABLE 1

Formulations of EPDM composites with low 5-25 wt % CB and inorganic fillers

| | weight percentage (%) | | PHR (parts per hundred rubber) | | |
|---|---|---|---|---|---|
| | Carbon Black | dielectric inorganic filler | rubber | parafin | DCP |
| Min | 0 | 0 | 100 | 0 | 0.5 |
| Max | 30 | 35 | 100 | 50 | 10 |
| Typical | 15 | 20 | 100 | 30 | 5 |

Instrumentation: The ASTM D150-11 standard test method was used for dielectric characterization and analysis, with a charge measurement equipment and a temperature-controlled chamber Delta 9023, allowing dielectric permittivity and ac loss quantification as a function of frequency from 20 Hz to 10 kHz at room temperature. 1 volt electrical potential was applied to the samples for each frequency. The instrument provides the complex capacitance, with real and imaginary parts as the output data (collected by a Stanford Research Lock-In amplifier SR830 DSP). Using parallel plate geometry in a two terminal configuration, these capacitance values are converted to the relative dielectric permittivity values for each frequency. To be able to use parallel plate capacitor geometry, 4 $cm^2$ colloidal silver electrodes (4×1 cm) were painted on both sides of the "films".

Discussion: EPDM composites filled with a variety of fillers were prepared and their dielectric properties (at the room temperature) were measured, shown in FIG. 1a-j, in order to study the effect of filler permittivity on the dielectric constant of composites. The selected fillers include paraelectric fillers (such as rutile and silica) and ferroelectric fillers (barium titanate), exhibit a wide range of dielectric constant values from 4 for the silica to 60000 for the co-doped rutile, and are of similar particle size which is directly related with the filler interfacial areas (Table 2).

Figure 1I:
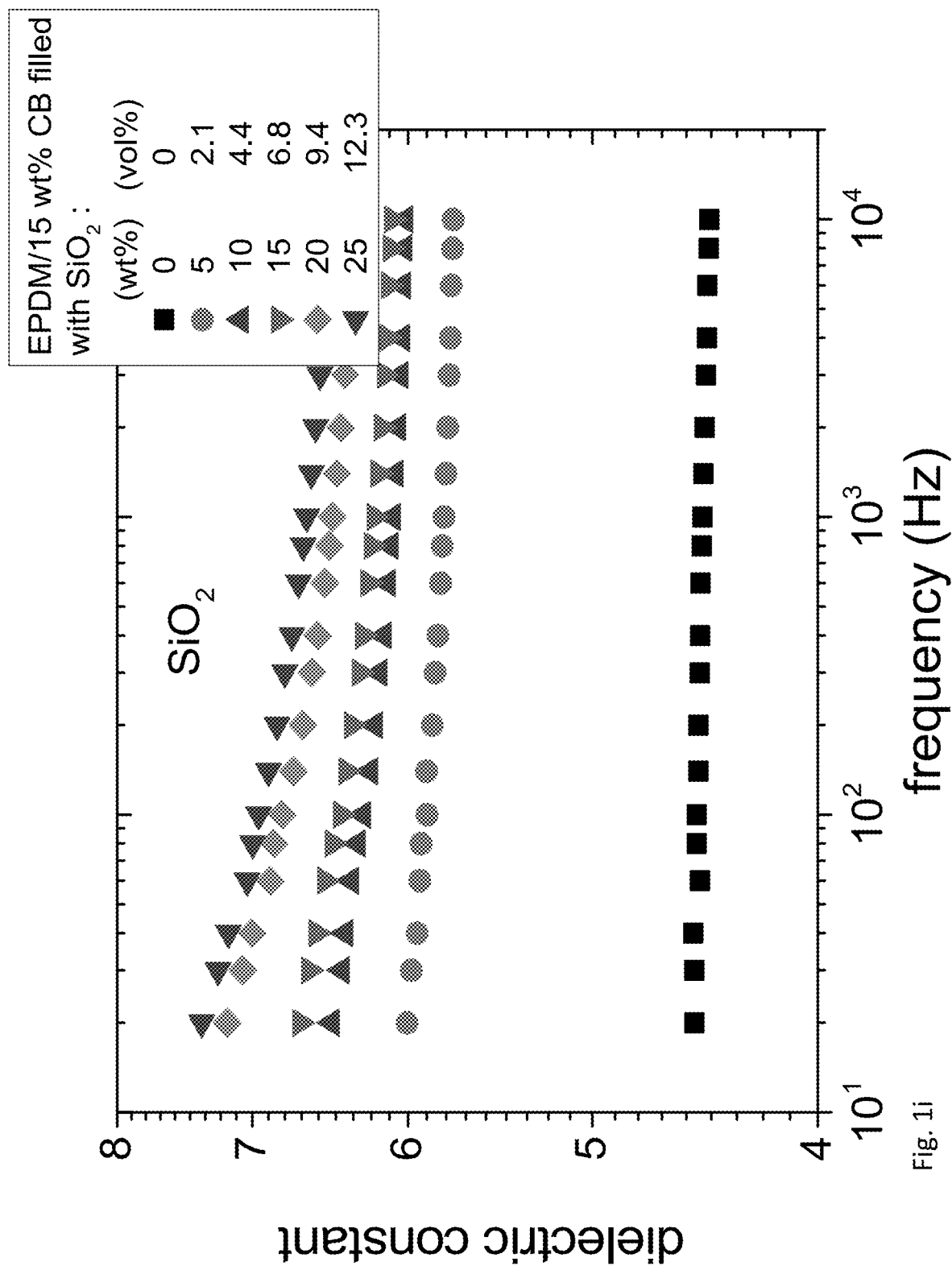
Figure 1J:
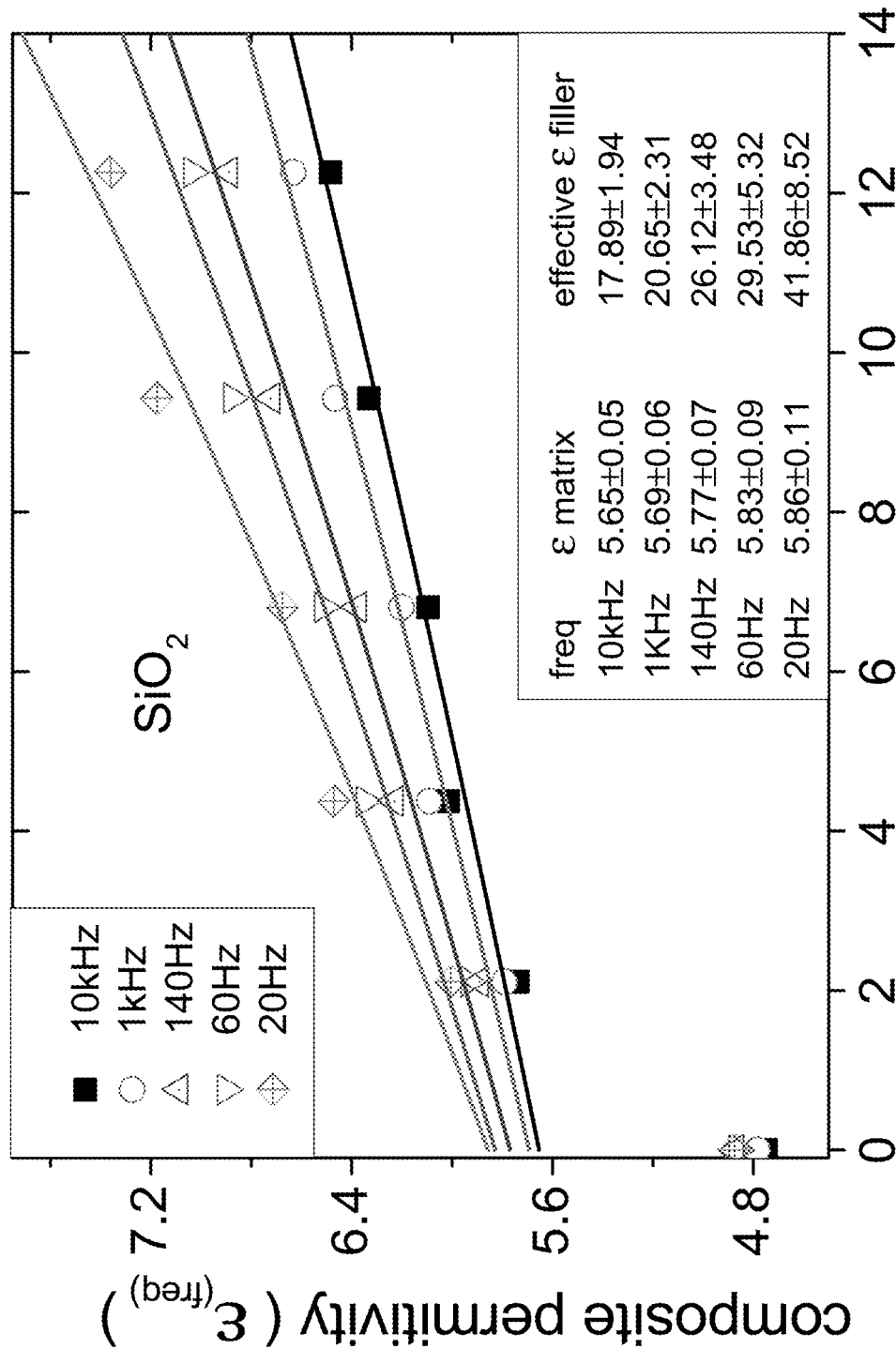

As shown in FIG. 1a-j, no dielectric relaxation can be identified in the spectra for all samples except for the silica composite, which can be expected, since EPDM polymer is a nonpolar elastomer and the resonant frequency of polarization for each inorganic filler is beyond the frequency window of the measurement. On the other hand, the low frequency dielectric dispersion in the silica composite reflects the interfacial polarization of space charges, or Maxwell-Wagner-Sillars (MWS) polarization, which might be associated with ions, surfactants or chemical leftovers on the silica surface (FIG. 1i and FIG. 1j). The dielectric constant of the composites increases with filler concentration, in line with any mixing rules.

For the composites not containing silica, it is interesting to find that there is an unexpected drop in the permittivity for the composites with the lowest filler loading (5 wt % dielectric filler). More pronounced demonstration is depicted in the right column of FIG. 1 (FIGS. 1b, d, f, h, and j), where the dielectric constants of the composites at the selected frequencies are plotted as a function of filler concentration (cf. $\varepsilon_{(0\ wt\%\ filler)}$ VS. $\varepsilon_{(5\ wt\%\ filler)}$). The initial drop in the permittivity is evidence of the existence of the interface (filler-EPDM or filler-CB) and its detrimental effect on the dielectric constant. Namely, if the influence of the interface (negative contribution to the permittivity) outweighs the effect of the fillers (positive contribution) when the filler concentration is small, the unexpected decrease in the permittivity can be understood. As a result, fitting based on the logarithmic mixing rule is only performed on the experimental data of the composites [excluding the data of the matrix (herein the EPDM rubber filled with 15 wt % CB is regarded as the matrix)], in order to take into account of the interfacial effects. The fitting results ($\varepsilon_{effective(matrix)}$ and $\varepsilon_{effective(filler)}$ are included in each fitting diagram (right column FIG. 1 (FIGS. 1b, d, f, h, and j)) and summarized in Table 2.

TABLE 2

Particle size, bulk filler permittivity, and effective filler permittivity in the EPDM composites

| filler | particle size (µm) | $\varepsilon_{(filler)}$ | $\varepsilon_{effective(filler)}$ | | | | |
|---|---|---|---|---|---|---|---|
| | | | 20 Hz | 60 Hz | 140 Hz | 1000 Hz | 10000 Hz |
| (In,Nb)TiO$_2$ | 1~2[1] | 60000 | 141.37 | 141.99 | 141.53 | 30.34 | 115.54 |
| rutile-TiO$_2$ | 1~2 | 260 | 157.86 | 137.75 | 155.16 | 147.76 | 142.28 |
| Sakai-BaTiO$_3$ | 0.4 | 3060 | 536.77 | 506.2 | 506.6 | 494.91 | 462.44 |
| SiO$_2$ | 1~5 | 4 | 41.86 | 29.53 | 26.12 | 20.65 | 17.89 |
| Ferro-BaTiO$_3$ | (small) 0.6~1.7 | 9000 | 327.46 | 374.71 | 333.37 | 309.55 | 301.87 |
| Ferro-BaTiO$_3$ | (large) 0.6~1.7 | 9000 | 600.77 | 604.64 | 570.28 | 564.78 | 549.7 |
| washed-BaTiO$_3$ | 0.4[2] | 3060 | 764.97 | 780.1 | 787 | 747.42 | 740 |

The extrapolated matrix-permittivity ($\varepsilon_{effective(matrix)}$, as shown in FIGS. 1a-j is lower than the measured value ($\varepsilon_{(matrix)}$=4.5), again indicating the unfavorable interfacial effect on the dielectric constant.

Figure 2:
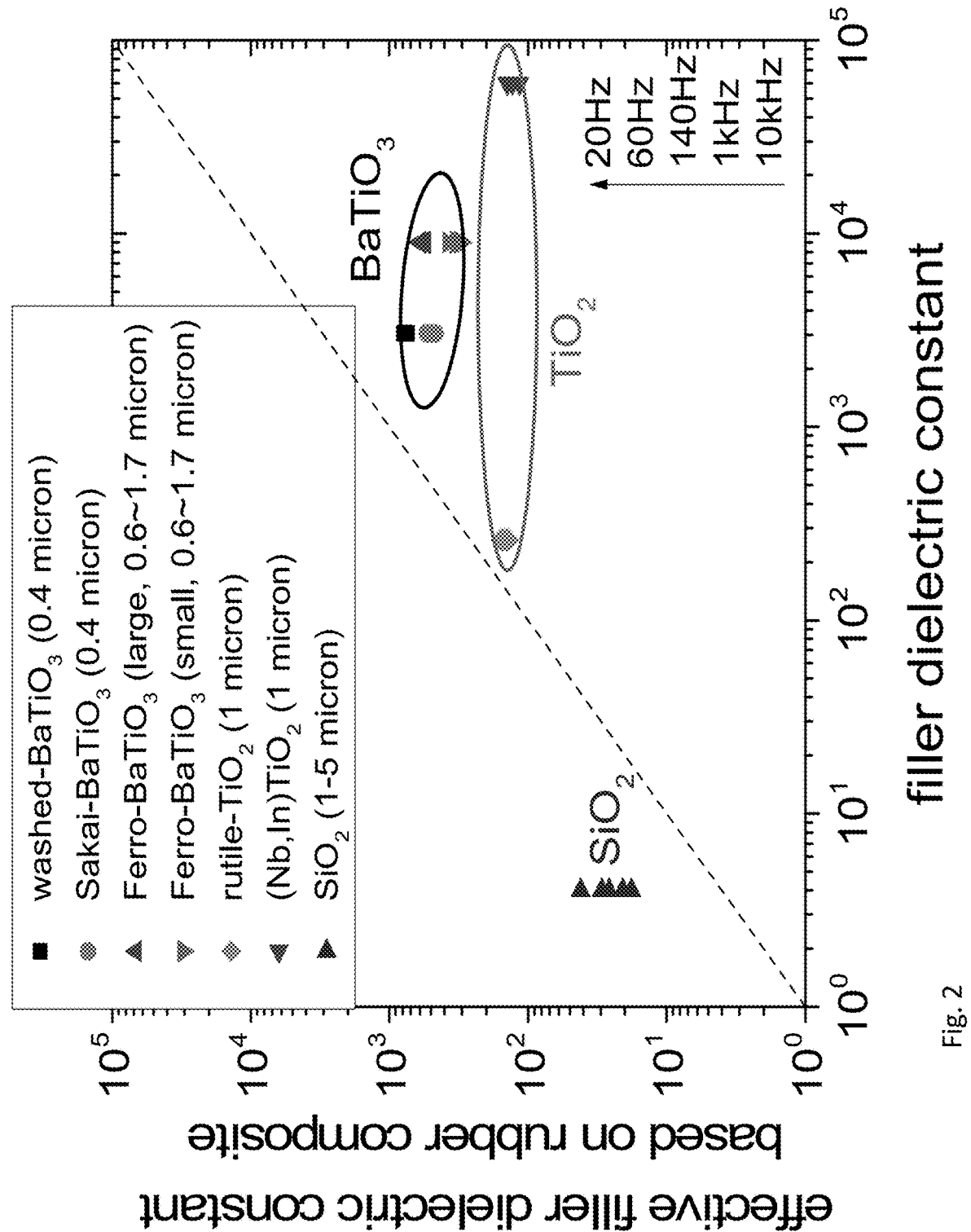
FIG. 2 is a comparison between effective filler permittivity (at different frequencies) and bulk filler permittivity. The dashed-line is a guide to the eyes, corresponding to 1:1 relation.
Figure 3A:
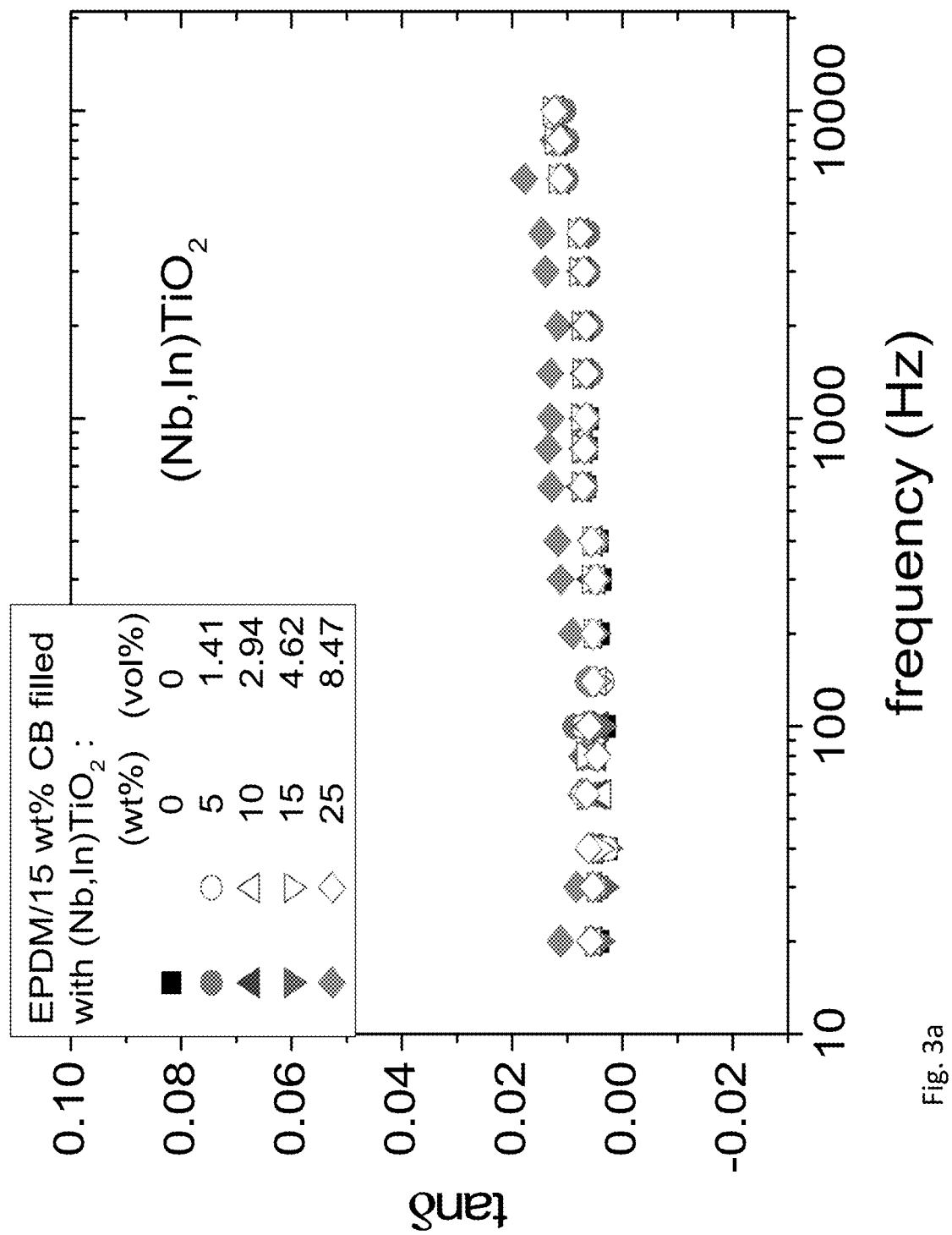
FIGS. 3a-e are the dissipation factor (tan δ-loss) of the investigated composites.
Figure 3B:
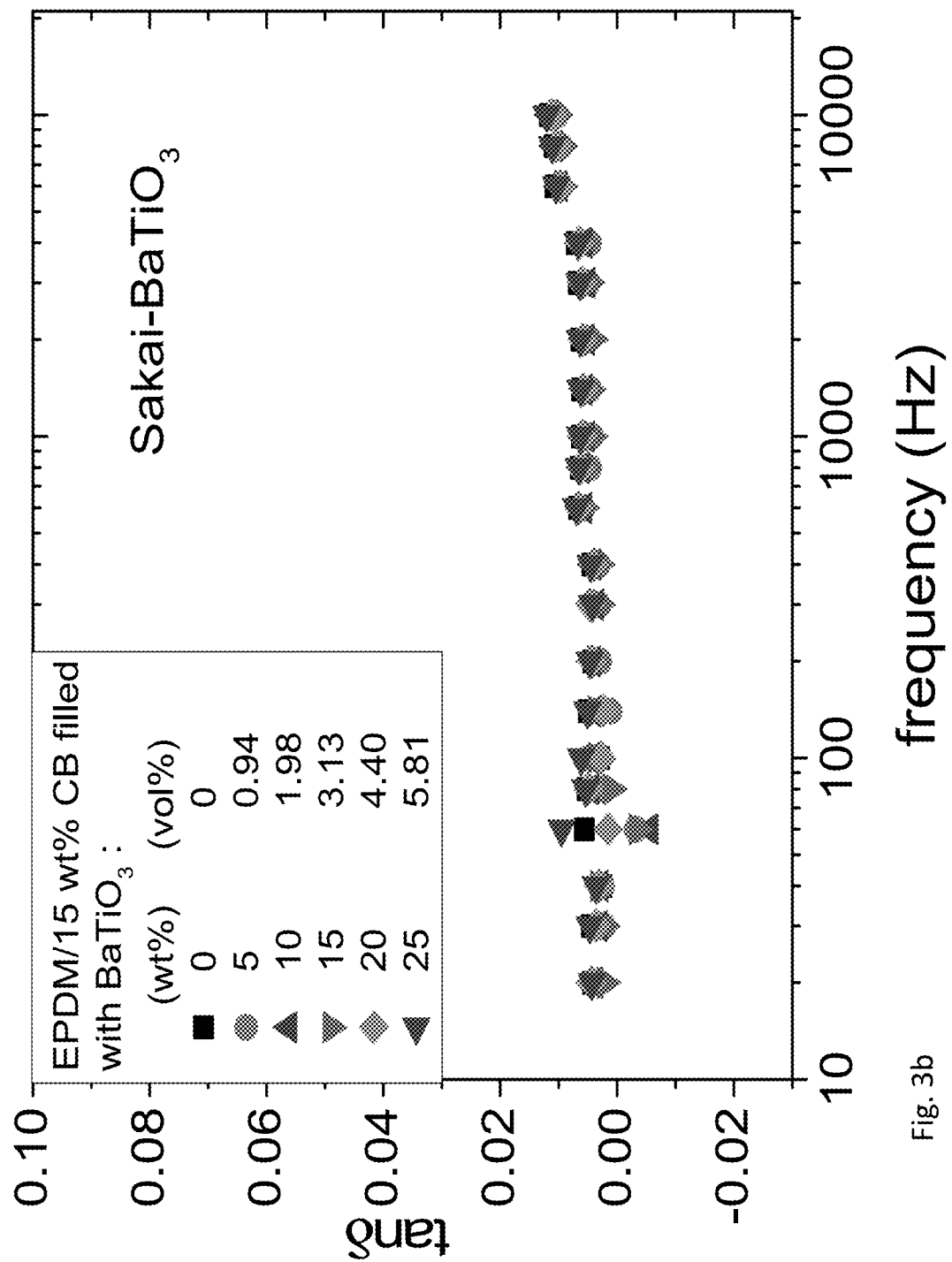
Figure 3C:
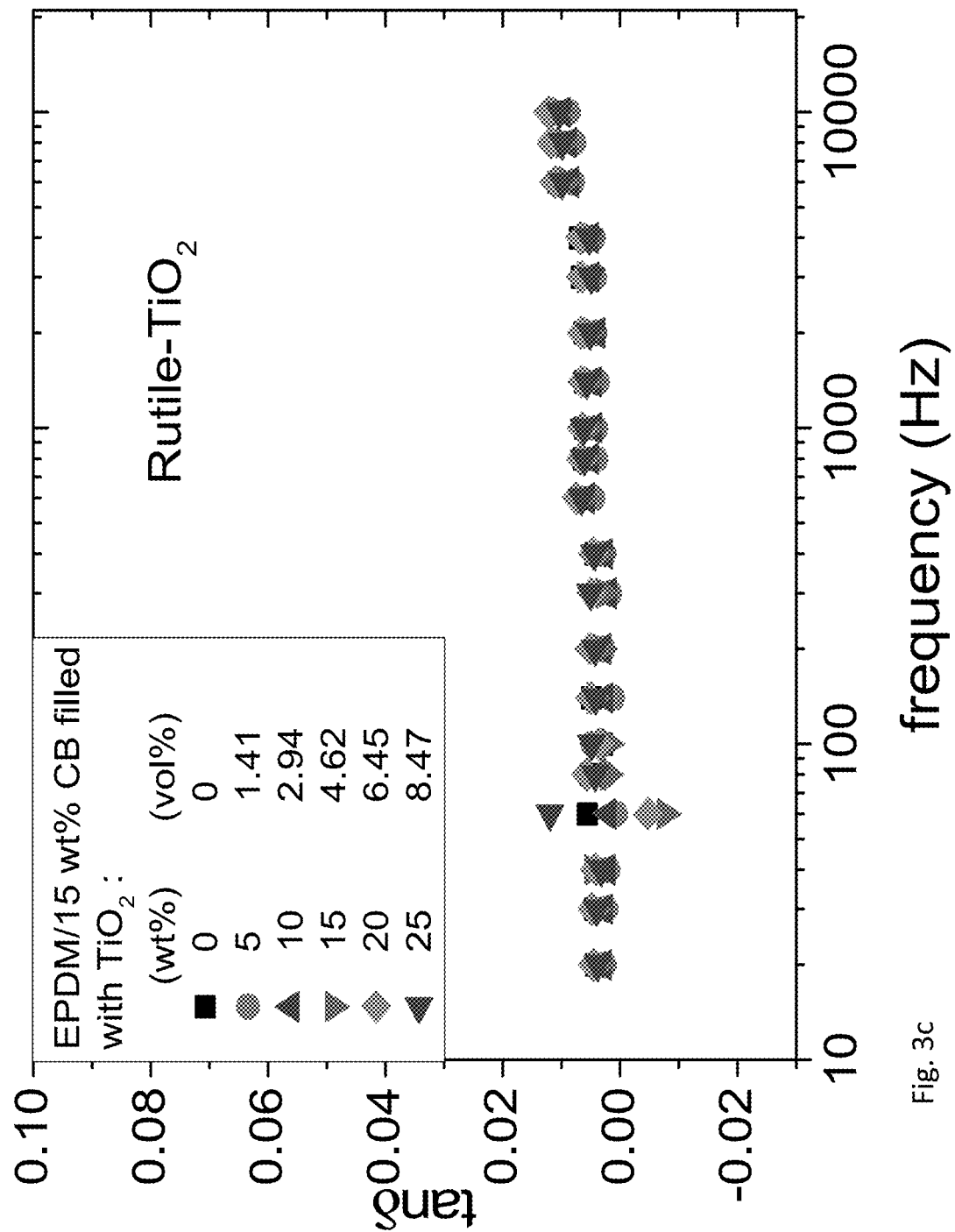
Figure 3D:
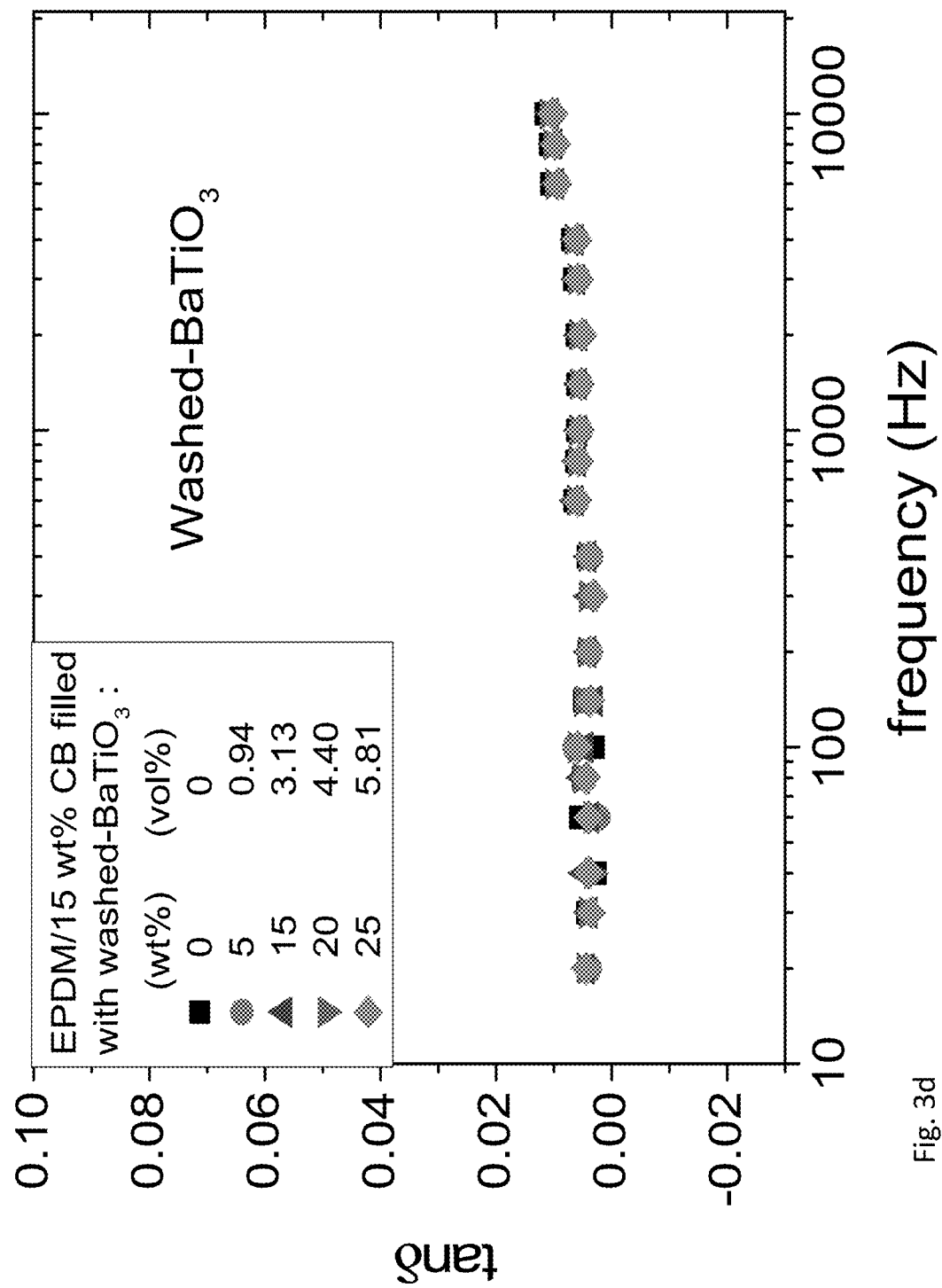
Figure 3E:
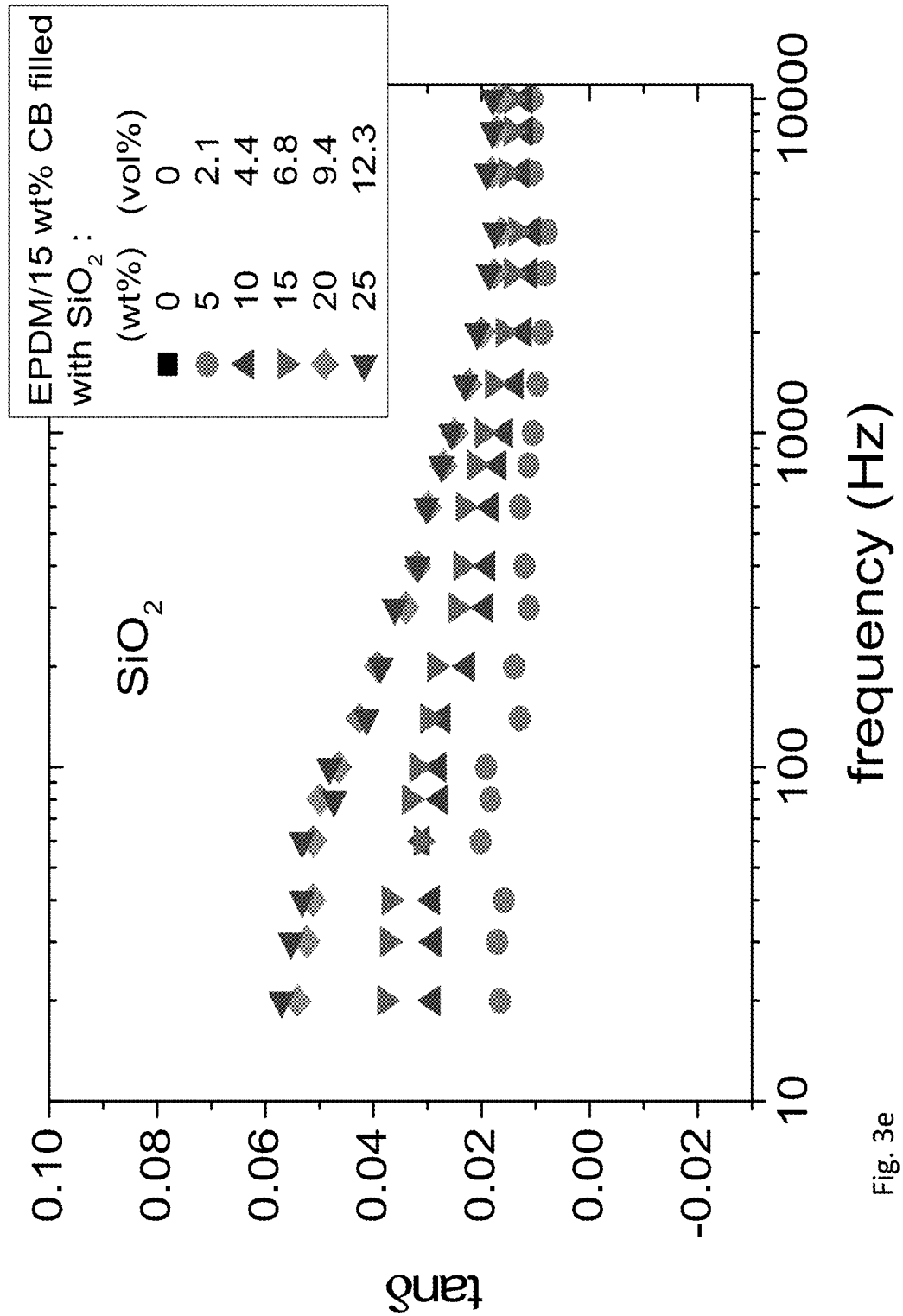

The effective permittivity of the fillers ($\varepsilon_{effective(filler)}$) is plotted against the intrinsic permittivity ($\varepsilon_{(filler)}$, i.e., bulk sintered k-value), as shown in FIG. 2. Firstly, the effective filler permittivity is largely underestimated, compared with the intrinsic values, particularly for the high-permittivity fillers ($\varepsilon_{effective(Nb,In-TiO2)} \approx 130$ vs. $\varepsilon_{(Nb,In-TiO2)}=60000$), which is consistent with an implication of the "bad" interfaces. Also there is marked insensitivity of the effective $\varepsilon_{effective(filler)}$ to the intrinsic $\varepsilon_{(filler)}$. Namely, for (Nb,In)TiO$_2$ vs. sakai-BaTiO$_3$ vs. rutile-TiO$_2$, the bulk permittivity values are arranged as: $\varepsilon_{(Nb,In-TiO2)} > \varepsilon_{(sakai-BaTiO3)} > \varepsilon_{(rutile-TiO2)}$, whereas the sequence is changed to be: $\varepsilon_{effective(sakai-BaTiO3)} > \varepsilon_{effective(Nb,In-TiO2)} \approx \varepsilon_{effective(rutile-TiO2)}$ for their effective permittivity in the EPDM composites. The fact that effective filler permittivity is independent of the filler intrinsic dielectric constant casts doubts on the conventional composite design practices, where high-k fillers are used to achieve an improvement in the dielectric constant of composites.

Furthermore, comparison between the effective filler k values can reveal another interesting result in that fillers with the same chemical compositions exhibit similar $\varepsilon_{effective(filler)}$ values. For instance, despite a large difference in the bulk permittivity for (Nb,In)TiO$_2$ and rutile-TiO$_2$, their effective dielectric constants are nearly identical. The same trend is also observed in the BaTiO$_3$ group, with $\varepsilon_{effective(sakai-BaTiO3)}$ close to $\varepsilon_{effective(ferro-BaTiO3)}$. This characteristic is illustrated in FIG. 2, where the effective k-values of all fillers can be graded into three levels, with each level containing the same type of fillers (i.e., BaTiO$_3$ vs. TiO$_2$ vs. SiO2). Since the nature of the filler-matrix interface is determined by the chemistry of the filler and matrix, and the interfacial areas are associated with particle size (the selected fillers in our study are of comparable size), this observation implies that the effective permittivity of fillers is dominated by their interfaces, regardless of their bulk k-values. Close scrutiny shows that the large ferro-BaTiO$_3$ fillers demonstrate a higher $\varepsilon_{effective(filler)}$ value than the small ones. Remember the ferro-BaTiO$_3$ fillers were sieved before use. It can be anticipated that the large ferro fillers containing coarse agglomerates would develop lower interfacial areas than the small ferro fillers with fine agglomerates. The measurable difference in the effective permittivity between two ferro fillers is consistent with the fact that the filler-interface is detrimental to the dielectric constant, and could reduce the effective permittivity of fillers. Still, in the BaTiO$_3$ group, the washed-BaTiO$_3$ fillers have the highest effective permittivity, despite the fact that they are based on sakai-BaTiO$_3$, a low-k BaTiO$_3$. It suggests that the benefits of the ionization treatment, introducing mobile charges and polar hydroxyl groups to the filler surface, outweighs the damages of the consequent amorphization, since the interfacial influence overwhelms the intrinsic filler dielectric constant. However, it is again opposite to the conventional selection criterion for high-k fillers, where the high crystalline dielectric fillers are preferred (more expensive), since they can offer a large intrinsic dielectric constant.

Now looking to the dielectric properties of the silica composites. Since there exists MWS polarization in the measured frequency range, it can be expected that this favorable interfacial polarization could enhance both the extrapolated matrix-permittivity ($\varepsilon_{effective(matrix)}$) and the effective filler dielectric constant ($\varepsilon_{effective(SiO2)}$), which agrees well with the experimental data (FIGS. 1 and 2). In the investigated formulation range, i.e., EPDM composites filled with 15 wt % CB and up to 25 wt % dielectric fillers, the silica composites demonstrates an even higher dielectric constant than the doped-rutile composites, despite the fact that the bulk permittivity of silica is four orders of magnitude smaller than that of doped-rutile.

The dielectric properties of EPDM composites filled with a variety of inorganic fillers (varying from low to ultra-high permittivity) were measured in order to investigate the effect of filler permittivity on the dielectric constant of composites. It was found that the filler interface could dominate the permittivity improvement in the composites. Specifically, the effective filler permittivity was rather insensitive to the filler bulk permittivity, but was largely determined by the filler-interface, which was associated with the filler chemical compositions and the filler size.

For the investigated fillers, silica demonstrated a good interface, arising from MWS polarization; all other fillers had unfavorable interfaces in this example, as manifested by the reduction in the extrapolated matrix-permittivity and the effective filler permittivity. As a result, the silica composites exhibited an even higher dielectric constant than the rest of the composites in the investigated composition range, despite the lowest bulk permittivity of the silica.

This implies the significance of interface manipulation, and casts serious doubts on the conventional composite design practices, where high-k and high crystalline fillers are preferred in the preparation of high-dielectric-constant composites.

FIGS. 3a-e show the dissipation factor (tan δ-loss) of the investigated composites. As expected, no dielectric loss can be identified in all other-than-silica composites (FIGS. 3a-d); but discernible dielectric loss appears in the silica composites (FIG. 3e), with the magnitude increasing with silica concentration, consistent with the fact that it arises from the MWS polarization of the space charges locating within the silica-interface.

Figure 4A:
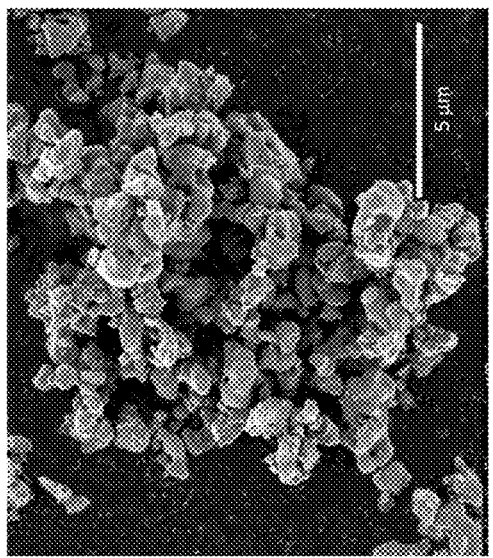
FIGS. 4a and 4b are FE-SEM images of as-received rutile-TiO2 (a) and (Nb+In) co-doped $TiO_2$ (b). The scale shown in both figures is 5 micrometers.
Figure 4B:
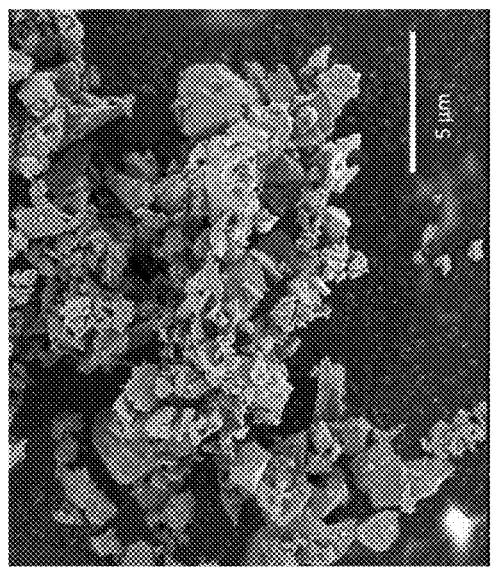

FIGS. 4a and b show FE-SEM images of as-received rutile-$TiO_2$ (a) and (Nb+In) co-doped $TiO_2$ (b): the particle size of $(Nb,In)TiO_2$ does not change upon doping, still maintained at 1~2 micron.

Figure 5:
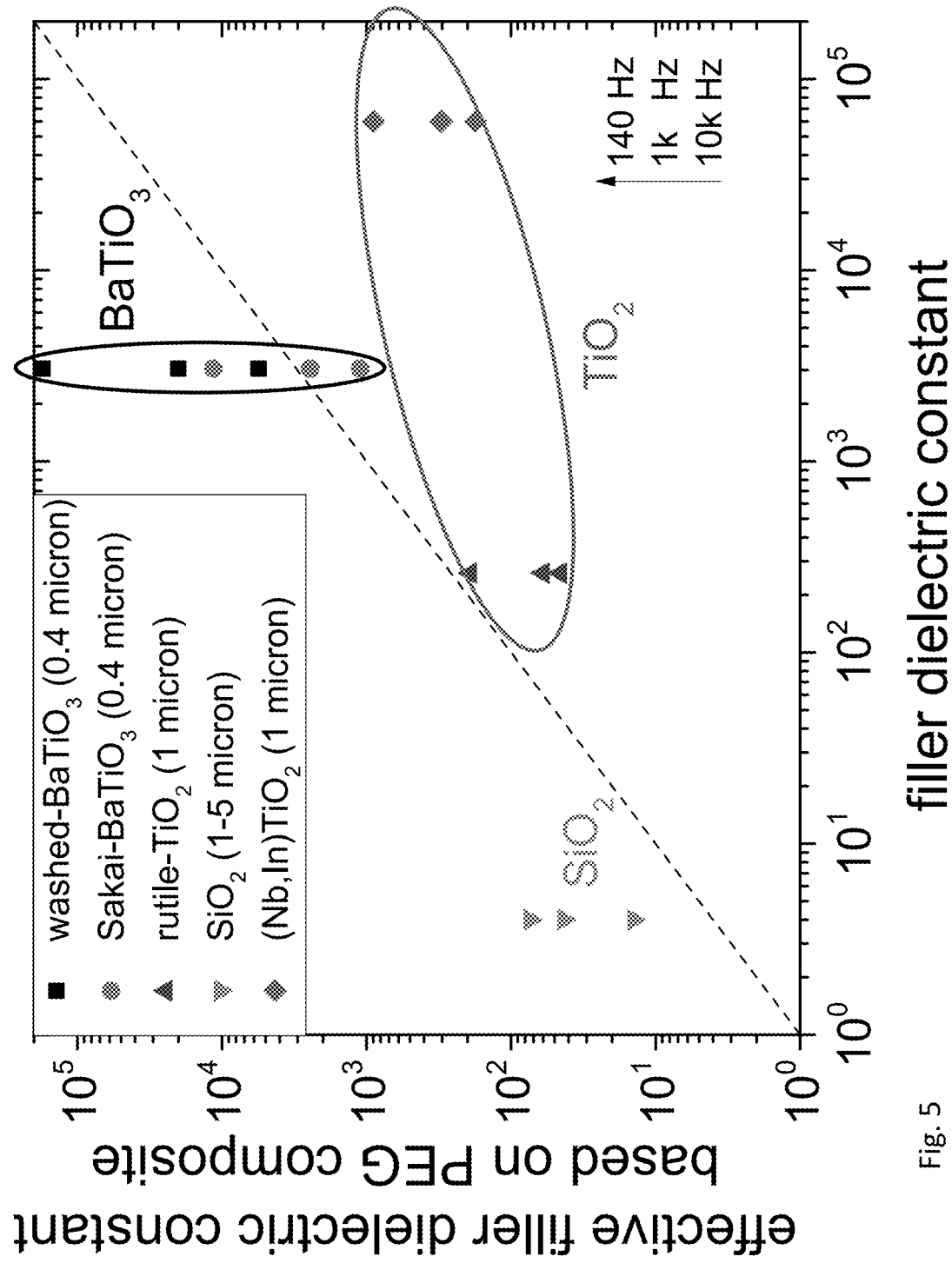
FIG. 5 shows filler permittivity [in polyethylene glycol (PEG) composites] vs. bulk filler permittivity, where the dominate role of the interface in determining effective filler k-values is still preserved in the PEG composites. Namely, despite $\varepsilon_{(Nb,In-TiO2)} > \varepsilon_{(sakai-BaTiO3)} > \varepsilon_{(rutile-TiO2)}$, the effective filler permittivity follows the sequence of: $\varepsilon_{effective(sakai-BaTiO3)} > \varepsilon_{effective\,(Nb,In-TiO2)} > \varepsilon_{effective\,(rutile-TiO2)}$.

FIG. 5 shows effective filler permittivity [in polyethylene glycol (PEG) composites] vs. bulk filler permittivity: the dominant role of the interface in determining effective filler k-values is still preserved in the PEG composites. Namely, despite $\varepsilon_{(Nb,In—TiO2)} > \varepsilon_{(sakai-BaTiO3)} > \varepsilon_{(rutile-TiO2)}$, the effective filler permittivity follows the sequence of: $\varepsilon_{effective(sakai-BaTiO3)} > \varepsilon_{effective\,(Nb,In—TiO2)} > \varepsilon_{effective\,(rutile-TiO2)}$. The strong frequency dependence of the effective filler permittivity (~1 decade of k) is probably due to physisorbed or H-bonded water on the inorganic surface (PEG is saturated with water molecules). As a result, the effective k values of silica and barium titanate are larger than their bulk k values.

Example 2

Varied Carbon Black (CB) Loading

Materials and composite processing: Ethylene propylene diene monomer (EPDM), barium titanate ($BaTiO_3$ or BTO), carbon black (CB), and organoclay (o-MMT or I44P) composites were prepared by mixing o-MMT, BTO fillers and CB particles along with plasticizer (paraffin oil) and curing agent [Dicumylperoxide (DCP)] on a twin-head kneader. All materials were dried (2 hr minimum to 12 hr maximum at 80° C. and low vacuum) prior to compounding in the twin-head kneader at 160° C. for 5 min; the mixed composites were then hot-pressed at 170° C. for 5 min (without prior roll milling to make plates).

Dicumylperoxide (DCP) and Paraffin oil (Saybolt viscosity at 100° F. is 345~355 second) were used as received. $BaTiO_3$ is a commercial filler Sakai-400 nm; Organo-clay is a commercial filler, grade I44P was also used. Carbon black (Spheron 6000), EPDM (Vistalon 5420) were provided.

The composite formulation ranges are summarized in Table 3. Two sets of composites were prepared: one is the EPDM/CB/BTO/o-MMT composite containing typically 1 wt % o-MMT and 29 wt % CB (structured composite); the other one is a series of EPDM/CB/BTO composites with varied CB concentration (random composite).

Instrumentation: A Leica Ultracut UCT microtome equipped with a cryo-attachment was used for sectioning the specimens. The microtomed samples were tested under a transmission electron microscope (TEM). Dielectric relaxation spectroscopy (DRS) experiments were performed over a broad frequency (0.1 to $10^6$ Hz) and temperature (−100 to 100° C.), using a Solartron Modulab MTS Test System and a temperature-controlled chamber Delta 9023. To be able to use parallel plate capacitor geometry, 4 $cm^2$ colloidal silver electrodes (4×1 cm) were painted on both sides of the films (~2.5 mm thick).

Structure analysis: TEM images of the structured composite (EPDM/CB/BTO/o-MMT) are shown in FIGS. 6a-e in the sequence of gradually decreasing scale, from 1 micron to 50 nm. It can be observed that all fillers are well-dispersed in the EPDM matrix, promoted by the favorable kneading process and stabilized with the crosslinking. The dark black and light black dots represent the BTO and CB particles respectively, due to their different electron-scattering ability (particles with heavy nuclei can effectively scatter electrons). The high aspect ratio curved platelets represent the intercalated MMT organoclays (consisting of a few down to a single layer) (FIGS. 6d and 6e).

Figure 6A:
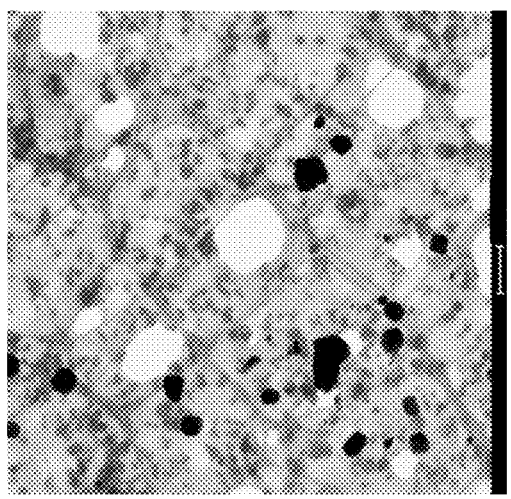
FIGS. 6a-e are TEM images of the structured CB composite (EPDM/CB/BTO/o-MMT): (a) to (d) are organized in the sequence of decreasing scale. The scale shown in FIG. 6a is 1 micrometer. The scale shown in FIG. 6b is 500 nanometers. The scale shown in FIG. 6c is 200 nanometer. The scale shown in FIG. 6d is 100 nanometers. The scale shown in FIG. 6e is 50 nanometers. The dark black dots represent BTO; the light black dots are CB; the curved platelets are o-MMT.
Figure 6B:
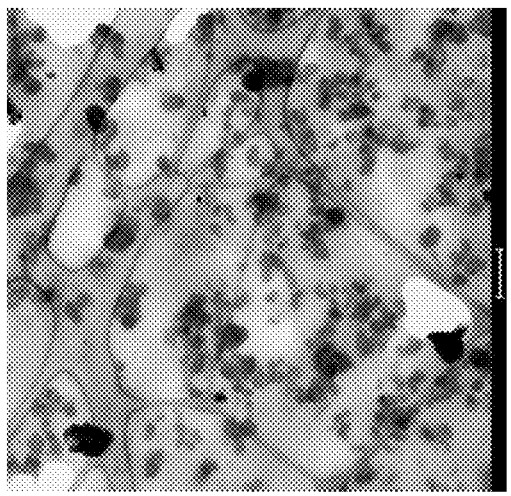
Figure 6D:
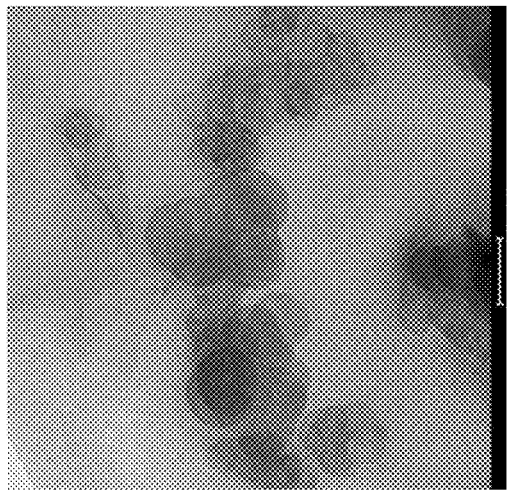
Figure 6E:
Figure 6C:
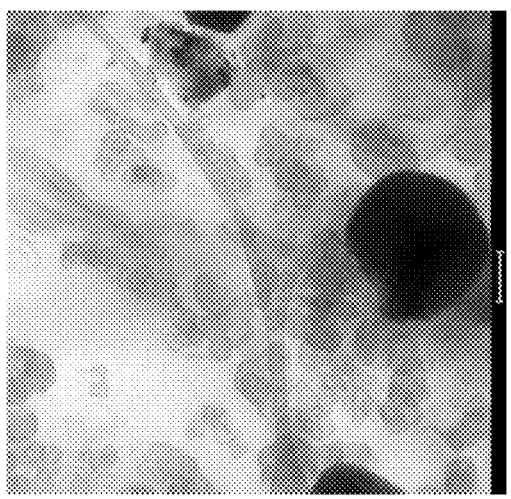

The BTO fillers have a reported size of 400 nm, consistent with the observation in FIGS. 6a-e suggesting that most BTO fillers are individually separated by the polymer (only one or two agglomerates consisting of two single BTO particles can be found in FIG. 6a). The adopted CB fillers are one alternative to what is commonly known as N660 grade CB. They are low structure carbon black (DBP value of 92 ml/100 g) with an average size of 50~60 nm. In addition to the uniform dispersion, close scrutiny reveals that these CB are self-assembled to form elongated clusters with a size up to 1 micron (FIGS. 6 a and b), mediated by the organoclays (FIG. 6 c to e). It can be understood that if the CB is preferably attracted to the o-MMT in the EPDM matrix, the silicates with a high aspect ratio and large surface area can serve as bridges to connect the adjacent CB particles during the mixing, thereby inducing and stabilizing the formation of CB clusters.

An example of an approach used for the qualitative prediction, or control of the composite structure, as far as filler/filler associates and filler dispersion in the matrix, is based on interfacial tensions (γ) and work of adhesion (W):

$$W_{12} = \gamma_{13} + \gamma_{23} + \gamma_{12} \qquad (7)$$

where $W_{12}$ is the work of adhesion if phase 1 and phase 2 are contacted when both are immersed in phase 3; $\gamma_{12}$ is the interfacial tension between phase 1 and phase 2, and could be calculated by the geometric-mean equation:

$$\gamma_{12} = \gamma_1 + \gamma_2 - 2\sqrt{\gamma_1^d \gamma_2^d} - 2\sqrt{\gamma_1^p \gamma_2^p} \quad [\gamma_1, \gamma_2$$

TABLE 3

Formulations of the EPDM composites

| | weight percentage (wt %) | | | PHR (parts per hundred robber) | | |
|---|---|---|---|---|---|---|
| | | filler | Layered filler | | | |
| | Carbon Black | (eg. BT) | (eg. o-MMT) | rubber | paraffin | DCP |
| Min | 0 | 0 | 0 | 100 | 0 | 0.5 |
| Max | 45 | 30 | 15 | 100 | 60 | 15 |
| Typical | 29 | 20 | 1-9 | 100 | 30 | 2 | are the surface tensions of phase 1 and phase 2 respectively, d denotes the London dispersion component (non-polar), and p denotes the polar component]. $W_{12}>0$ indicates the thermodynamic stability (two phases are preferably connected with each other in the environment of phase 3), whereas $W_{12}<0$ indicates the spontaneous separation of the two adhered phases. Table 4 below shows the free energies of the phases at room temperature.

TABLE 4

Surface free energies of various composite components at room temperature

| component | $\gamma^d$ (mJ/m$^2$) | $\gamma^p$ (mJ/m$^2$) | $\gamma$(mJ/m$^2$) |
|---|---|---|---|
| EPDM[35] | 29.7 | 5.8 | 35.5 |
| organoclays(I-44P)[34] | 39.9 | 14.8 | 54.7 |
| CB[36]* | 94.5 | 3.6 | 98.1 |

*Here the surface tensions of similar low structure CB (Seast 300 ®) are used.

Figure 15A:
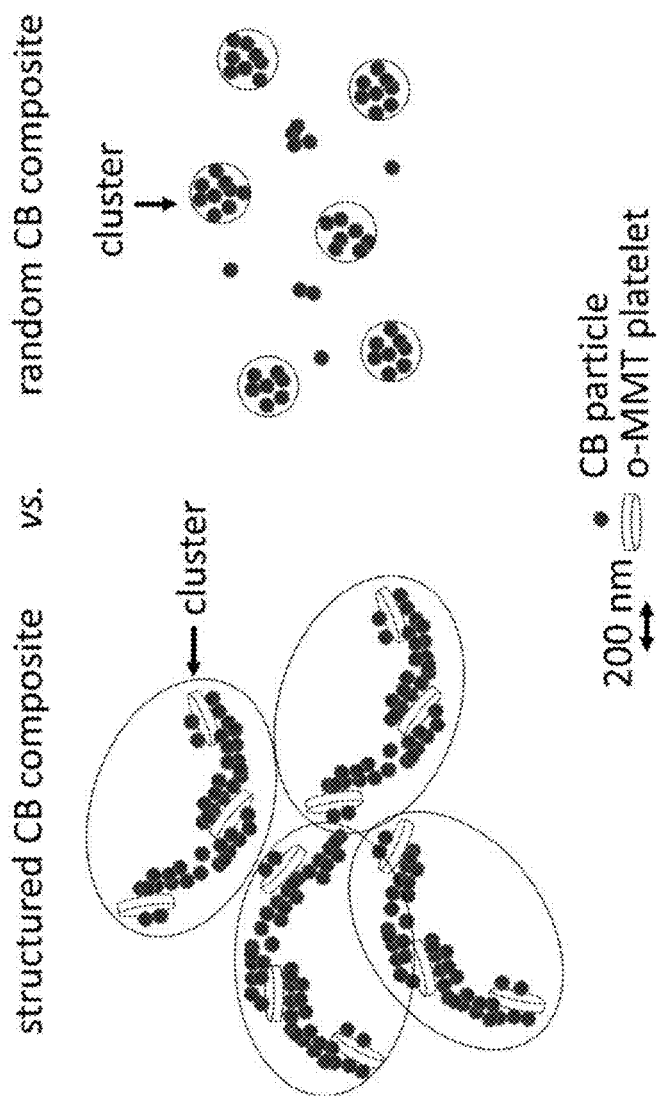
FIG. 15a is a schematic depiction of the morphological features in the structured composite vs. in the random composite: the structured composite is characterized with aggrandized cluster size and hollow cluster structure.
Figure 15B:
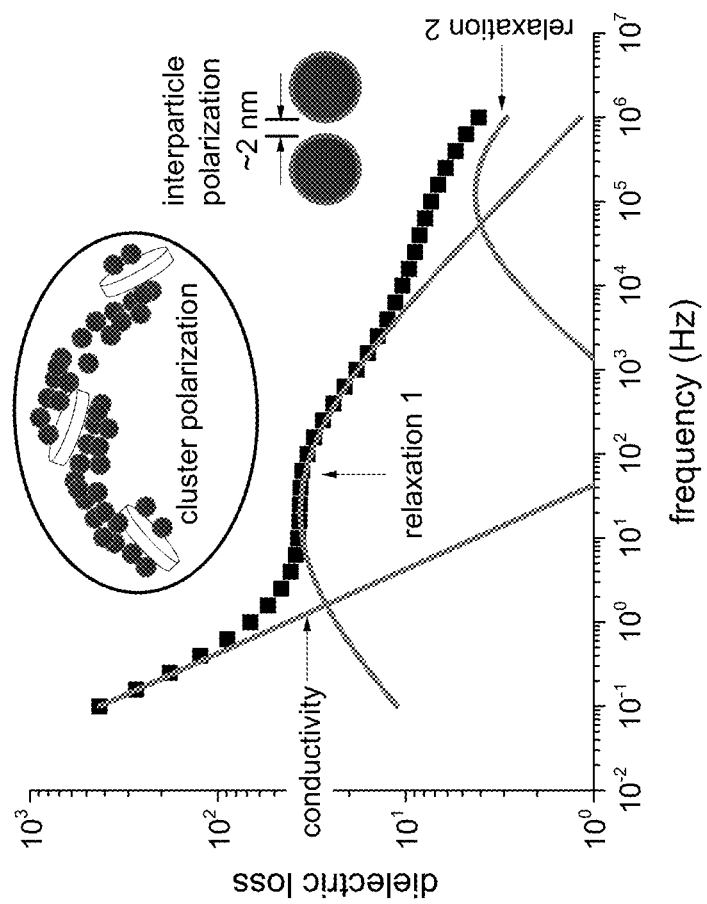
FIG. 15b shows three deconvoluted relaxation processes in the spectrum and the related structure unit for each relaxation.

A positive value of 6 mJ/m$^2$ can be calculated for $W_{organoclay-CB}$ in EPDM, suggesting that when immersed in EPDM the carbon black particles preferentially adsorb on the surface of the organoclays; or equivalently for a high ratio of CB to OC fillers in EPDM, the CB clusters will be preferentially separated by OC fillers (vide infra. direct imaging of the filler structures in FIGS. 22a-h and schematic representations of structured CB composites in FIGS. 15a-b). An equivalent, and perhaps more accurate, approach to calculate the same $W_{12}$ adhesion energy of fillers 1 (CB) and 2 (OC) immersed in matrix 3 (EPDM) is based on the van Oss three parameter surface tension formalization with $\gamma^{LW}$ the non-polar component of surface free energy, same as $\gamma^d$ above; but the polar component $\gamma^p$ is now separated in two parameters: $\gamma^+$ that quantifies the electron-acceptor (Lewis-acid) polar character and $\gamma^-$ that quantifies the electron-donor (Lewis-base) polar character, with $\gamma^p \cong 2\sqrt{(\gamma^+\gamma^-)}$. In this three parameter formalization, and using literature values based on experiments, EPDM is described by $\gamma^{LW} \cong 30$, $\gamma^+ \cong 2.0$, and $\gamma^- \cong 15$ mJ/m$^2$, whereas the Spheron-type CBs correspond to $\gamma^{LW} \cong 45$, and $\gamma^+ \cong 5.7$, $\gamma^- \cong 0$ mJ/m$^2$ and montmorillonite-type OC/clays correspond to $\gamma^{LW}$ and $\gamma^- \cong 36$ mJ/m$^2$; thus both CB and OC disperse well in EPDM, and in the presence of EPDM there is a preferred strong adhesion between the CB and OC fillers (as expected, since CB has an electron-acceptor character and OC a strong electron-donor character).

Dielectric relaxation spectroscopy: Before the analysis for the structured EPDM/CB/BTO/o-MMT composite, the dielectric properties of several controls are measured accordingly (at room temperature) in order to correctly ascribe the observed dielectric relaxation to each responsible filler (FIGS. 7a-b and FIGS. 8a-b).

Figure 7A:
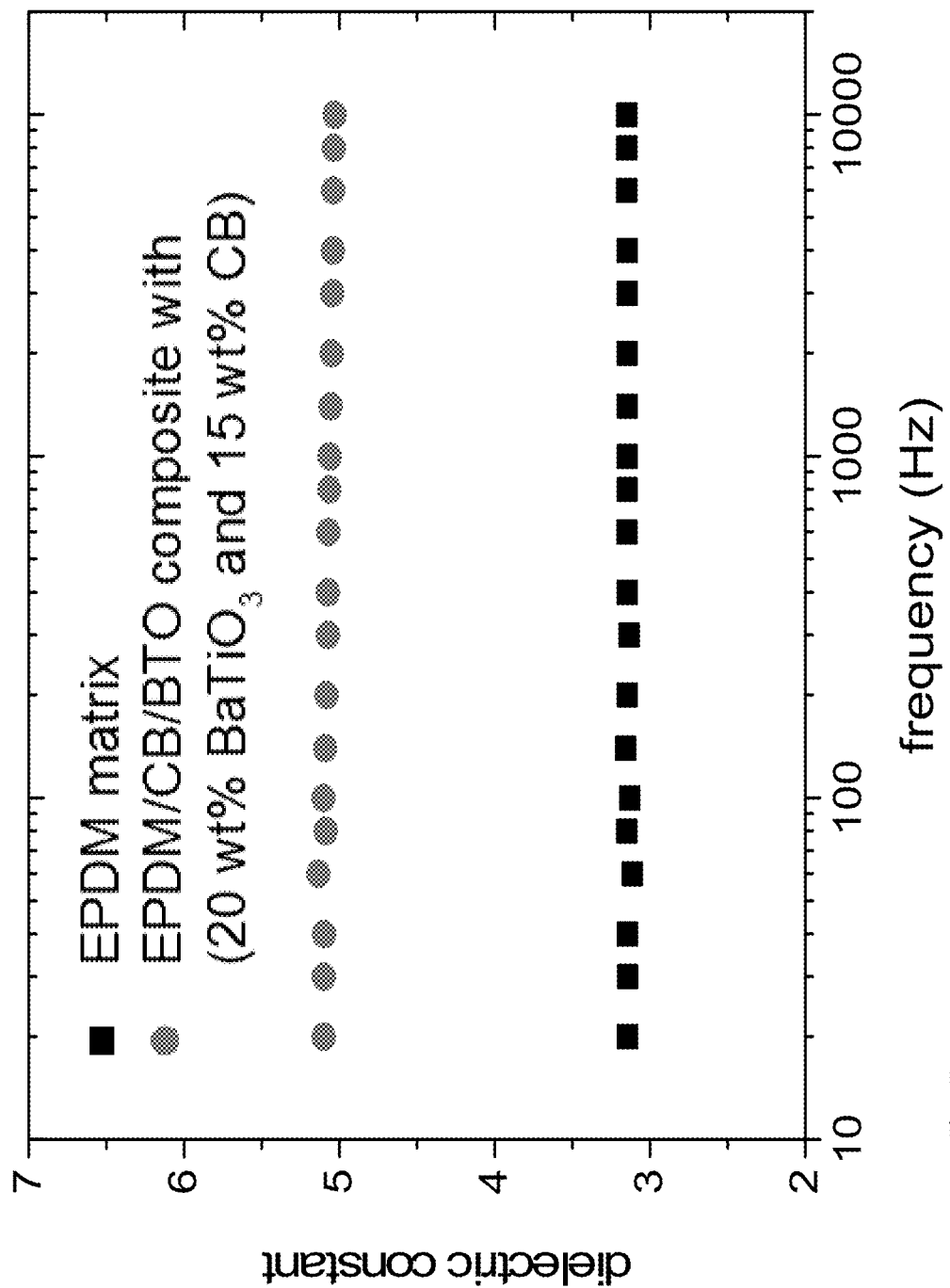
FIGS. 7a-b illustrate the dielectric constant and dissipation factor as a function of frequency at room temperature, for EPDM pure polymer and random composite (EPDM/CB/BTO). The random composite contains the same weight concentration of BTO as all other composites (vide infra).
Figure 7B:
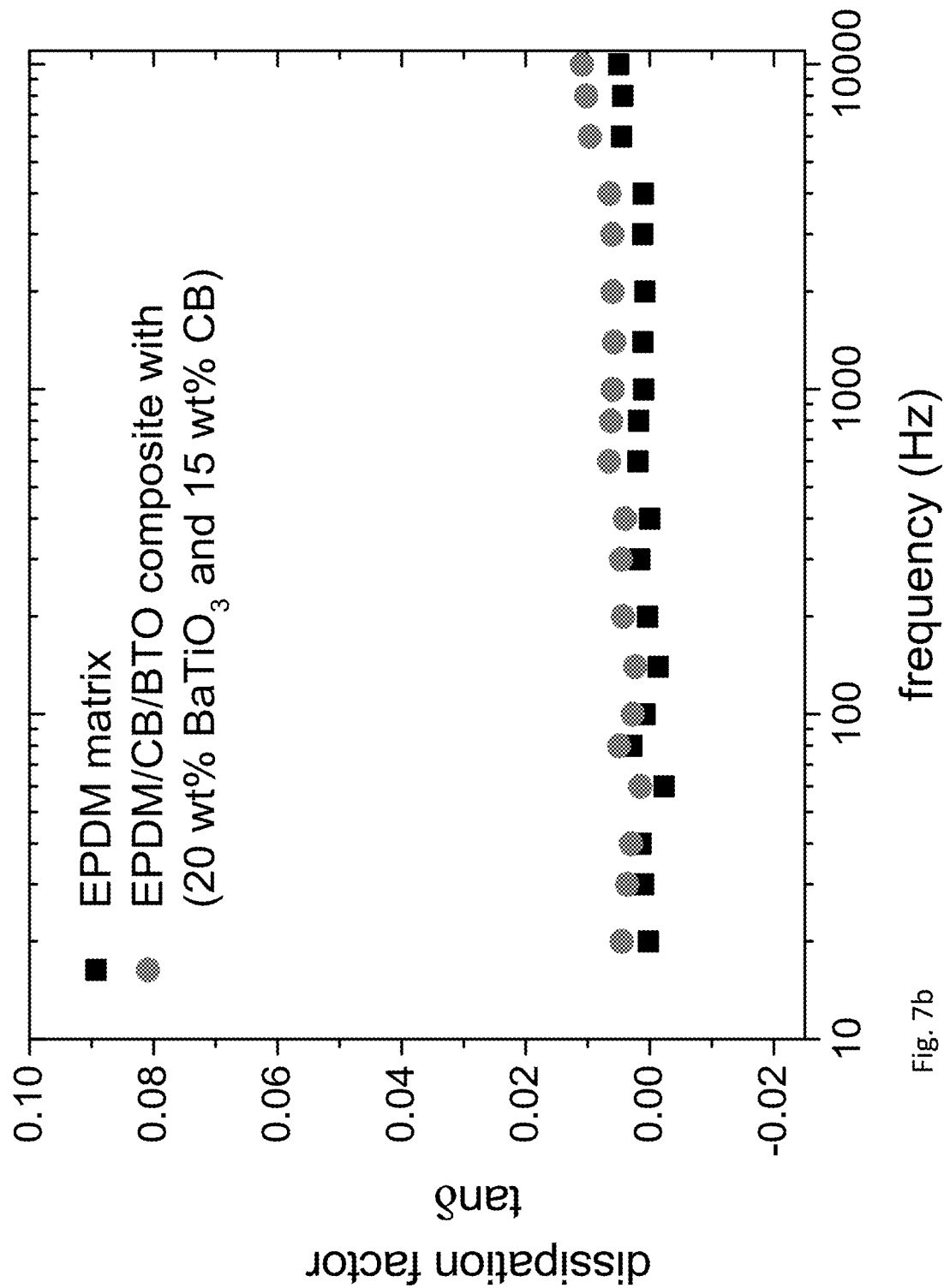

As shown in FIG. 7 (a), EPDM rubber (nonpolar elastomer) exhibits a small and constant dielectric constant of 3.15 over the whole measured frequency range. Addition of a decent amount of BTO (with k=1200) and CB only provides marginal improvement to the dielectric constant, which can be predicted based on the logarithmic mixing rule. No dielectric relaxation can be identified (FIG. 7b), because the critical frequencies of the electronic (for rubber and CB) and ionic polarization (for BTO) are far beyond the measurement frequency window.

As a result, the strong dielectric relaxation observed in the random composites with high loadings of CB fillers originates from the large CB clusters formed at high CB concentrations (as shown FIGS. 8a and b), which is consistent with the percolation theory. Namely, the equivalent dipole moment contributed by CB fillers is proportional to the product of the number of active electrons (associated with CB concentration) with the electron displacement distance (associated with cluster size). When the adjacent CB fillers become close enough to allow electrons to jump through the gap, substantial enhancement in the dielectric constant can be realized because of the increased cluster size (cf. the magnitude of every k-improvement upon the same addition of 2 wt % CB, FIG. 8a). Meanwhile, the dielectric relaxation would shift to low frequencies because it takes more time for electrons to jump through these junctions, as also manifested by the gradually increased dielectric loss or dissipation factor (an indication of phase lag). Lastly, when the amount of CB approaches the percolation value, an infinite cluster superstructure (network) would appear, signifying the insulator-conductor transition (cf. 29 wt % CB loading composite with 32 wt % CB loading composite, FIGS. 8a-b).

Figure 8A:
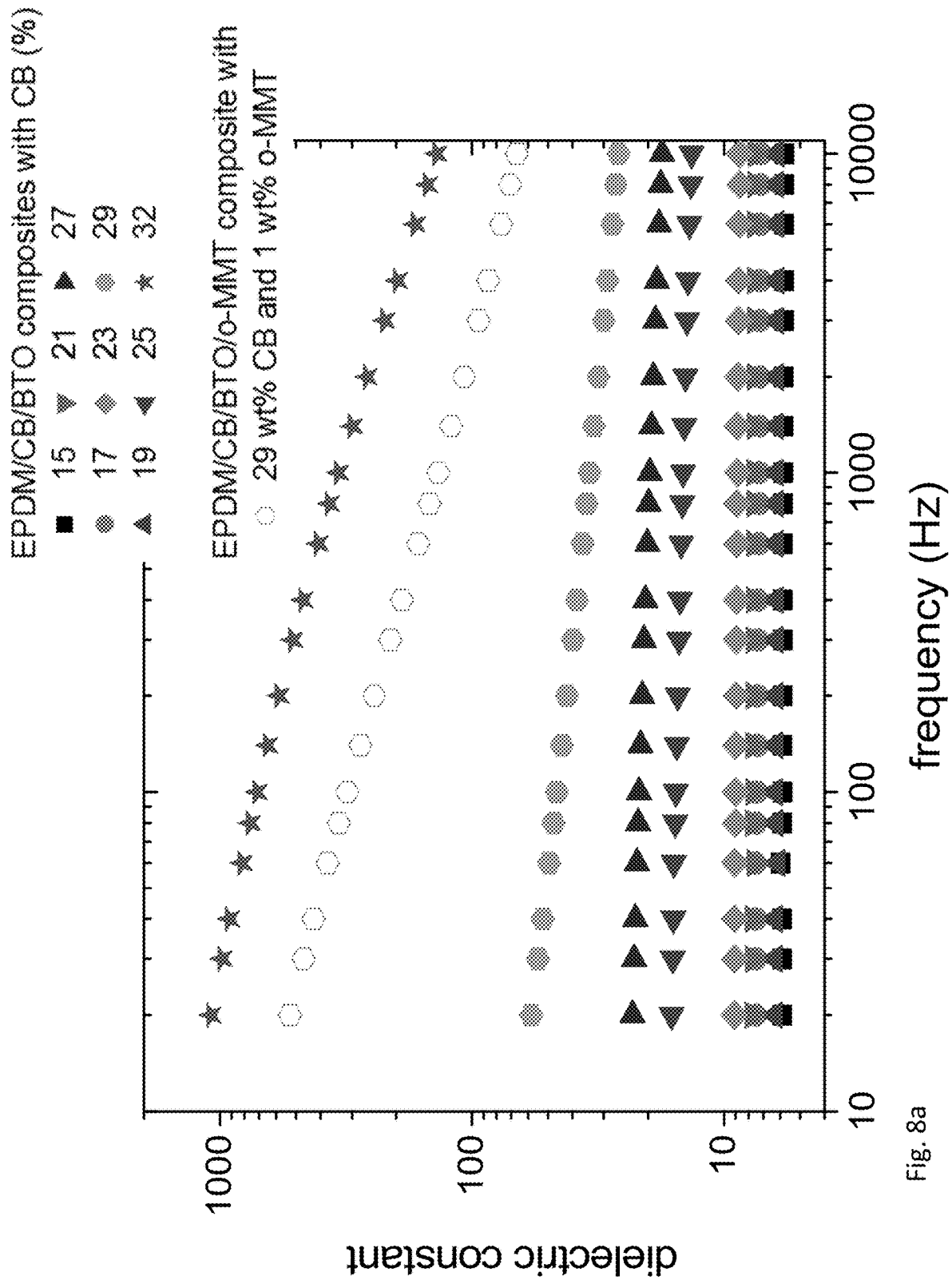
FIGS. 8a-b are a comparison of the dielectric properties between: the random composites with systematically varying CB (solid symbols); the random composite (solid orange hexagons) vs. the structured composite (hollow hexagons), both including the same amount of CB.
Figure 8B:
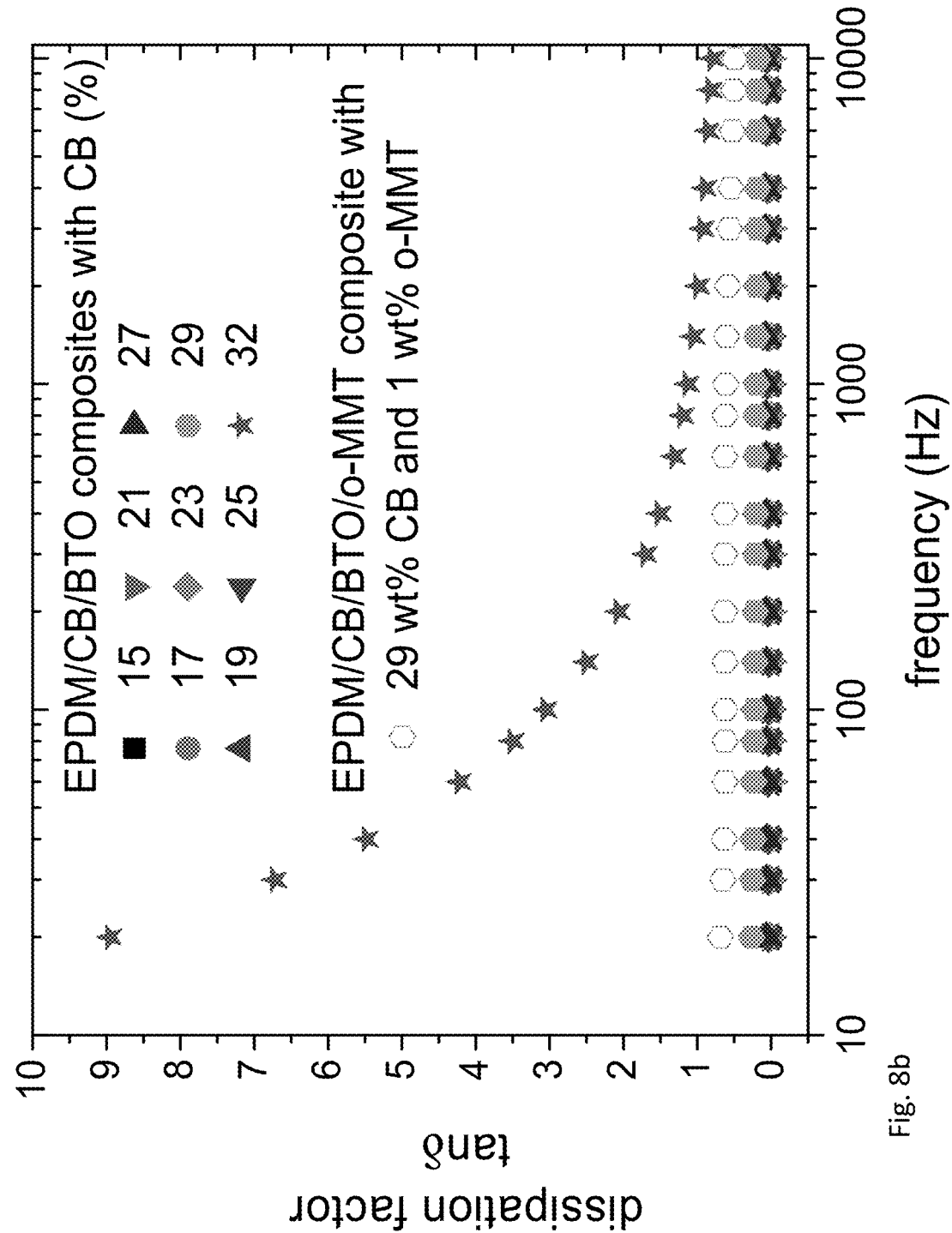
Figure 9A:
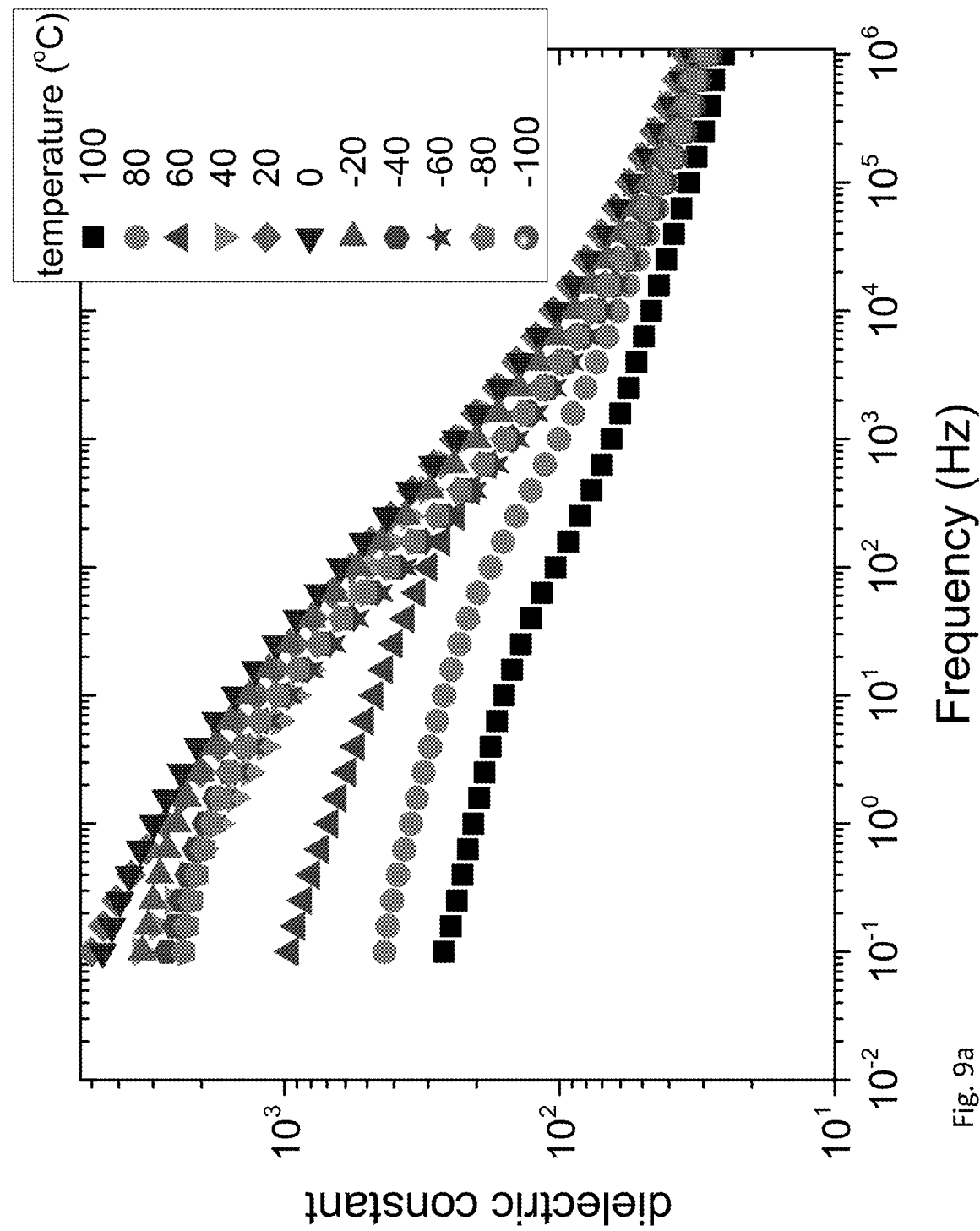
FIGS. 9a and b are dielectric relaxation spectroscopy measurements for the structured composite at various temperatures.
Figure 9B:
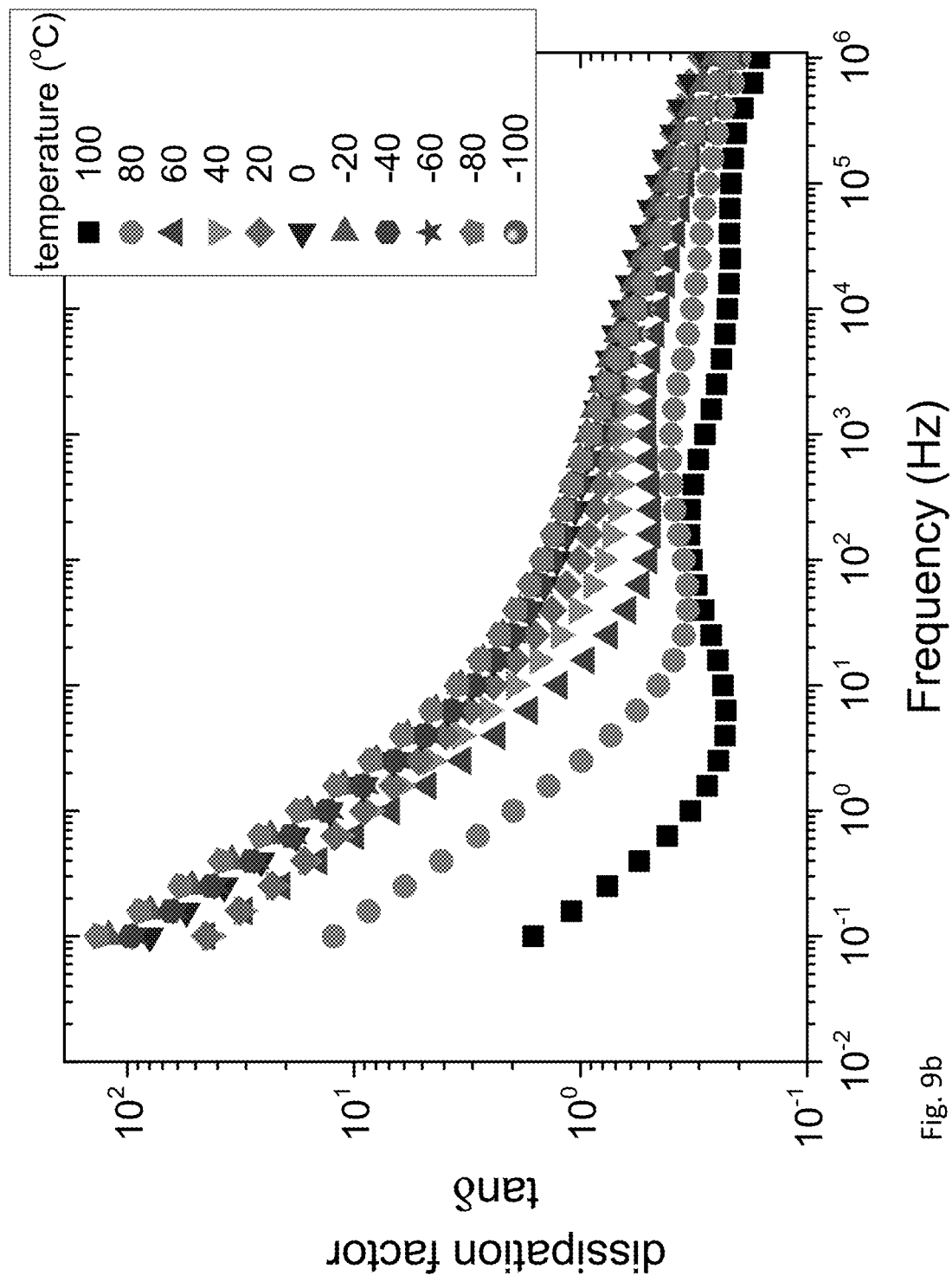

Also included in FIGS. 8a-b are the dielectric behaviors of the structured composite with 29 wt % CB and 1 wt % organoclays. One finding is that the incorporation of a small amount of organoclays can remarkably improve the dielectric properties of the composite, with a dielectric constant promoted to a level close to the 32 wt % CB random composite and with a dissipation factor as low as that of the 29 wt % CB composite. In order to further understand the underlying mechanisms and to better optimize dielectric performance, DRS measurement is conducted on this silicate-filled composite at various temperatures, as shown in FIGS. 9a-b. Apparently, two regions can be distinguished for the dependence of the dielectric properties on temperature. From 100 to 20° C., the dielectric constant and loss exhibit a strong function of temperature, with both values increasing substantially as temperature decreases. Further cooling (20~−100° C.) does not generate much variation in the dielectric properties, although a slight decrease in the dielectric constant can be identified.

Figure 10A:
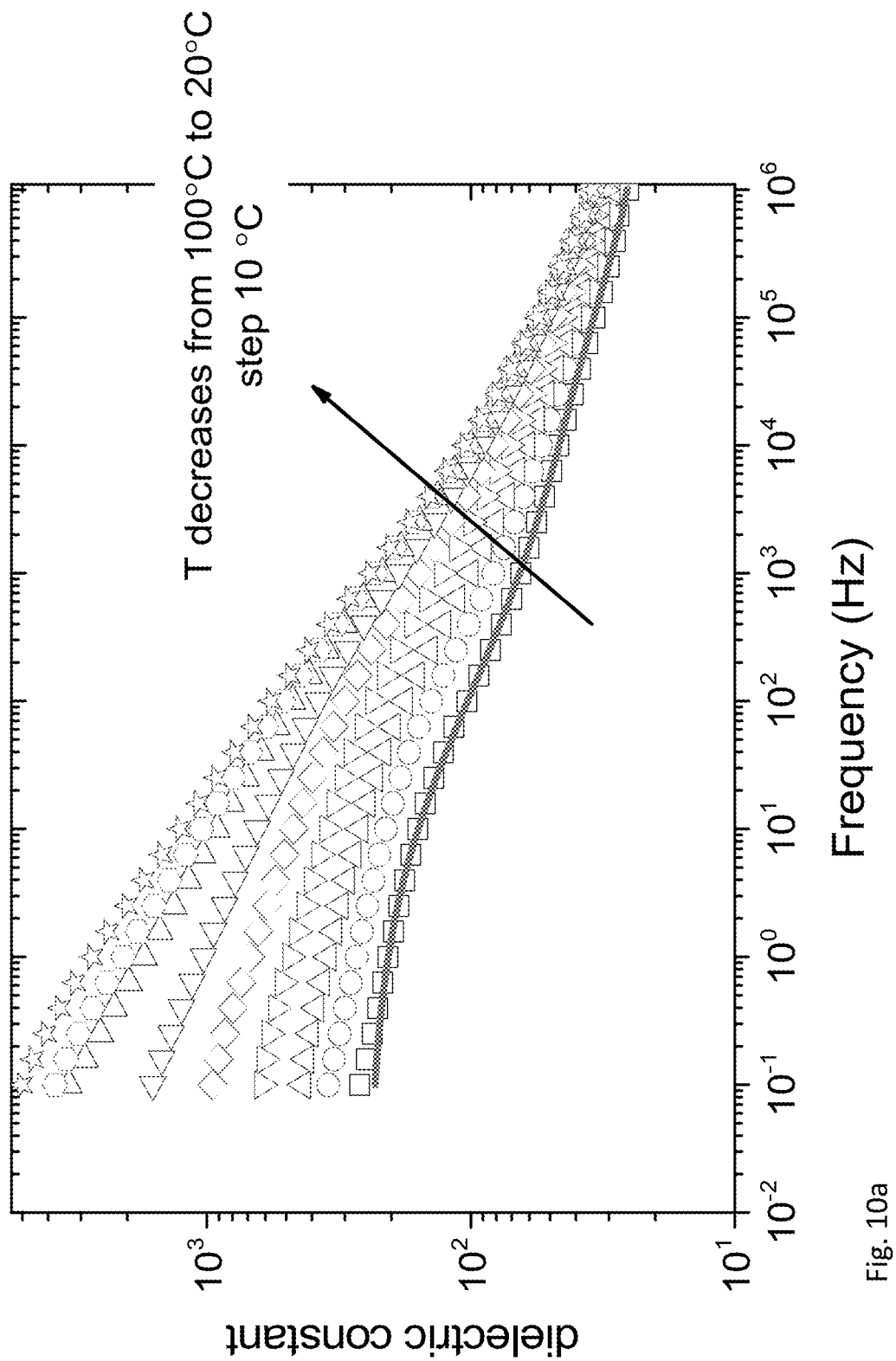
FIGS. 10a and b are dielectric relaxation spectroscopy measurements for the structured composite in region I (20~100° C.). The solid lines demonstrate simultaneous fitting to ε' and ε" for the experimental data at 100° C. (solid lines running on black squares). The solid curves in FIG. 10b. labeled as conductivity, relaxation 1 and relaxation 2 represent the deconvoluted processes based on the fitting.
Figure 10B:
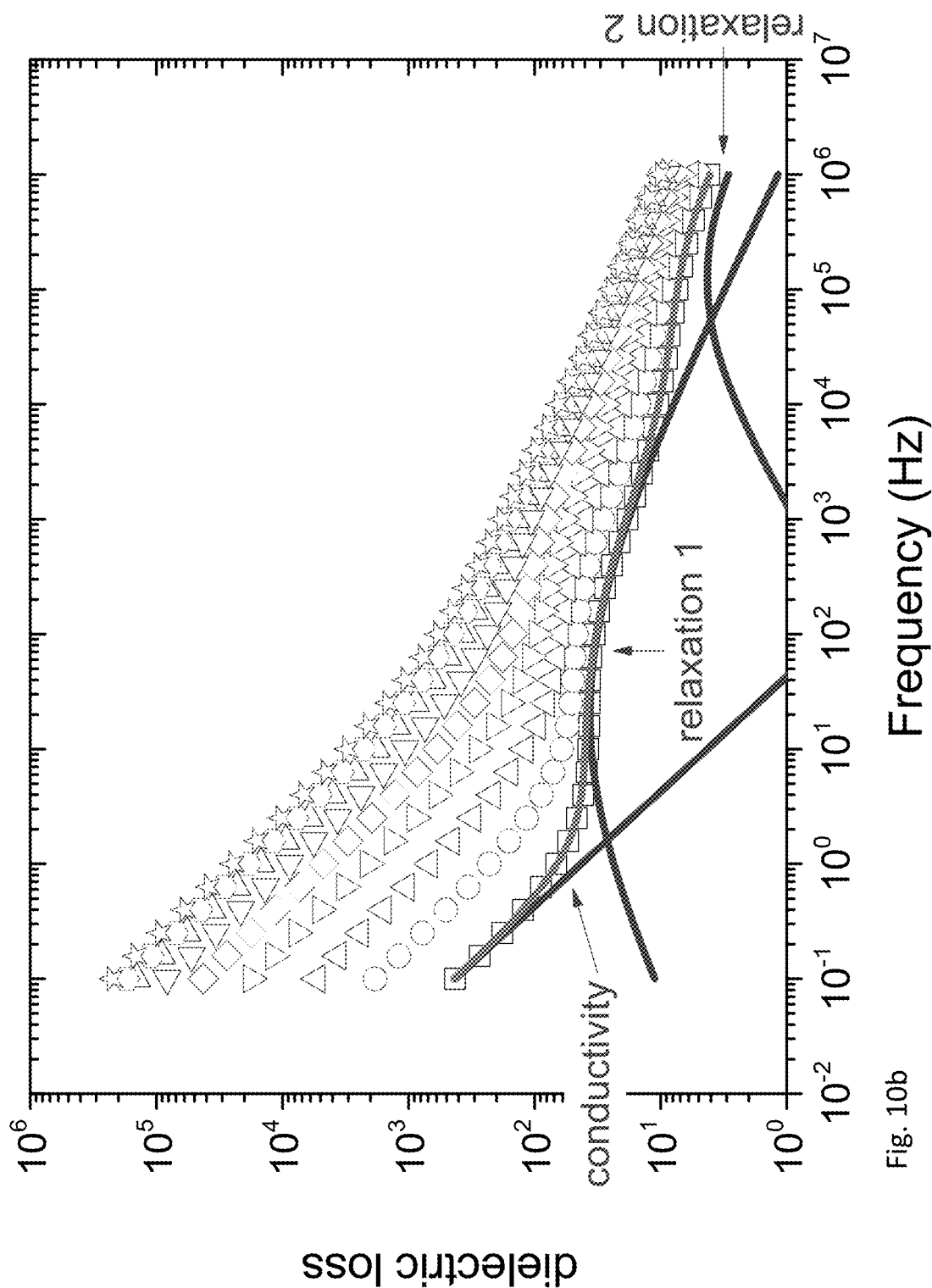

Region I (100° C. to 20° C.): FIGS. 10a-b illustrate the increase in the dielectric constant ($\varepsilon'$) and dielectric loss ($\varepsilon''$) with decreasing temperature for the structured composite. The negative temperature dependence of dielectric loss is different from the typical behavior of polymer composites filled with dielectric fillers. In these composites, the low frequency dielectric loss is usually related with the interfacial polarization, or Maxwell-Wagner-Sillars (MWS) polarization, where the separation of mobile charges at interfaces contributes to the dielectric response. The movement of the charges is facilitated at high temperatures, leading to a positive dependence of both dielectric constant and dielectric loss on temperature. The opposite-than-expected trend excludes the dominant contribution from the MWS polarization of surfactants or ions on the organoclays, which can also be implied by noticing that the relaxation strength $\Delta\varepsilon$ is orders of magnitude higher than that of MWS polarization (Table 5). Combined with the pervious analysis that EPDM and BaTiO$_3$ fillers do not exhibit relaxation over the measured frequency range, it indicates that the strong dielectric dispersion and this particular temperature dependence result from the high-loading of carbon black.

Another interesting feature is that there exist two relaxation processes in the spectra, which can be clearly distinguished at high temperatures (FIG. 9b and FIGS. 10a-b): one is located at a low frequency of tens-to-hundreds Hz and the other is located at a high frequency between a hundred thousand to a million Hz. At low temperatures, the high frequency peak is masked by the low frequency one (with gradually increased magnitude).

The quantitative analysis of the measurement results can be carried out in the permittivity interpretation by employing a Cole-Cole dielectric function with a conductivity term:

$$\varepsilon^*(w) = \varepsilon_\infty + \sum_j \frac{\Delta\varepsilon_j}{1+(iw\tau_j)^{1-\alpha_j}} + \frac{\sigma_{dc}}{iw\varepsilon_0} \quad (8)$$

where $w=2\pi f$ is the angular frequency; $\tau_j$ is the characteristic time of the j mode, corresponding to the frequency of the loss peak maximum ($1/\tau_j=2\pi f_{max}$); $\Delta\varepsilon=\varepsilon_s-\varepsilon_\infty$ is the dielectric relaxation strength [with $\varepsilon_s$ and $\varepsilon_\infty$ defined as the low and high frequency limits of the $\varepsilon'(w)$]; the shape parameter a is associated to the slopes of the $\varepsilon''(w)$ function at the low and high frequency limits with respect to the maximum frequency of the mode; and $\sigma_{dc}$ and $\varepsilon_0$ stand for the conductivity contribution and the permittivity of free space, respectively (details of the fitting analysis procedure have been given in detail elsewhere).

The fitting is simultaneously performed to $\varepsilon'(w)$ and $\varepsilon''(w)$, as exemplarily shown in FIG. 10, where the experimental data at 100° C. (black hollow square) are fitted with the red lines. The blue lines in the loss spectra represent the three deconvoluted contributions, namely, the conductivity, the low frequency relaxation (cluster polarization) and the high frequency relaxation (interparticle polarization). A bimodal Cole-Cole expression (j=2) is employed to fit the experimental data at high temperatures (70~100° C.) when the two relaxations are well-separated on the spectra. At low temperatures, the high frequency relaxation is overshadowed by the low frequency one, and a unimodal Cole-Cole equation is thus used. The high frequency relaxation and the conductivity term are not influenced by this transition, cf. the large difference in $\Delta\varepsilon$ magnitude between the two relaxations, $\Delta\varepsilon_1$ vs. $\Delta\varepsilon_2$ (Table 5). The parameter values of the best-fits are summarized in Table 5.

$$w = \frac{1}{RC}$$

(R and C are the resistance and the capacitance of the gap respectively)[26,42]:

$$R = \frac{16\pi^2\hbar}{3e^2}\frac{d}{k_0 A}e^{k_0 d}, \quad C = \varepsilon_0\varepsilon_r\frac{A}{d} \quad (9)$$

$$\left(k_0 = \frac{2\sqrt{2m_e}}{\hbar}\sqrt{V}\right)$$

$$w = \frac{1}{RC} = \frac{3e^2}{16\pi^2\hbar\varepsilon_0}\frac{k_0}{\varepsilon}e^{-k_0 d} \quad (10)$$

$\hbar$ is the Planck constant; e and $m_e$ are the charge and the mass for an electron respectively; d and A evaluates the gap dimension with d being the width and A being the cross-sectional area of the gap; $k_0$ describes the potential barrier for electron tunneling and can be calculated through the potential height (V); $\varepsilon_0$ and $\varepsilon_r$ are the vacuum permittivity and the relative permittivity of the polymer inside the gap.

Figure 11:
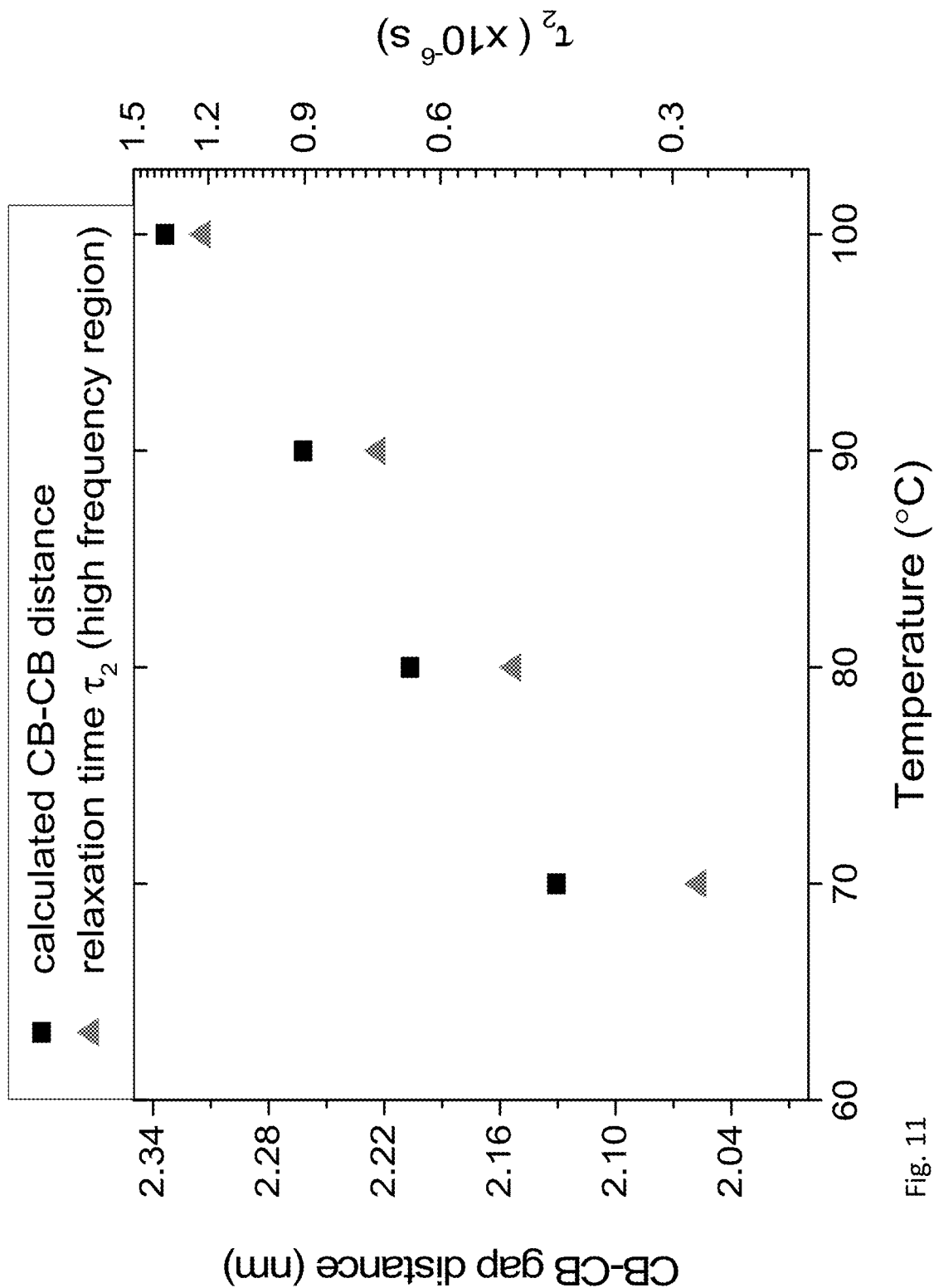
FIG. 11 shows the relaxation time of the high frequency polarization and the calculated interparticle distance as a function of temperature.

The CB-CB interparticle distance is estimated to be around 2 nm by assuming a typical potential barrier of 0.2 eV for carbon blacks and a dielectric constant of 3 for the gap polymer ($\varepsilon_r$ (EPDM) ~3, FIG. 7a). The calculated gap width is in a reasonable order of magnitude for electron tunneling, and is in line with the TEM images (FIG. 6d) and other literatures. As depicted in FIG. 11, the shift of the characteristic frequency to the high frequency region indicates the gradually decreased effective gap width, which is in agreement with literature reports of systems undergoing electron tunneling.

The low frequency relaxation (relaxation 1) causes the strong dielectric dispersion and is attributed to the polarization of CB clusters (vide supra). Based on the percolation theory, the relaxation time is a measure of the average time required for electrons to explore one cluster. The dielectric strength reflects the equivalent dipole moment for electron displacement, which is proportional to the product of the

TABLE 5

Best-fit parameters for the dielectric curves in region I (20-100° C.)

| T (° C.) | $\varepsilon_\infty$ | $\Delta_{\varepsilon 1}$ | $\Delta_{\varepsilon 2}$ | $\tau_1$ (s) | $\tau_2$ (s) | $\sigma_{dc}$ (S/m) | $\alpha_1$ | $\alpha_2$ |
|---|---|---|---|---|---|---|---|---|
| 100 | 20.60 | 2.10E+02 | 17.08 | 8.52E−03 | 1.22E−06 | 2.30E−09 | 0.57 | 0.43 |
| 90 | 21.37 | 3.02E+02 | 11.36 | 6.73E−03 | 7.23E−07 | 1.05E−08 | 0.61 | 0.36 |
| 80 | 21.14 | 4.29E+02 | 5.41 | 8.27E−03 | 4.83E−07 | 3.37E−08 | 0.64 | 0.21 |
| 70 | 20.54 | 6.37E+02 | 1.82 | 1.11E−02 | 2.77E−07 | 1.07E−07 | 0.64 | 0.00 |
| 60 | 19.75 | 1.01E+03 | | 2.32E−02 | | 2.46E−07 | 0.65 | |
| 50 | 19.28 | 1.82E+03 | | 6.99E−02 | | 4.62E−07 | 0.64 | |
| 40 | 18.96 | 4.80E+03 | | 5.63E−01 | | 7.70E−07 | 0.63 | |
| 30 | 19.74 | 5.95E+03 | | 6.38E−01 | | 9.80E−07 | 0.62 | |
| 20 | 20.86 | 8.70E+03 | | 9.07E−01 | | 1.29E−06 | 0.60 | |

Figure 12A:
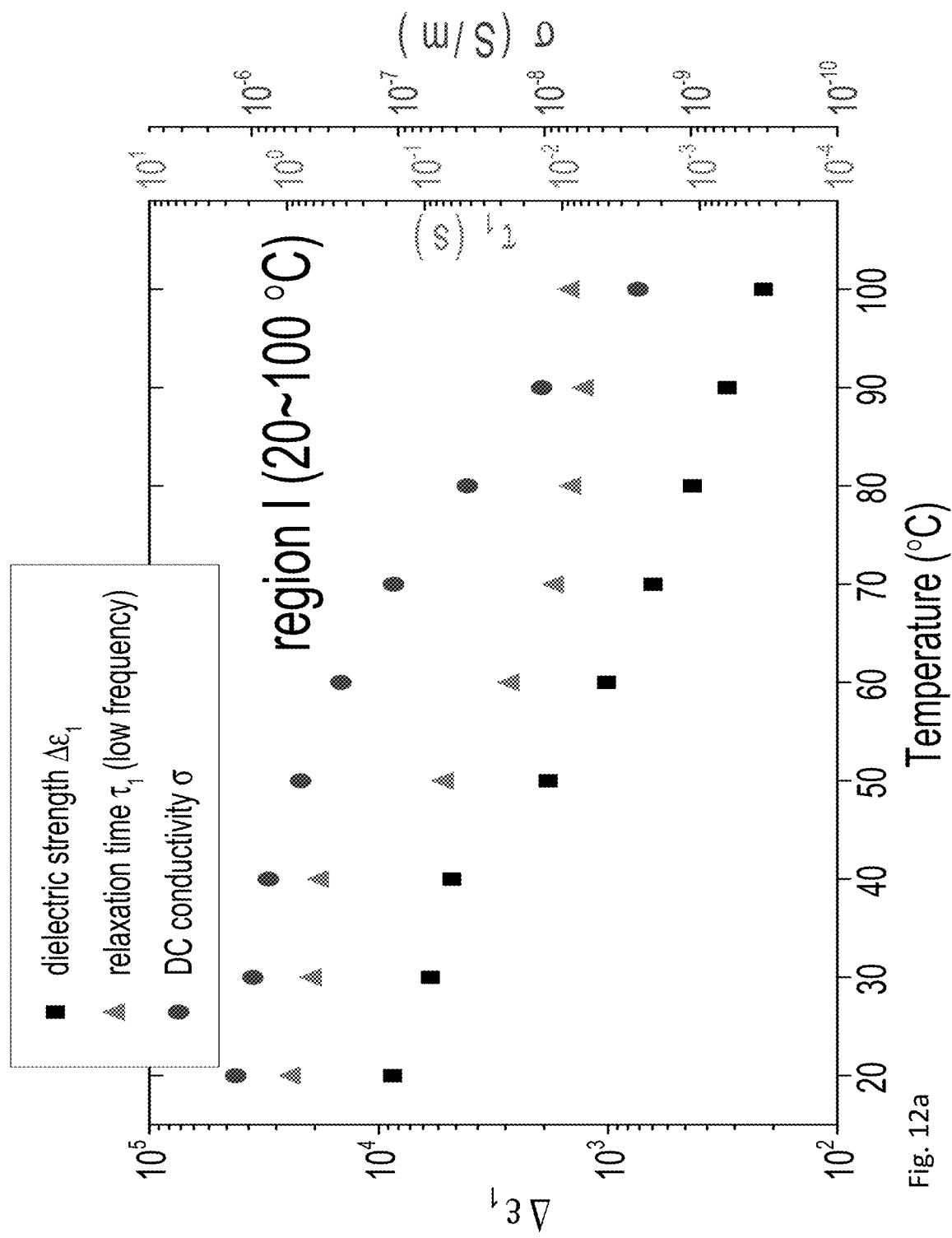
FIGS. 12a-b are a comparison of the temperature dependence between conductivity (σ), relaxation time (τ) and dielectric relaxation strength (Δε) in the region I (a) and in the region II (b): τ and Δε always vary in the same direction, as determined by the cluster size; σ exhibits a similar trend as τ (Δε) in the region I and an opposite trend in the region II, reflecting pre-percolation and post-percolation respectively.

For the high frequency relaxation (relaxation 2), the loss peak maximum shifts to high frequencies with decreasing temperature ($\tau_2$ decreases as temperature decreases (Table 5)), indicating that it is not a thermally-activated relaxation (the activation energy calculated in this way would be negative). It was known that electron tunneling could be the predominant conduction mechanism in carbon-black polymeric composites. Consequently, the gap between CB particles can be treated as an equivalent R-C circuit with the characteristic frequency of available electron concentration (increasing with CB concentration) and the mean displacement (increasing with cluster size). As show in Table 5 and FIG. 12a, a simultaneous increase in the dielectric strength ($\Delta\varepsilon_1$) and the relaxation time ($\tau_1$) implies an aggrandized cluster size with decreasing temperature. It is also known from the previous analysis on the high frequency relaxation that the interparticle distance is reduced with cooling, which allows electrons to traverse the neighboring once-isolated clusters by tunneling or hopping. As a result, the cluster size would increase as temperature decreases and so would the relaxation time and the dielectric relaxation strength, as seen in FIG. 12a. The conductivity also increases because of the increased chance for electrons to percolate through the entire sample (FIG. 12a). Notice the cluster is defined as a CB aggregate including directly-contacted CB particles and indirectly-contacted CB where electrons can tunnel through the thin polymer layer in between (at the time scale of the low frequency relaxation, electrons have the ability to travel through CB-CB gaps with the characteristic time defined in the high frequency relaxation).

An alternative approach to understand this temperature dependence of the low frequency relaxation is by referring to the composition dependence of dielectric properties, because cooling has an equivalent effect of increasing filler concentration. According to the percolation theory, relaxation time ($\tau$) and relaxation strength ($\Delta\varepsilon$) obey the following scaling laws:

$$\tau \sim \begin{cases} \left(\frac{p_c - p}{p_c}\right)^{-\nu(2+\theta)} & (p < p_c) \\ \left(\frac{p_c - p}{1 - p_c}\right)^{-\nu(2+\theta)} & (p > p_c) \end{cases} \quad (11)$$

$$\Delta\varepsilon \sim \begin{cases} \left(\frac{p_c - p}{p_c}\right)^{-\nu(2-\beta)} & (p < p_c) \\ \left(\frac{p_c - p}{1 - p_c}\right)^{-\nu(2-\beta)} & (p > p_c) \end{cases} \quad (11)$$

($\nu$, $\theta$ and $\beta$ are the percolation exponents and $\nu(2+\theta)=3.1$ and $2\nu-\beta=1.3$ are typical numerical values for 3D percolation).

It can be obtained that both $\tau$ and $\Delta\varepsilon$ increase with increasing filler concentration before percolation ($p<p_c$), and decrease after percolation ($p>p_c$). The divergence in $\tau$ and $\Delta\varepsilon$ originates from the divergence in the composition dependence of cluster size. Since the conductivity increases monotonically with filler concentration, one interesting comparison can be made between the conductivity and the relaxation time (or the dielectric relaxation strength) to identify percolation. Namely, the conductivity would exhibit a positive dependence on the relaxation time before percolation and a negative dependence after percolation. As revealed in FIG. 12a and more clearly in FIG. 14, the composite in this region (20~100° C.) still demonstrates pre-percolation behaviors. However, although the temperature dependence of the interparticle distance is known (FIG. 11), conversion to the effective composition and the further analysis cannot be done for by the data at hand without quantitative knowledge of the different properties of the interface polymer (gap-polymer) and the bulk polymer.

Table 5 also shows that the dielectric constant at the high frequency limit ($\varepsilon_\infty$) is invariant upon the temperature change, which is again in accordance with the cluster model because $\varepsilon_\infty$ only depends on the instantaneous polarization. It also implies that the jump between the neighboring CB particles (cluster polarization) is the dominant contribution for the strong dielectric dispersion and for the observed temperature dependence.

Lastly, it is informative to examine the shape parameter ($\alpha_1$): since the conductivity is related with the dielectric loss by $\sigma=\omega\varepsilon''\varepsilon_0$ and the shape parameter $\alpha$ characterizes the slope of the $\varepsilon''(w)$ function at the high frequency limit $$\left(\lim_{w \to \infty} \frac{\partial \varepsilon''}{\partial w} = \alpha - 1\right),$$

the percolation prediction of the frequency exponent of the conductivity ($\sigma_{AC} \sim w^{0.6}$, for 3D percolation, i.e., $\alpha=0.6$). The experimental data ($\alpha_1$ in Table 5) is in fair agreement with this anomalous dispersion model (since EPDM has a low dielectric constant, the assumption of anomalous dispersion is satisfied, see "overview" section). Thus, the non-trivial high increase in the dielectric constant with the addition of a small amount of organoclays (for example, comparing the 29 wt % CB composite with in the absence of OCs vs. in the presence of OCs, FIG. 8) comes from the OC-structured substantially aggrandized CB cluster size, to the extent that the CB structure is almost percolated ($\alpha_1=0.6$).

Figure 13A:
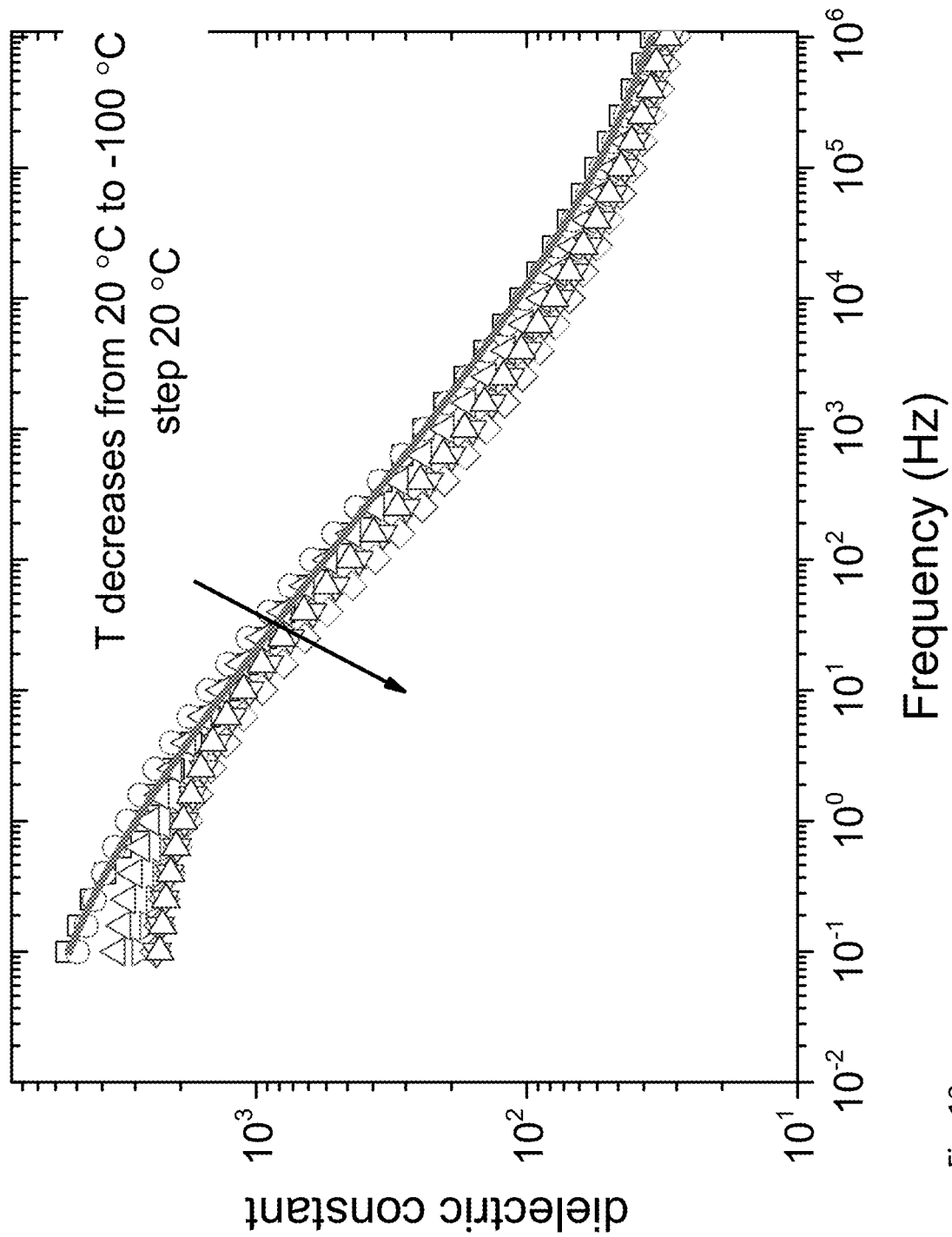
FIGS. 13a-b show dielectric relaxation spectroscopy measurements for the structured composite in the region II (−100~20° C.). The solid line running along the data demonstrates simultaneous fitting to ε' and ε" for the experimental data at 20° C. (black squares). The solid curved lines labeled conductivity and relaxation 1 represent the deconvoluted processes based on the fitting.
Figure 13B:
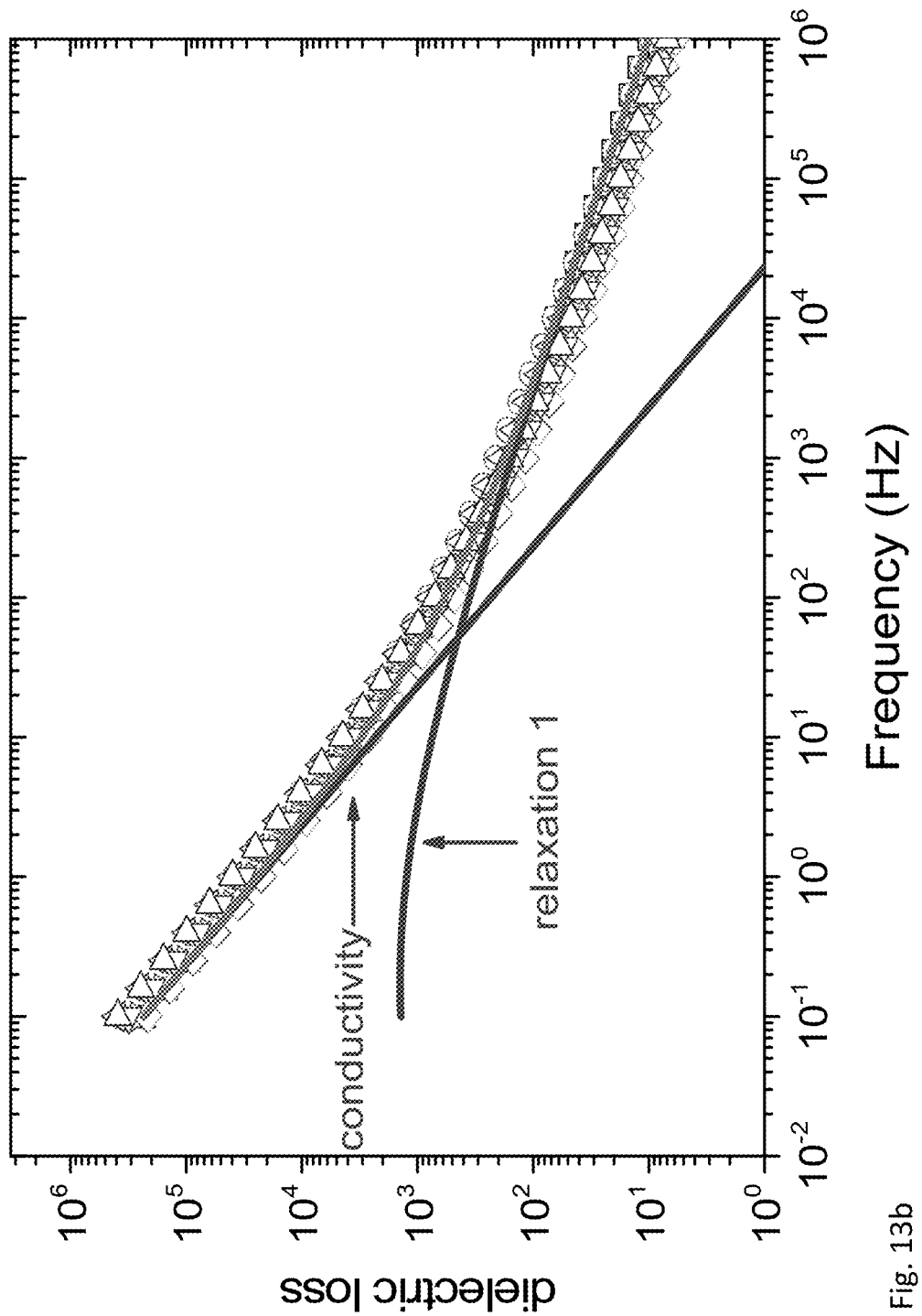

Region II (20° C. to -100° C.): The dielectric properties at the low temperature range are shown in FIGS. 13a-b. $\varepsilon'$ and $\varepsilon''$ in this region are more stable upon temperature change than in region I (cf. FIGS. 10a-b vs. FIGS. 13a-b), but a slight decrease in the dielectric constant can still be recognized. The experimental data of $\varepsilon'$ and $\varepsilon''$ is simultaneously fitted with a unimodal Cole-Cole equation (j=1, equation 8), as exemplified by the lines fit to the data [lines are the deconvoluted curves, representing the conductivity and the relaxation 1 as labeled (vide supra)]. The best-fit results are summarized in Table 6.

TABLE 6

Best-fit parameters for the dielectric curves in region II (-100~20° C.)

| T (° C.) | $\varepsilon_\infty$ | $\Delta\varepsilon_1$ | $\tau_1$ (s) | $\sigma_{dc}$ (S/m) | $\alpha_1$ |
|---|---|---|---|---|---|
| 20 | 20.86 | 8.70E+03 | 9.07E-01 | 1.29E-06 | 0.60 |
| 10 | 22.02 | 7.74E+03 | 3.91E-01 | 1.69E-06 | 0.58 |
| 0 | 22.86 | 5.93E+03 | 1.53E-01 | 2.07E-06 | 0.56 |
| -10 | 23.18 | 4.80E+03 | 9.11E-02 | 2.28E-06 | 0.55 |
| -20 | 23.07 | 4.11E+03 | 7.86E-02 | 2.17E-06 | 0.55 |
| -30 | 22.74 | 3.67E+03 | 8.72E-02 | 1.81E-06 | 0.55 |
| -40 | 22.41 | 3.56E+03 | 1.26E-01 | 1.41E-06 | 0.56 |
| -50 | 22.28 | 3.50E+03 | 1.58E-01 | 1.20E-06 | 0.56 |
| -60 | 22.39 | 3.36E+03 | 1.43E-01 | 1.22E-06 | 0.56 |
| -70 | 22.80 | 3.18E+03 | 9.99E-02 | 1.52E-06 | 0.56 |
| -80 | 23.10 | 3.02E+03 | 7.47E-02 | 1.78E-06 | 0.55 |
| -90 | 23.37 | 2.91E+03 | 6.02E-02 | 2.00E-06 | 0.55 |
| -100 | 23.57 | 2.85E+03 | 5.17E-02 | 2.20E-06 | 0.55 |

As expected, $\varepsilon_\infty$ is invariant over the measured temperature range and is in agreement with the results expressed in the region I (Table 5). $\alpha_1$ exhibits a value slightly smaller than, but still close to, the percolation prediction of 0.6, suggesting the system is near percolation.

Figure 12B:
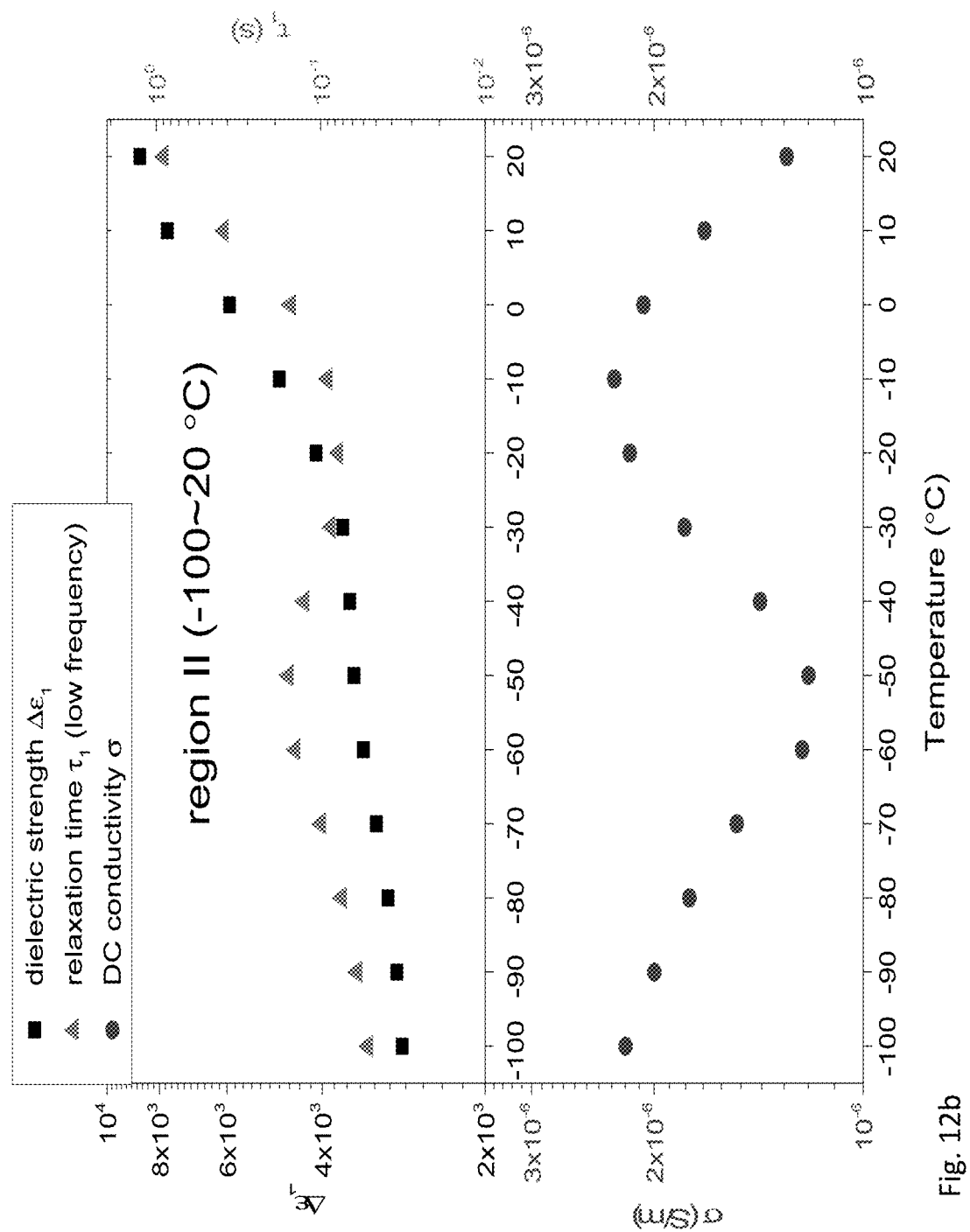

The dielectric relaxation strength ($\Delta\varepsilon_1$), relaxation time ($\tau_1$) and the conductivity ($\sigma_{dc}$) are plotted as a function of temperature in FIG. 12b. The temperature dependence in this region is different from in region I (20~100° C.) (cf. FIG. 12a vs. FIG. 12b). Specifically, as temperature decreases until -20° C., $\Delta\varepsilon_1$ and $\tau_1$ both decrease, exhibiting an opposite trend to $\sigma_{dc}$. Further cooling does not induce a clear trend, with $\Delta\varepsilon_1$ and $\tau_1$ stabilized [there is only minor fluctuation in $\tau_1$, cf. more than one decade drop in $\tau_1$ (from 20 to -20° C.) vs. tenth of a decade variation around the average (below -20° C.)], and with $\sigma_{dc}$ fluctuating as a response to $\tau_1$.

The glass transition ($T_g$) of the EPDM composite is around -40° C. (as measured by DSC), indicating that the thermal shrinkage would continue below 20° C. in a similar manner to that observed in region I, until $T_g$ is reached. The increase in the conductivity in the first few measurements (from 20 to −20° C.) also confirms it. Consequently the simultaneous decrease in $\Delta\varepsilon_1$ and $\tau_1$ with decreasing temperature and the opposite temperature dependence between $\tau_1$ (or $\Delta\varepsilon_1$) and $\sigma_{dc}$ are clear indications that the system is already percolated at 20° C., by analogy with the composition dependence of dielectric properties after percolation (equation 11). Namely, after percolation, the cluster size would decrease with increasing filler concentration (or cooling), so would the relaxation time and the dielectric relaxation strength. The conductivity, however, should keep increasing, as it increases monotonically with filler loading. The decrease in $\Delta\varepsilon_1$ results in a decrease in the low-frequency dielectric constant.

Figure 14:
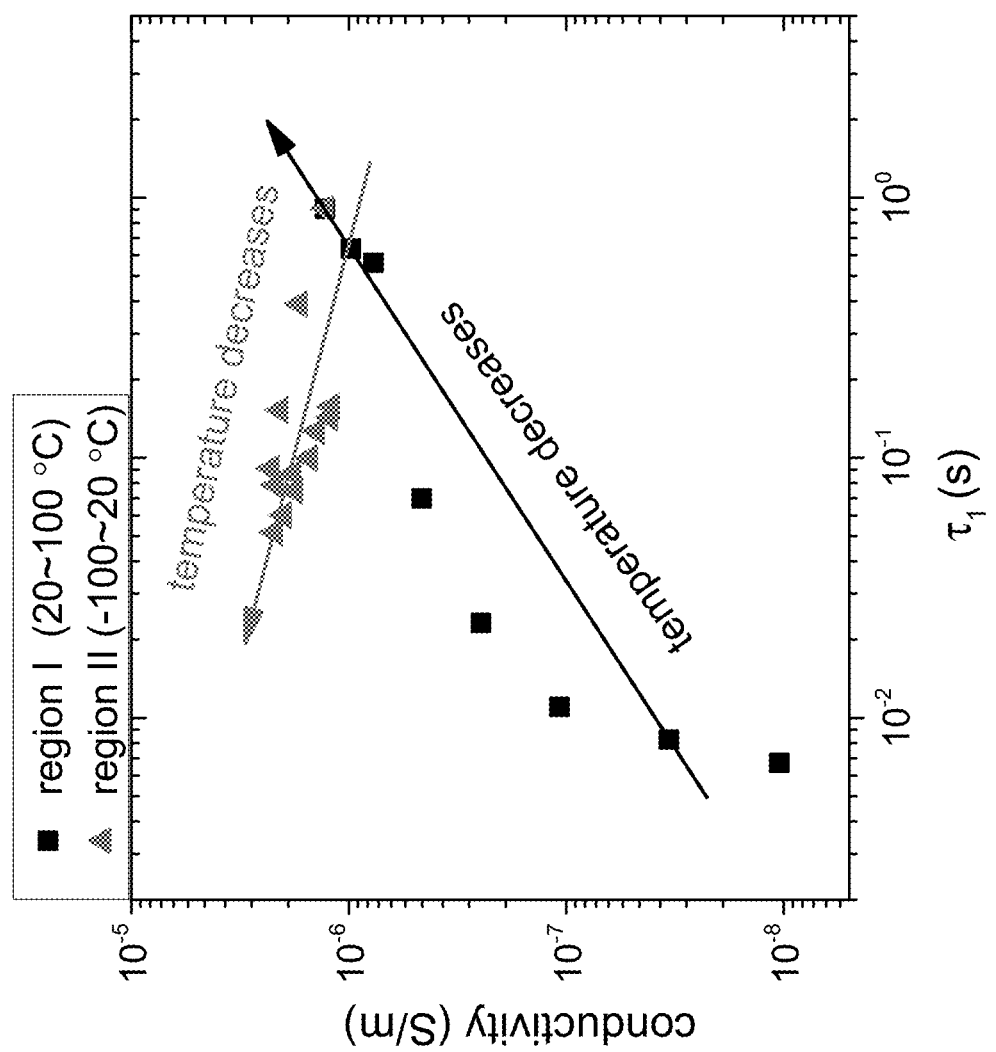
FIG. 14 is a criterion proposed to identify percolation: the positive relation between σ and τ suggests the pre-percolation (region I, squares); the negative relation between σ and τ suggests the post-percolation (region II, triangles).

Below −20° C. (close to $T_g$), the polymer shrinkage becomes comparable to the CB shrinkage, which might account for the stabilization of the dielectric properties. Currently, we are not entirely convinced whether the fluctuation appeared on $\sigma_{dc}$ (or $\tau_1$) reflects the intrinsic properties of the material or the random fluctuation (the magnitude of the variation in $\sigma_{dc}$ is on the same order of magnitude over the total region II). However, following the proposed criterion for the identification of percolation (plot of $\sigma_{dc}$ vs. $\tau$, vide supra), it is clearly revealed that $\sigma_{dc}$ exhibits a positive dependence on $\tau$ in region I and a negative dependence in region II (FIG. 14). Notice even in the low temperature range (<−20° C.) where there exists some fluctuation in $\sigma_{dc}$ and $\tau_1$, this negative dependence is still maintained (an increase in $\sigma_{dc}$ would inevitably corresponds to a decrease in $\tau_1$, over the entire region II). It implies the different nature of the system in different regions (pre-percolation in region I and post-percolation in region II with a crossover at 20° C.) and the remarkable sensitivity of this criterion.

Lastly, it is observed that the conductivity does not increase substantially after percolation ($\tau$<20° C.). Two possible mechanisms can account for this behavior: (a) The addition of OC fillers can induce a self-assembly of CB particles and stabilize their enlarged clusters. At a constant CB concentration, the clusters in the structured composite would grow at the expense of less dense structures, than those in the random composite. Consequently, after percolation, the established CB-CB contacts in the structured composite would thus be substantially less than in the random composite, causing the mild multiplication of percolated pathways, i.e., conductivity. (b) At the same time, a second mechanism relates to the blocking effect of the OC fillers to the motion of the electrons. Since the carbon black particles are preferentially distributed in the vicinity of the organoclays (by design of the structure composite embodiment), the high aspect ratio OCs promote the formation of aggrandized CB clusters (FIGS. 6a-e and FIG. 15a). As a result, the dielectric constant of the structured CB composite is substantially increased proportionally to the CB cluster size which determines the electron displacement (the dipole moment is proportional to $e^-$ separation at a certain CB loading). At the same time, the dielectric loss is still maintained at a low value because of the composite structure (FIG. 15a OC suppress the number of percolated pathways, or equivalently, OCs have a blocking effect on the electron transport between different CB clusters). As a prototype example (FIGS. 8a-b), the structured CB composite with 29 wt % CB and 1 wt % o-MMT exhibits a dielectric constant ($\varepsilon'$) of 528 and a dissipation factor (tan δ) of 0.69 at 20 Hz. The dielectric constant is ten times the dielectric constant of its counterpart (random CB composite with 29 wt % CB, $\varepsilon'$ (20 Hz)=58), whereas the dissipation factor only becomes one time larger (random CB composite with 29 wt % CB, tan δ (20 Hz)=0.27).

An alternate approach to explain the origins of the strongly increased effective permittivity in our preferred embodiments can be demonstrated through the dielectric relaxation studies (DRS measurements). As shown in FIG. 15b, three relaxation processes underlie the dielectric responses of CB composites: ac conductivity, cluster polarization, and interparticle polarization.

The conductivity is strongly dependent on the filler concentration (especially near the percolation), and to a less extent on the structured morphology, e.g., as shown in FIG. 8, the morphology change increases tan δ by one time (random composite with 29 wt % CB vs. structured CB with 29 wt % CB), whereas the additional 3 wt % CB inclusion increases tan δ from 0.27 (random composite with 29 wt % CB) to 8.95 (random composite with 32 wt % CB). The cluster polarization is determined by the cluster size, with both relaxation strength ($\Delta\varepsilon$) and relaxation time ($\tau$) increasing with increasing cluster size. Moreover, in addition to the filler concentration, we provide an alternative approach to manipulate the cluster size, i.e., via the architecture design of CB distribution (structured-CB composite). The interparticle polarization relies on the interparticle distance (determined by the chemistry of CB and polymer) and the permittivity of polymer. With that in mind, it is possible to adjust the dielectric properties by reshaping (broaden or narrow) the relaxation curve and shifting the peak location, to meet the ever-increasing requirements in the dielectric fields.

The morphology and the dielectric properties of a structured CB rubber composite were investigated in this example. It was found that the addition of o-MMT could induce aggrandized CB clusters by assembling neighboring CB aggregates. As a result, a synergistic effect in the dielectric properties was achieved, with a substantially increased dielectric constant and a restrained dielectric loss. The former was associated with the large electron displacement and the latter was caused by the diminished numbers of percolated pathways (i.e., the same two mechanisms identified before).

This also demonstrates an alternative way to adjust the cluster size by the architecture design of filler distribution, as a complement to the conventional approach via the control of filler concentration. Since the cluster size may be needed for the dielectric properties of conductive-filler filled composites, it should be of significance.

Example 3

In this example, polarization of carbon black particulates (as individual particles, as well as clusters/agglomerates of particles) was relied on to achieve a high permittivity at 60 Hz (effective 60 Hz dielectric constant) in composites, accompanied with low dielectric losses.

Two major classes of formulations were systematically studied: a) rubber 1/carbon-black/filler composites: these provide a close match of dielectric and thermomechanical properties to commercially available blind study elastomeric tubes. b) rubber/carbon-black/organo-clay/filler composites: as new formulation materials that meet or exceed the project-defined property requirements, and improve upon the blind study tube materials, by provide new functionalities or behaviors.

Composite Processing and Materials: Ethylene propylene diene monomer, high-k filler, carbon black, and organoclay composites were prepared by mixing organoclay, high-k fillers and carbon black along with a plasticizer and a curing agent on a twin-head kneader. The dielectric behavior of paraffin-plasticized peroxide-cured EPDM (ethylene propylene diene) filled with high k filler (a commercially available BaTiO$_3$), carbon black (a commercially available rubber-grade Spheron 6000 filler) with and without organo-clay (a commercially available dimethyl-ditallow-ammonium modified montmorillonite, grade I44P) were studied.

Test Methods including Dielectric permittivity measurements: The ASTM D150-11 standard test method was used for dielectric characterization and analysis, with a charge measurement equipment and a temperature-controlled chamber Delta 9023 allowing dielectric permittivity and ac loss quantification (a) as a function of frequency from 20 Hz to 10 kHz at room temperature; and (b) over a temperature range of 50 degrees C. to −50 degrees C. (in 5 degree C. equilibrated T-steps). A 1 V electrical potential is applied to the samples for each frequency/temperature. The instrument provides the complex capacitance, with real and imaginary parts as the output data (collected by a Stanford Research Lock-In amplifier SR830 DSP). Using parallel plate geometry in a two terminal configuration, these capacitance values were converted to the relative dielectric permittivity values for each frequency and/or temperature. To be able to use parallel plate capacitor geometry, 4 cm$^2$ colloidal silver electrodes (4×1 cm) were painted on both sides of the "films."

A) Rubber (paraffin-plasticized DCP-peroxide-cured EPDM)/carbon—black/filler composites: These composite formulations provided a close match of dielectric and thermomechanical properties to the blind study rubber tubes, for the proper loading of carbon black (the exact % or PHR of carbon black depends on the CB grade, since the required for performance parameter is to load high enough CB filler to agglomerate the CB particles: CB agglomerates can be polarized under the electric field with 'large' dipoles (electron cloud of multiple particulates over a distance comparable to the agglomerate size, but the CB loading should be held below the percolation concentration of the specific CB grade to avoid conductivity across the rubber). The most sensitive criterion for this measurement is the magnitude of dielectric losses (e.g. tan δ value, which start deviating from 10% for dielectric well below percolation, 100% below but close to percolation, to much higher values over 600% and sharply rising approaching the percolation loading of the CB grade in question).

An example of the formulations made and characterized with Spheron 6000 carbon black is shown in Table 7.

Even for the untrained eye, purely looking at the processing of the rubber while it is roll-milled or kneaded, the 15 wt. % CB loading (31 PHR) is too low, rubber is far too soft, and 32 wt. % CB loading (88 PHR) is too high, the resulting composite is grainy in texture. The absolute numbers (e.g. PHR or wt %) are strongly dependent on the CB grade.

Figure 16A:
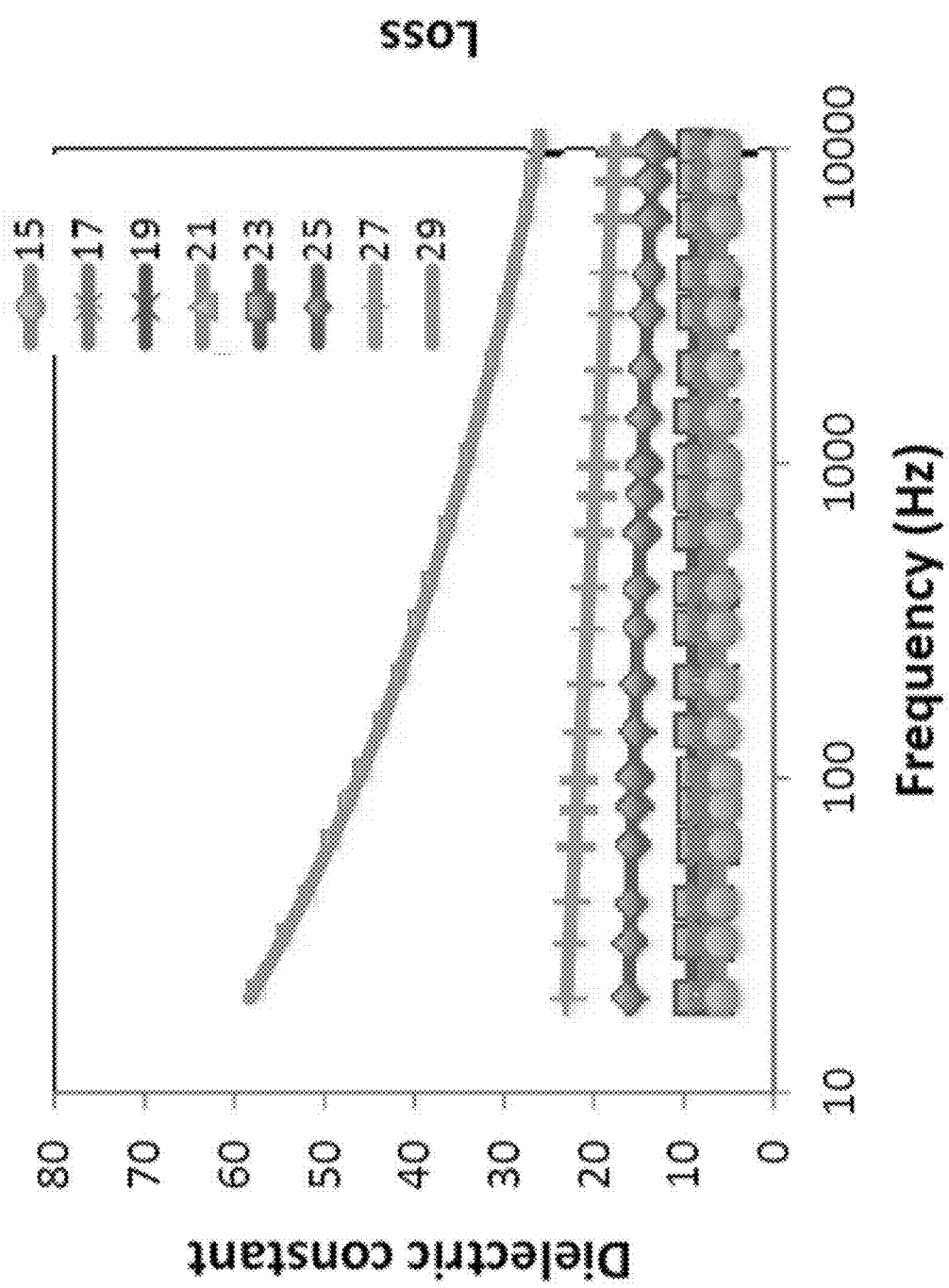
FIGS. 16a and b show the dielectric constant plotted and loss plotted vs frequency. Each line in the graph represents a sample (from C1-C8 which includes 20% of BT-04 and 15-29% of carbon black).
Figure 16B:
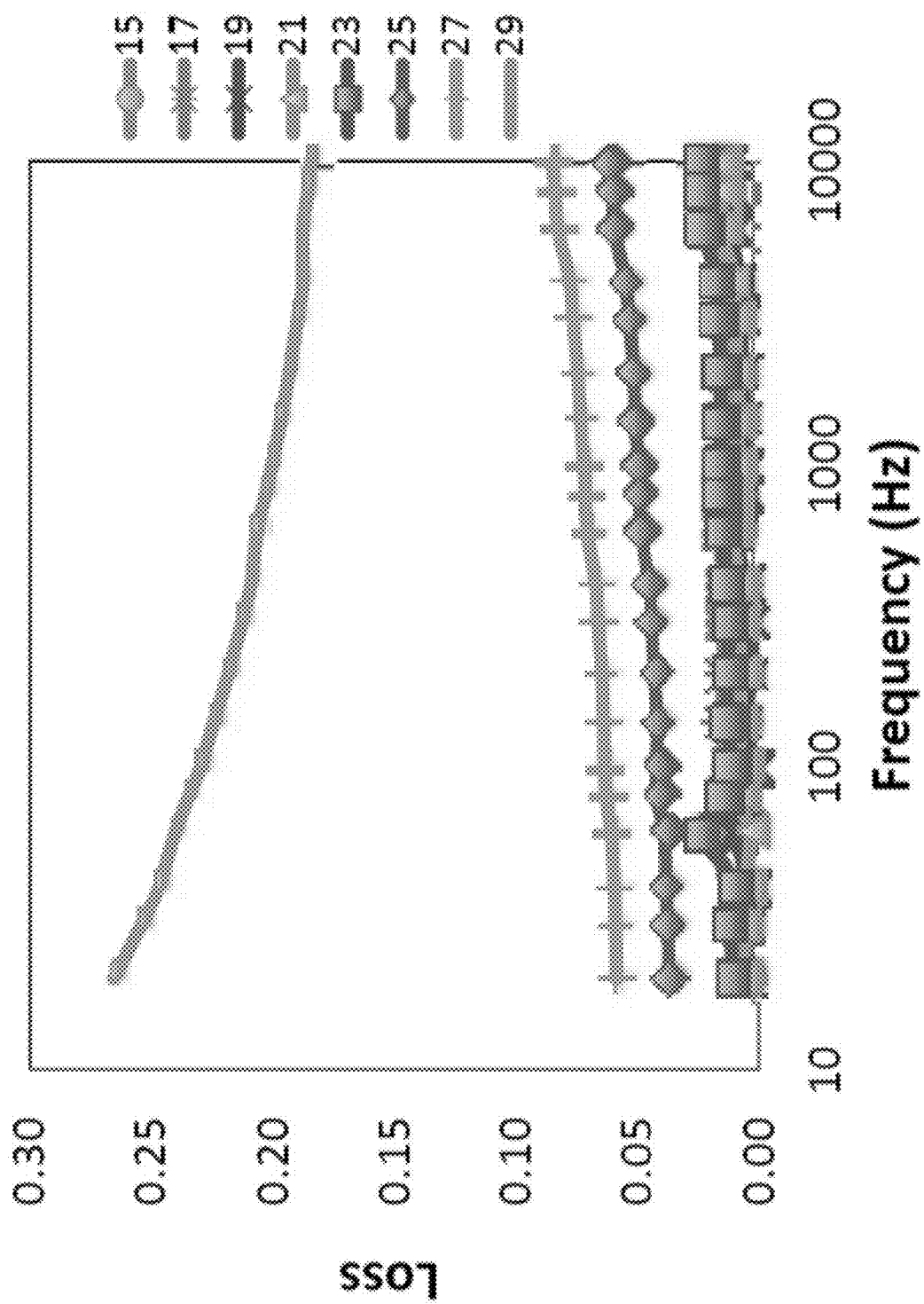
Figure 17A:
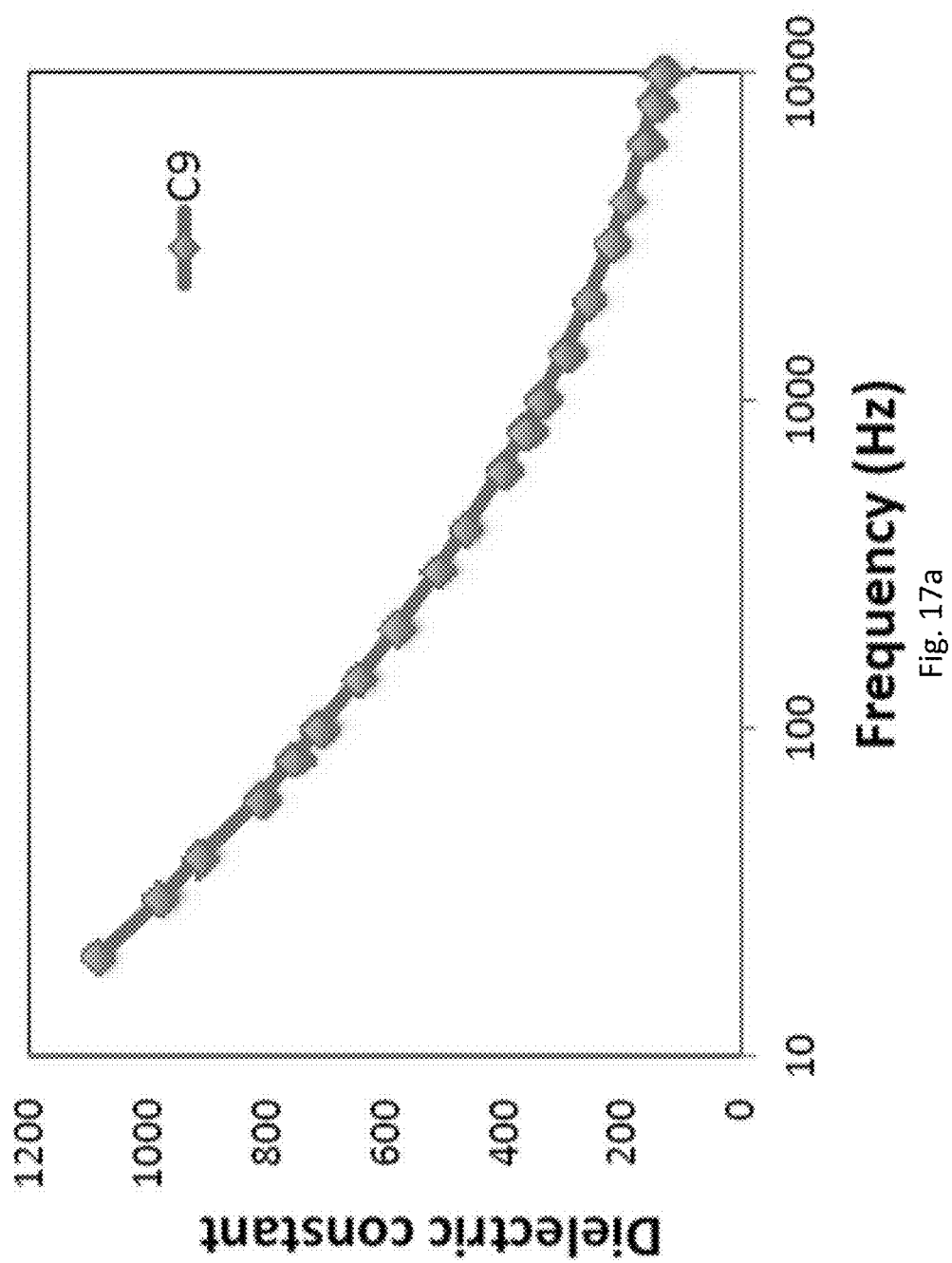
FIGS. 17a and b show the dielectric constant (FIG. 17a) and loss (FIG. 17b) plotted vs frequency. The plot is for sample C9 which has EPDM, 20% BT-04, and 32% carbon black.
Figure 17B:
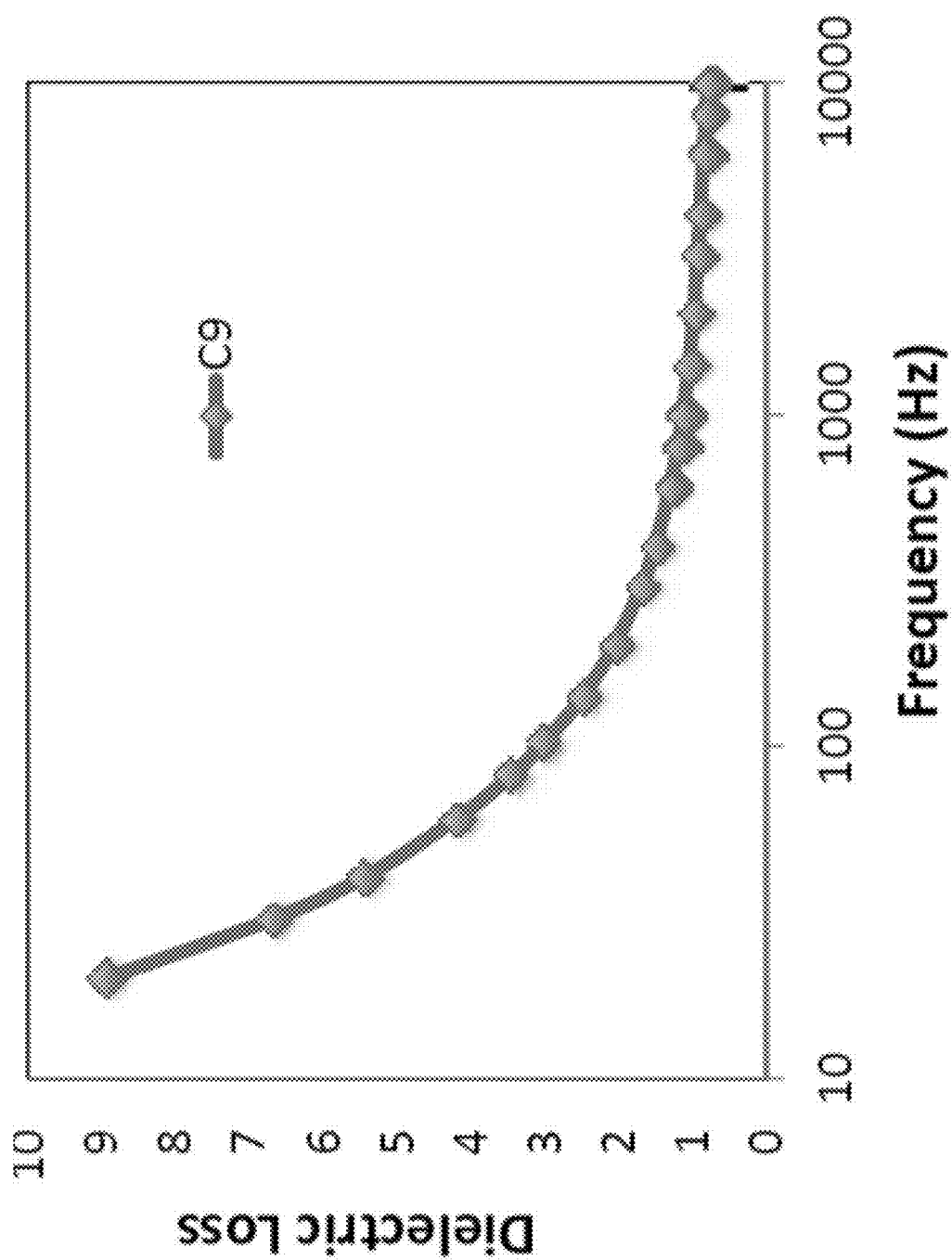

The above formulation yields the dielectric properties show in FIGS. 16a and b, where, CB loading below 27 wt. % provides well behaved dielectrics (loss <0.1), and the 29 wt. % CB composite starts exhibiting signs of ac conductivity (loss~1.0), and further increase of CB loading results in much higher losses as the CB loading is approaching its percolation concentration, as seen in FIGS. 17a and b.

Figure 18:
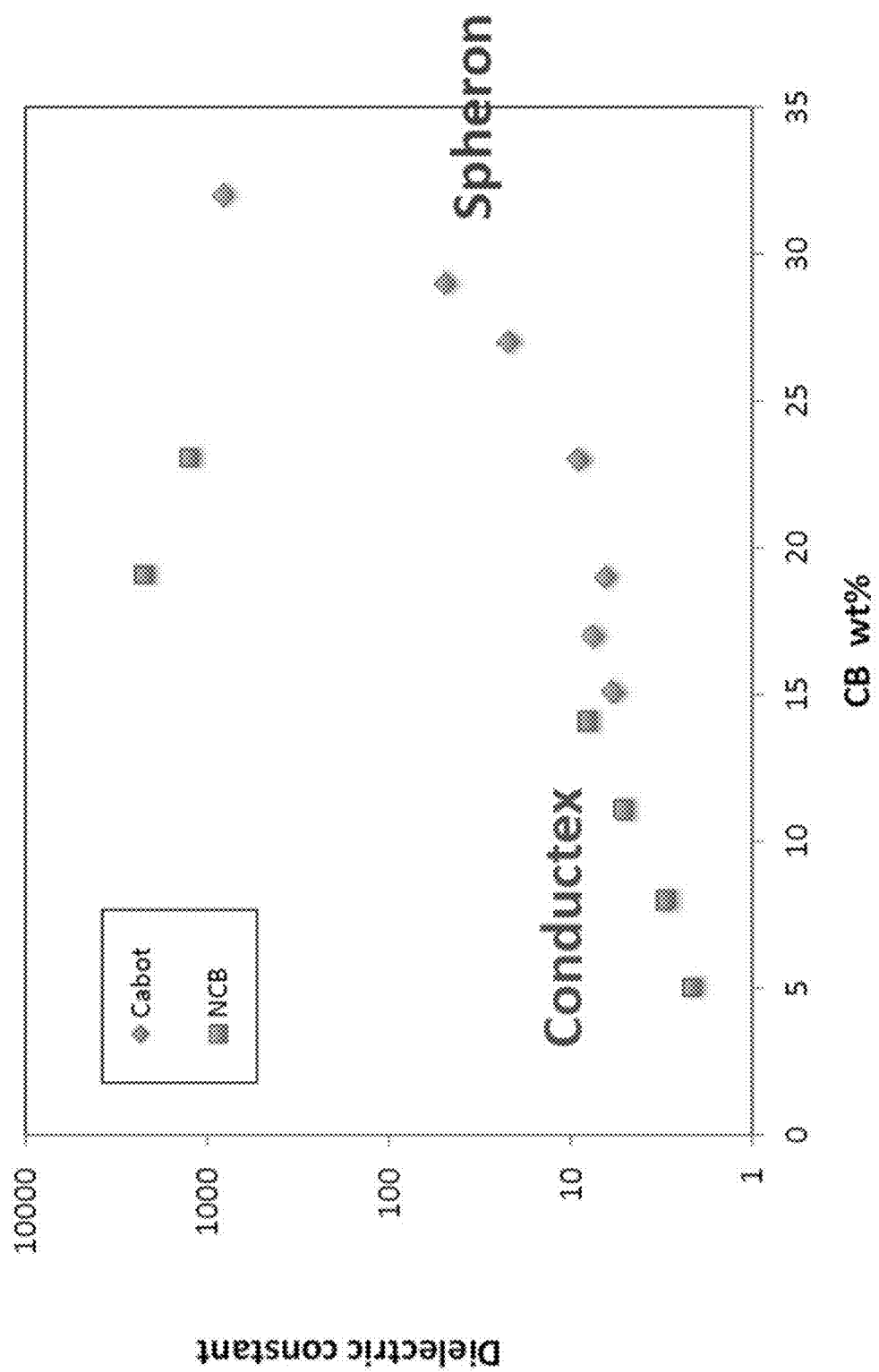
FIG. 18 is the dielectric constant of conductex (squares) and spheron 6000 (diamonds) plotted versus the carbon black weight percent.

As mentioned before, changing the CB type/grade will qualitatively change the behavior and quantitatively shift the CB loading of percolation. In FIG. 18, it is shown that the comparison of Spheron6000 ($\varphi_{perc}$~33 wt %) vs. Conductex CB ($\varphi_{perc}$~17 wt %). In some instances, given the "width" of loadings where the desired behavior is achieved, the Spheron CB may be the better choice between the two grades with a much wider loading region of interest (25-30 wt. %), bearing promise for much higher tolerances of dielectric properties on processing and formulation variations.

For the Spheron CB, at loadings around 27 wt. % the blind study tube performance can be achieved.

Figure 19:
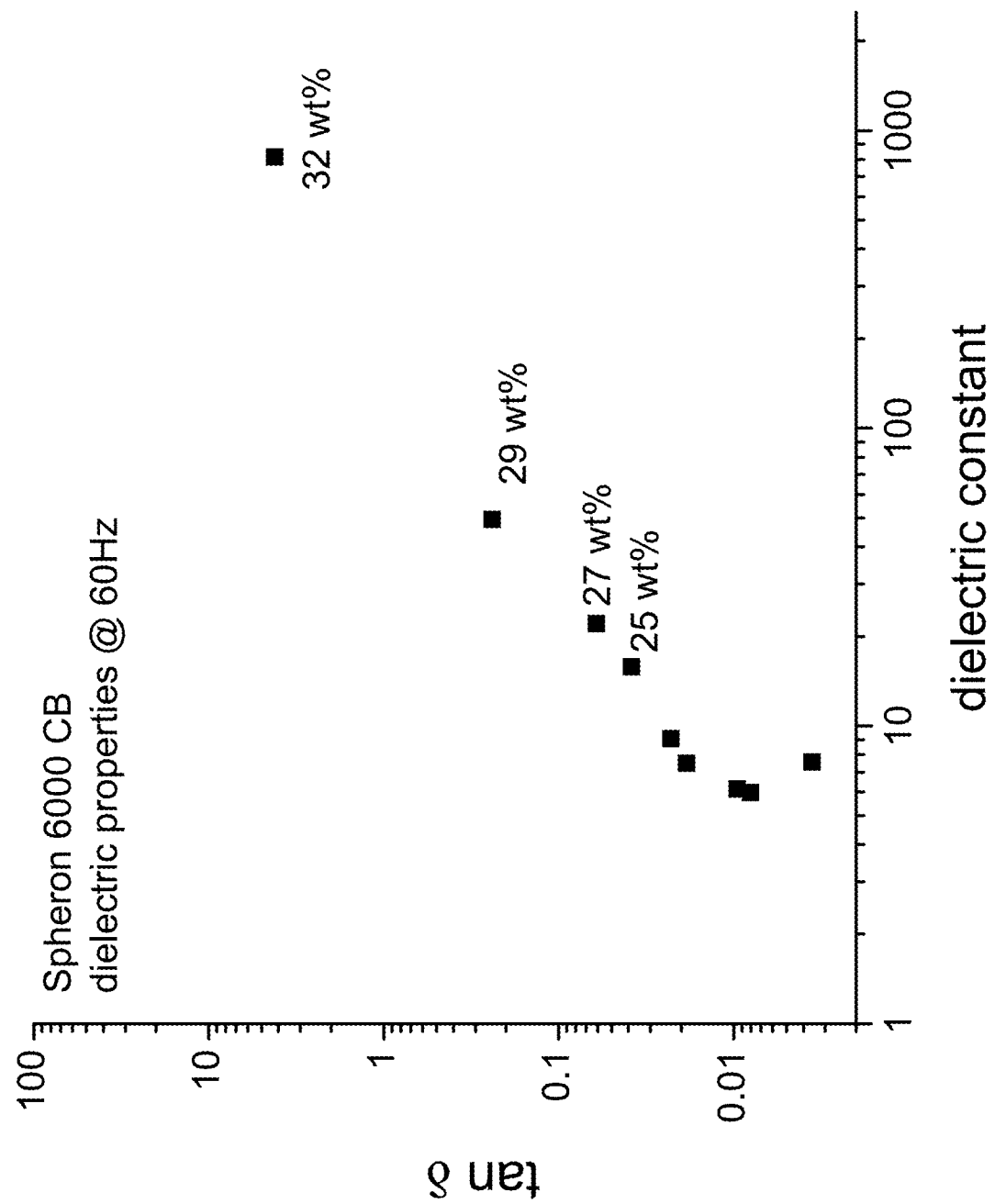
FIG. 19 is the tan δ plotted against dielectric constant of spheron 6000 at 60 Hz.

B) Rubber/carbon-black/organo-clay/filler composites were designed to specific requirements with desired dielectric performance for a specific application. Different formulations may be designed using the same techniques as described below to meet different design requirements. These examples are not limiting. In order to design the desired performance the following steps were taken:

1. Plot 60 Hz loss versus permittivity for formulations of varied CB loading. An example is seen in FIG. 19. The Spheron loadings which best match the desired (blind study #4 tube) performance were between 27 wt. % and 29 wt. %.

2. Selecting the CB loading closest to desired performance (in the above case 29 wt % Spheron 6000), rubber composites are processed with varied organo-clay loadings of 1 wt % to about 7 wt % of organo-clay (for I44P organo-clay in polyolefins, in some instances the intercalated structures start "filling space" at about 9 wt %, where organo-clay is added at the expense of the filler (that is, $\varphi_{OC}+\varphi_{ceram}=20$ wt % constant). The carbon black used below was Spheron 6000.

TABLE 7

Formulations of EPDM/CB/BT rubber composites for Spheron 6000

| | weight percent. | | | | | PHR | | | | |
|---|---|---|---|---|---|---|---|---|---|---|
| | rubber | paraffin | carbon | ceramic | DCP | rubber | paraffin | carbon | ceramic | DCP |
| C1 | 49.24 | 14.77 | 15 | 20 | 0.98 | 100 | 30 | 30.46 | 40.62 | 2 |
| C2 | 47.73 | 14.32 | 17 | 20 | 0.95 | 100 | 30 | 35.62 | 41.90 | 2 |
| C3 | 46.21 | 13.86 | 19 | 20 | 0.92 | 100 | 30 | 41.11 | 43.28 | 2 |
| C4 | 44.70 | 13.41 | 21 | 20 | 0.89 | 100 | 30 | 46.98 | 44.75 | 2 |
| C5 | 43.18 | 12.95 | 23 | 20 | 0.86 | 100 | 30 | 53.26 | 46.32 | 2 |
| C6 | 41.67 | 12.50 | 25 | 20 | 0.83 | 100 | 30 | 60.00 | 48.00 | 2 |
| C7 | 40.15 | 12.05 | 27 | 20 | 0.80 | 100 | 30 | 67.25 | 49.81 | 2 |
| C8 | 38.64 | 11.59 | 29 | 20 | 0.77 | 100 | 30 | 75.06 | 51.76 | 2 |
| C9 | 36.36 | 10.91 | 32 | 20 | 0.73 | 100 | 30 | 88.00 | 55.00 | 2 |

| | weight percent. | | | | | PHR | | | | |
|---|---|---|---|---|---|---|---|---|---|---|
| | rubber | parafin | carbon | ceramic | o-clay | rubber | parafin | carbon | ceramic | o-clay | DCP |
| CL1 | 38.64 | 11.59 | 29 | 10 | 10 | 100 | 30 | 75.06 | 25.88 | 25.88 | 2 |
| CL2 | 38.64 | 11.59 | 29 | 0 | 20 | 100 | 30 | 75.06 | 0.00 | 51.76 | 2 |
| CL01 | 38.64 | 11.59 | 29 | 19 | 1 | 100 | 30 | 75.06 | 49.18 | 2.59 | 2 |
| CL02 | 38.64 | 11.59 | 29 | 17 | 3 | 100 | 30 | 75.06 | 44.00 | 7.76 | 2 |
| CL03 | 38.64 | 11.59 | 29 | 15 | 5 | 100 | 30 | 75.06 | 38.82 | 12.94 | 2 |
| CL04 | 38.64 | 11.59 | 29 | 13 | 7 | 100 | 30 | 75.06 | 33.65 | 18.12 | 2 |
| CL | 40.15 | 12.05 | 27 | 15 | 5 | 100 | 30 | 67.25 | 37.36 | 12.45 | 2 |

Figure 20A:
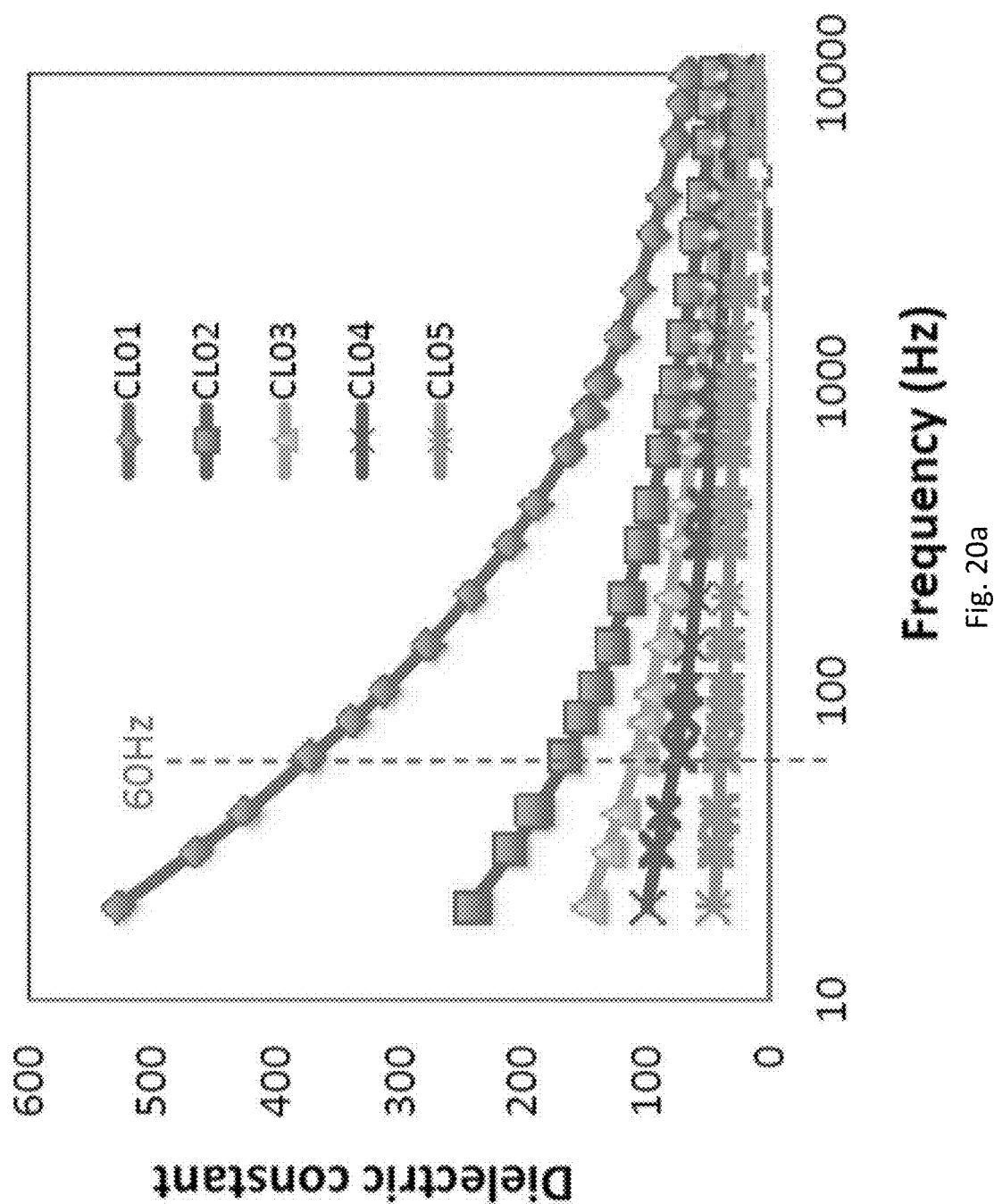
FIGS. 20a and 20b are the dielectric constant (FIG. 20a) and loss (FIG. 20b) plotted against the frequency for five samples (CL01-CL05).
Figure 20B:
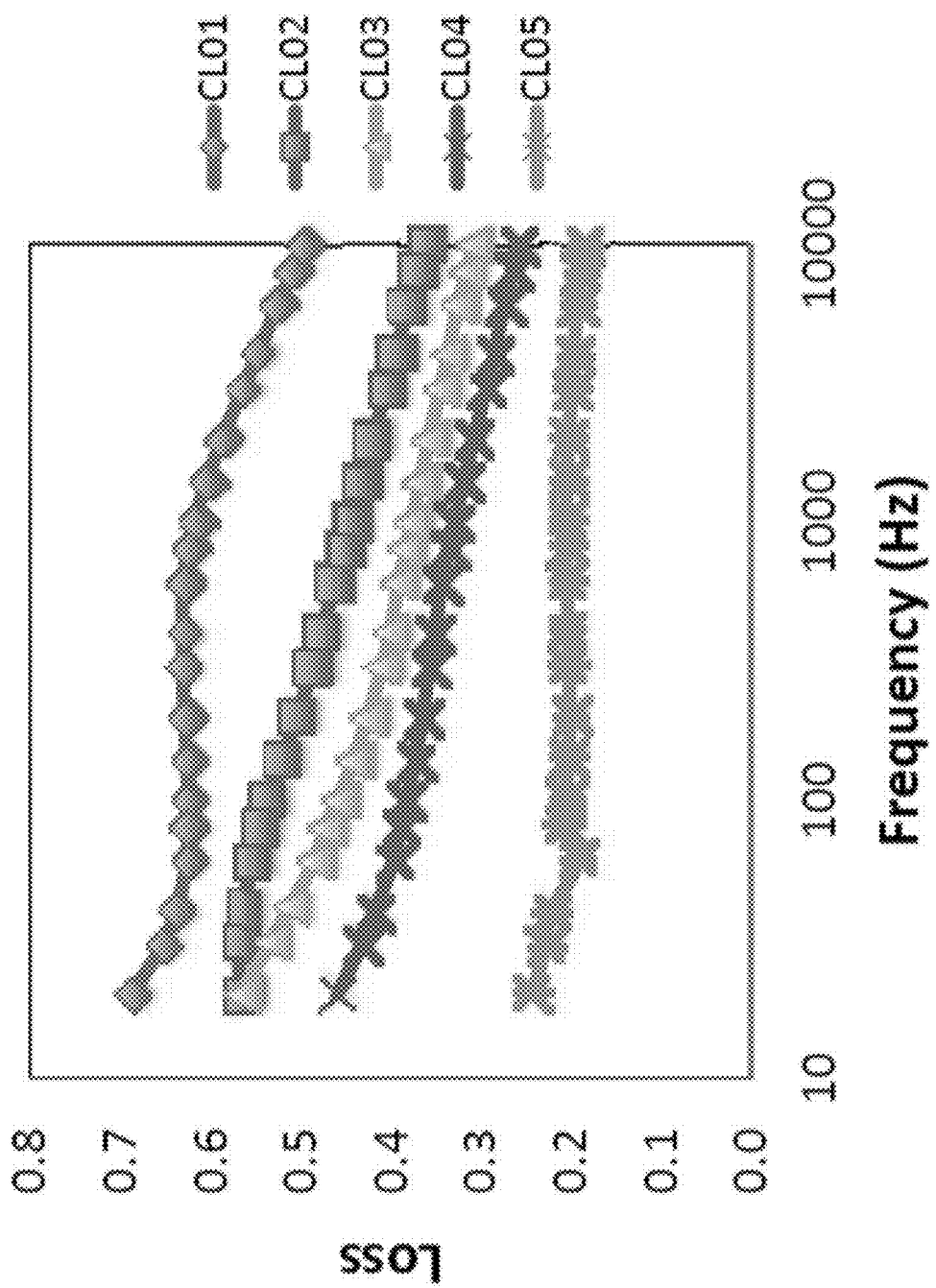

3. Characterize the dielectric properties of the formulations, to verify that the selection of CB loading (29 wt %, above) was proper, and adjust CB loading if/as needed. This is shown in FIGS. 20a and b.

Figure 21A:
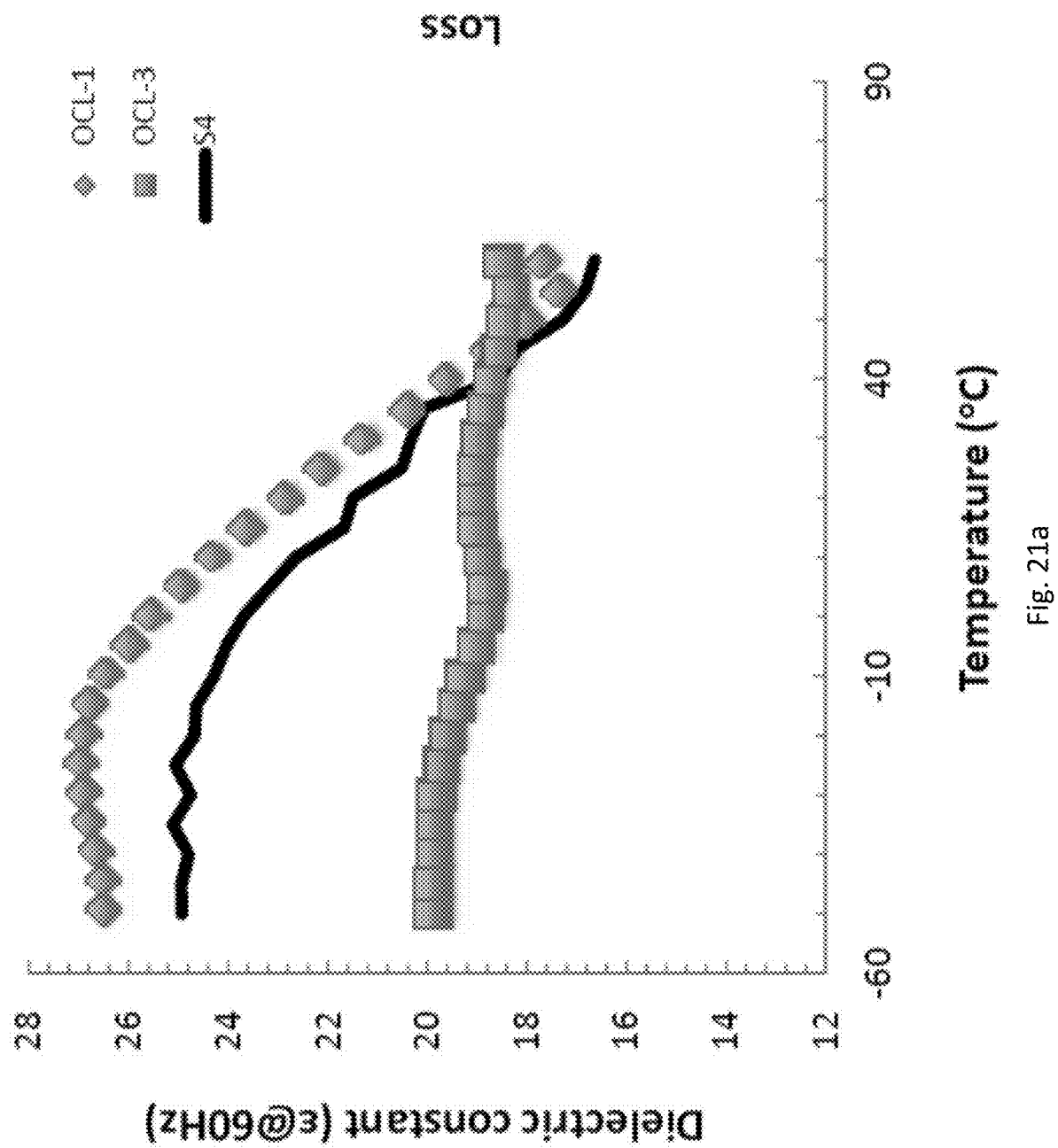
FIGS. 21a and 21b are the dielectric constant (FIG. 2aa) and loss (FIG. 2ab) plotted against the frequency for three samples (OCL-1, OCL-3, and a blind control).
Figure 21B:
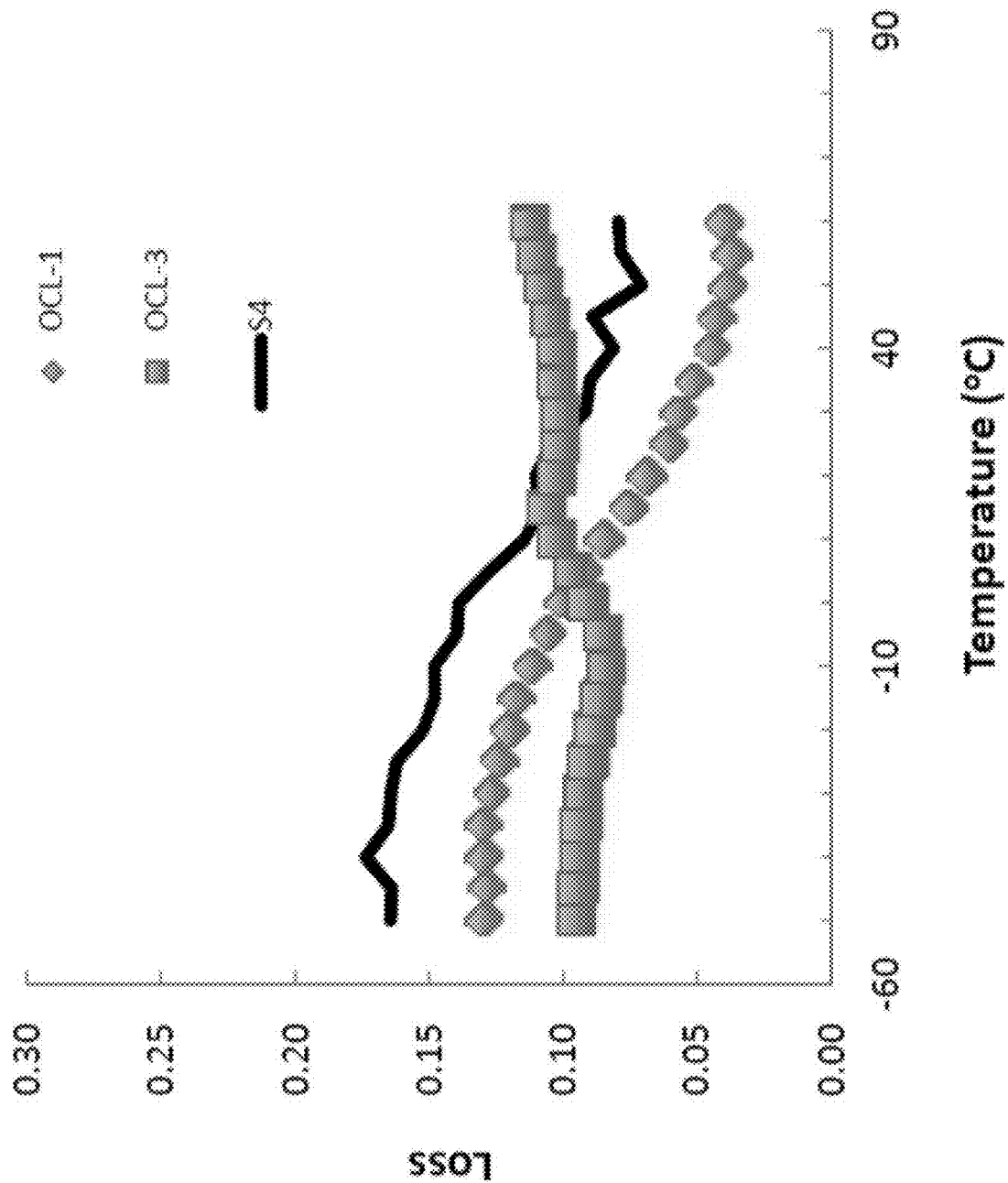

The above data suggest that the 29 wt. % was larger than needed (losses >>0.1 and 60 Hz-permittivities >>20), hence a 25 wt % Spheron CB and 1-3 wt. % of I44P organoclay would perform closer to the desired values in this instance (better match for blind study #4 tube, in this case). Hence, a second iteration of formulations is needed at 25 wt. % Spheron and 3-5 wt. % organoclay:

| Weight percent (wt %) | | | | | | PHR | | | | | |
|---|---|---|---|---|---|---|---|---|---|---|---|
| Rubber | Paraffin | Cabot CB | BT-04 BaTiO2 | I44P OC | DCP | Rubber | Paraffin | Cabot CB | BT-04 BaTiO2 | I44P OC | DCP |
| 41.67 | 12.50 | 25 | 19.5 | 0.5 | 0.83 | 100 | 30 | 60 | 46.80 | 1.20 | 2 |
| 41.67 | 12.50 | 25 | 19.25 | 0.75 | 0.83 | 100 | 30 | 60 | 46.20 | 1.80 | 2 |
| 41.67 | 12.50 | 25 | 19 | 1 | 0.83 | 100 | 30 | 60 | 45.60 | 2.40 | 2 |
| 41.67 | 12.50 | 25 | 17 | 3 | 0.83 | 100 | 30 | 60 | 40.80 | 7.20 | 2 |
| 41.67 | 12.50 | 25 | 15 | 5 | 0.83 | 100 | 30 | 60 | 36.00 | 12.00 | 2 |
| 41.67 | 12.50 | 25 | 13 | 7 | 0.83 | 100 | 30 | 60 | 31.20 | 16.80 | 2 | which yields for 1 wt. % OC (OCL-1, in graph) results very closely to a blind study (S-4, in graph) performance, and for 3 wt. % (OCL-3) results that are preferable to that of the blind study (e.g. temperature-independent permittivity at 60 Hz), as shown in FIGS. 21a and b.

4. If step #3 yielded the desired dielectric performance, the proper CB loading is identified (e.g. 25 wt. % of Spheron 6000 is ok), otherwise a second iteration of the CB loading is needed (repeat step #3 with a third value of CB loading).

5. Formulation fine tuning and optimization. Once the dielectric performance is achieved, the formulation can be fine-tuned to define the property set by measuring the other desired properties, at the identified loading of CB and organoclay. Standard rubber design rules should apply.

5a. The addition of organic additives, or for mechanical properties, e.g., changing the modulus or elongation at break, can be achieved by adjusting the plasticizer and/or the cross-linker while keeping CB and OC loadings constant. For example, adding more paraffin plasticizer (lower modulus) or adding more cross-linker (lower elongation at break), or reducing the amounts for the opposite trends. Since these are organic materials with dielectric performance similar to EPDM, any changes in paraffin, DCP, other any addition of other organic additives, in some instances, should be done at the expense of EPDM loading to maintain dielectric characteristics/performance.

5b. The addition of inorganic additives, e.g. addition of ZnO to improve thermal stability during processing, replacement of BT by a lowercost filler, or by a mixture of two different fillers, etc, can also be done. Any filler additions, should be done at the expense of the original filler loading (Barium titanate in the example formulation above, at $\varphi_{ceram}=20$ wt. %$-\varphi_{OC}$). Additionally, adding a few % of ZnO at the expense of same wt. % of BT would not markedly change dielectric permittivity.

Transmission Electron Microscopy was also done for the direct observation of rubber/OC/CB composites and is shown in FIGS. 22a-h.

REFERENCES

The entire contents of the following references are hereby incorporated herein by reference.

Tanaka, T.; Montanan, G.; Mulhaupt, R. *Dielectrics and Electrical Insulation, IEEE Transactions* on 2004, 11, 763.

Dang, Z.-M.; Yuan, J.-K.; Zha, J.-W.; Zhou, T.; Li, S.-T.; Hu, G.-H. *Prog Mater Sci* 2012, 57, 660.

Dang, Z. M.; Yuan, J. K.; Yao, S. H.; Liao, R. J. *Adv Mater* 2013, 25, 6334.

Barber, P.; Balasubramanian, S.; Anguchamy, Y.; Gong, S.; Wibowo, A.; Gao, H.; Ploehn, H.; Zur Loye, H.-C. *Materials* 2009, 2, 1697.

ZHANG, L.; CHENG, Z.-Y. *Journal of Advanced Dielectrics* 2011, 01, 389.

Ling, A.; Boggs, S. A.; Calame, J. P. *Electrical Insulation Magazine, IEEE* 2008, 24, 5.

Tanaka, T.; Kozako, M.; Fuse, N.; Ohki, Y. *Dielectrics and Electrical Insulation, IEEE Transactions* on 2005, 12, 669.

Smith, R. C.; Liang, C.; Landry, M.; Nelson, J. K.; Schadler, L. S. *Dielectrics and Electrical Insulation, IEEE Transactions* on 2008, 15, 187.

Todd, M. G.; Shi, F. G. *Dielectrics and Electrical Insulation, IEEE Transactions* on 2005, 12, 601.

Vo, H. T.; Shi, F. G. *Microelectronics Journal* 2002, 33, 409.

Murugaraj, P.; Mainwaring, D.; Mora-Huertas, N. *Journal of Applied Physics* 2005, 98, 054304.

Hu, W.; Liu, Y.; Withers, R. L.; Frankcombe, T. J.; Norén, L.; Snashall, A.; Kitchin, M.; Smith, P.; Gong, B.; Chen, H.; Schiemer, J.; Brink, F.; Wong-Leung, J. *Nat Mater* 2013, 12, 821.

Momen, G.; Farzaneh, M. *Rev. Adv. Mater. Sci* 2011, 27, 1.

Dang, Z. M.; Yuan, J. K.; Yao, S. H.; Liao, R. *J. Adv Mater* 2013, 25, 6334.

Barber, P.; Balasubramanian, S.; Anguchamy, Y.; Gong, S.; Wibowo, A.; Gao, H.; Ploehn, H.; Zur Loye, H.-C. *Materials* 2009, 2, 1697.

Ling, A.; Boggs, S. A.; Calame, J. P. *Electrical Insulation Magazine, IEEE* 2008, 24, 5.

Sichel, E. K. *Carbon black-polymer composites: the physics of electrically conducting composites*; M. Dekker, 1982.

Stauffer, D.; Aharony, A. *Introduction to percolation theory*; CRC press, 1994.

Dang, Z. M.; Lin, Y. H.; Nan, C. W. *Advanced Materials* 2003, 15, 1625.

Xu, J.; Wong, C. P. *Applied Physics Letters* 2005, 87, 082907.

Shen, Y.; Lin, Y.; Li, M.; Nan, C. W. *Advanced Materials* 2007, 19, 1418.

Zhang, J.; Mine, M.; Zhu, D.; Matsuo, M. *Carbon* 2009, 47, 1311.

Yang, C.; Lin, Y.; Nan, C. W. *Carbon* 2009, 47, 1096.

Xiao, M.; Sun, L.; Liu, J.; Li, Y.; Gong, K. *Polymer* 2002, 43, 2245.

Min, C.; Yu, D.; Cao, J.; Wang, G.; Feng, L. *Carbon* 2013, 55, 116.

He, F.; Lau, S.; Chan, H. L.; Fan, J. *Advanced Materials* 2009, 21, 710.

Almond, D. P.; Bowen, C. R. *Physical Review Letters* 2004, 92, 157601.

Almond, D. P.; Bowen, C. R.; Rees, D. A. S. *Journal of Physics D: Applied Physics* 2006, 39, 1295.

Pfeifer, S.; Park, S.-H.; Bandaru, P. R. *ECS Solid State Letters* 2013, 2, M5.

Gefen, Y.; Aharony, A.; Alexander, S. *Physical Review Letters* 1983, 50, 77.

Laibowitz, R. B.; Gefen, Y. *Physical Review Letters* 1984, 53, 380.

Song, Y.; Noh, T. W.; Lee, S.-I.; Gaines, J. R. *Physical Review B* 1986, 33, 904.

Clerc, J. P.; Giraud, G.; Laugier, J. M.; Luck, J. M. *Advances in Physics* 1990, 39, 191.

Bergman, D. J.; Imry, Y. *Physical Review Letters* 1977, 39, 1222.

Priou, A. *Dielectric properties of heterogeneous materials*; Elsevier, 1992.

Gingold, D. B.; Lobb, C. J. *Physical Review B* 1990, 42, 8220.

Pötschke, P.; Dudkin, S. M.; Alig, I. *Polymer* 2003, 44, 5023.

Meier, J. G.; Kliippel, M. *Macromolecular Materials and Engineering* 2008, 293, 12.

Bhattacharya, M.; Bhowmick, A. *J Mater Sci* 2010, 45, 6126.

Miriyala, S. M.; Kim, Y. S.; Liu, L.; Grunlan, J. C. *Macromolecular Chemistry and Physics* 2008, 209, 2399.

Konishi, Y.; Cakmak, M. *Polymer* 2006, 47, 5371.

Etika, K. C.; Liu, L.; Hess, L. A.; Grunlan, J. C. *Carbon* 2009, 47, 3128.

Feller, J. F.; Bruzaud, S.; Grohens, Y. *Materials Letters* 2004, 58, 739.

van Oss, C. J. *Interfacial Forces in Aqueous Media*; Taylor & Francis, 1994.

Asai, S.; Sakata, K.; Sumita, M.; Miyasaka, K. *Polym J* 1992, 24, 415.

Manias, E.; Polizos, G.; Nakajima, H.; Heidecker, M. *Flame Retardant Polymer Nanocomposites* 2007, 31.

Bonnerup, C.; Gatenholm, P. *Journal of Adhesion Science and Technology* 1993, 7, 247.

Wu, G.; Asai, S.; Sumita, M. *Macromolecules* 2002, 35, 1708.

Tomer, V.; Randall, C. A.; Polizos, G.; Kostelnick, J.; Manias, E. *Journal of Applied Physics* 2008, 103.

Tomer, V.; Polizos, G.; Randall, C. A.; Manias, E. *Journal of Applied Physics* 2011, 109.

Tomer, V.; Polizos, G.; Manias, E.; Randall, C. A. *Journal of Applied Physics* 2010, 108.

Polizos, G.; Tomer, V.; Manias, E.; Randall, C. A. *Journal of Applied Physics* 2010, 108.

Ezquerra, T. A.; Connor, M. T.; Roy, S.; Kulescza, M.; Fernandes-Nascimento, J.; Baltá-Calleja, F. J. *Composites science and technology* 2001, 61, 903.

Simmons, J. G. *Journal of Applied Physics* 1963, 34, 1793.

Sheng, P.; Sichel, E. K.; Gittleman, J. I. *Physical Review Letters* 1978, 40, 1197.

The invention claimed is:

1. A polymer composition comprising:
a polymer,
an organically modified clay, and
carbon black particles,
wherein particles of the organically modified clay are larger than the carbon black particles,
wherein the polymer composition has a dielectric constant greater than 5 and less than 1000 and a dielectric loss (tan delta) of less than 10%, and
wherein the dielectric constant varies substantially linearly with temperature in a range from 20° C. to 100° C.

2. The polymer composition of claim 1, wherein the dielectric constant varies inversely with temperature in the range from 20° C. to 100° C.

3. The polymer composition of claim 1, wherein the organically modified clay has a platy shape.

4. The polymer composition of claim 1, wherein the organically modified clay is a high aspect ratio dielectric filler.

5. The polymer composition of claim 1, wherein the organically modified clay and the carbon black particles form a structured composite in which the organically modified clay separates particles of the carbon black particles.

6. The polymer composition of claim 1, wherein the polymer is an elastomer.

7. The polymer composition of claim 1, wherein the polymer comprises 30-55% by weight of the polymer composition.

8. The polymer composition of claim 1, wherein the carbon black particles comprise 5-40% by weight of the polymer composition.

9. The polymer composition of claim 1, wherein the organically modified clay comprises 1-7% by weight of the composition.

10. The polymer composition of claim 1, wherein the organically modified clay is an ammonia treated montmorillonite.

11. The polymer composition of claim 1, wherein the carbon black particles have a particle size range from 10-900 nanometers.

12. The polymer composition of claim 1, further comprising an inorganic filler.

13. The polymer composition of claim 12, wherein the inorganic filler comprises 10-25% by weight of the composition.

14. The polymer composition of claim 12, wherein the inorganic filler is one or more of $(Nb,In,)TiO_2$, rutile-$TiO_2$, $SiO_2$, ZnO, tin oxide, lead oxide, iron oxide, and calcium oxide.

15. An electrical stress grading apparatus comprising a polymer composition, the polymer composition comprising:
- a polymer,
- an organically modified clay, and
- carbon black particles,
- wherein particles of the organically modified clay are larger than the carbon black particles,
- wherein the polymer composition has a dielectric constant greater than 5 and less than 6000 and a dielectric loss of less than 10%, and
- wherein the dielectric constant varies substantially linearly with temperature in a range from 20° C. to 100° C.

16. The electric stress grading apparatus of claim 15, wherein the dielectric constant varies inversely with temperature in the range from 20° C. to 100° C.

17. The electrical stress grading apparatus of claim 15, wherein the dielectric constant of the electrical stress grading apparatus is 5-50.

18. The electric stress grading apparatus of claim 15, wherein the carbon black particles have a particle size range from 10-900 nanometers.

19. The electric stress grading apparatus of claim 15, wherein the polymer composition further comprises an inorganic filler.

20. The electric stress grading apparatus of claim 15, wherein the organically modified clay and the carbon black particles form a structured composite in which the organically modified clay separates particles of the carbon black particles.

* * * * *